(12) United States Patent
Ober

(10) Patent No.: US 8,962,779 B2
(45) Date of Patent: Feb. 24, 2015

(54) METHOD OF FORMING POLYARYL POLYMERS

(71) Applicant: Dow Global Technologies LLC, Midland, MI (US)

(72) Inventor: Matthias S. Ober, Midland, MI (US)

(73) Assignee: Dow Global Technologies LLC, Midland, MI (US)

( * ) Notice: Subject to any disclaimer, the term of this patent is extended or adjusted under 35 U.S.C. 154(b) by 43 days.

(21) Appl. No.: 13/943,196

(22) Filed: Jul. 16, 2013

(65) Prior Publication Data

US 2015/0031847 A1    Jan. 29, 2015

(51) Int. Cl.
- *C08G 4/00* (2006.01)
- *C08G 61/12* (2006.01)
- *C08G 65/00* (2006.01)

(52) U.S. Cl.
CPC .............. *C08G 65/00* (2013.01); *C08G 61/128* (2013.01); *C08G 4/00* (2013.01)
USPC ................ 528/8; 528/397; 528/391; 528/425

(58) Field of Classification Search
CPC ................................ C08G 61/128; C08G 4/00
USPC ...................................... 528/8, 397, 391, 425
See application file for complete search history.

(56) References Cited

U.S. PATENT DOCUMENTS

| | | |
|---|---|---|
| 2,760,863 A | 8/1956 | Plambeck, Jr. |
| 2,850,445 A | 9/1958 | Oster |
| 2,875,047 A | 2/1959 | Oster |
| 3,081,343 A * | 3/1963 | Merten .......................... 560/240 |
| 3,097,096 A | 7/1963 | Oster |
| 3,427,161 A | 2/1969 | Laridon et al. |
| 3,479,185 A | 11/1969 | Chambers, Jr. |
| 3,519,605 A | 7/1970 | Takekoshi |
| 3,549,367 A | 12/1970 | Chang et al. |
| 4,180,646 A * | 12/1979 | Choi et al. .................... 528/153 |
| 4,189,323 A | 2/1980 | Buhr |
| 4,343,885 A | 8/1982 | Reardon, Jr. |
| 4,442,197 A | 4/1984 | Crivello et al. |
| 4,624,912 A | 11/1986 | Zweifel et al. |
| 4,630,101 A | 12/1986 | Inaba et al. |
| 4,898,928 A * | 2/1990 | Heller et al. .................. 528/392 |
| 5,204,442 A | 4/1993 | Nye |
| 5,344,742 A | 9/1994 | Sinta et al. |
| 5,512,207 A | 4/1996 | Manero et al. |
| 5,550,236 A | 8/1996 | Schlosser et al. |
| 5,597,854 A | 1/1997 | Birbaum et al. |
| 5,710,121 A | 1/1998 | Tracy et al. |
| 5,728,835 A | 3/1998 | Aoki et al. |
| 5,837,712 A | 11/1998 | Losel et al. |
| 5,847,149 A | 12/1998 | Fuss et al. |
| 5,919,930 A | 7/1999 | Haber et al. |
| 6,008,266 A * | 12/1999 | Kuczynski et al. .............. 522/31 |
| 6,531,291 B1 | 3/2003 | Kabbash et al. |
| 6,670,387 B1 | 12/2003 | Luengo et al. |
| 6,867,250 B1 | 3/2005 | Gupta et al. |
| 6,878,374 B2 * | 4/2005 | Yu et al. ...................... 424/178.1 |
| 7,442,797 B2 | 10/2008 | Itoh et al. |
| 7,632,630 B2 | 12/2009 | Mori et al. |
| 7,892,344 B2 | 2/2011 | Reipen et al. |
| 8,128,848 B2 | 3/2012 | Reipen et al. |
| 8,431,325 B2 | 4/2013 | Hashimoto et al. |
| 8,617,723 B2 | 12/2013 | Stoessel |
| 2002/0099070 A1 | 7/2002 | Agrios |
| 2005/0164119 A1 * | 7/2005 | Maeda et al. ............... 430/270.1 |
| 2006/0025548 A1 | 2/2006 | Boussie et al. |
| 2006/0052554 A1 | 3/2006 | Boussie et al. |
| 2006/0199080 A1 | 9/2006 | Amine et al. |
| 2007/0103060 A1 | 5/2007 | Itoh et al. |
| 2008/0033140 A1 * | 2/2008 | Alkatout et al. ............... 528/128 |
| 2009/0137681 A1 | 5/2009 | Sinclair et al. |
| 2009/0142681 A1 | 6/2009 | Reipen et al. |
| 2009/0209533 A1 | 8/2009 | Zablocki et al. |
| 2012/0141939 A1 | 6/2012 | Thackeray et al. |

FOREIGN PATENT DOCUMENTS

| | | |
|---|---|---|
| CN | 102584741 A | 7/2012 |
| DE | 19710614 A1 | 9/1998 |
| DE | 102008032092 A1 | 1/2010 |
| EP | 0164248 A2 | 12/1985 |
| EP | 0232972 A2 | 8/1987 |
| EP | 0474596 A1 | 3/1992 |
| JP | 2006008953 A | 1/2006 |
| JP | 2007284402 A | 11/2007 |
| JP | 2008110944 A | 5/2008 |
| JP | 2009209090 A | 9/2009 |
| WO | 9641166 A2 | 12/1996 |
| WO | 9713762 A1 | 4/1997 |

(Continued)

OTHER PUBLICATIONS

Non-Final Office Action dated Jul. 17, 2014; U.S. Appl. No. 13/943,232; filed Jul. 16, 2013.
Notice of Allowance dated Nov. 3, 2014; U.S. Appl. No. 13/943,232; filed Jul. 16, 2013.
U.S. Appl. No. 13/943,007, filed Jul. 16, 2013.
U.S. Appl. No. 13/943,169, filed Jul. 7, 2013.
U.S. Appl. No. 13/943,232, filed Jul. 16, 2013.
Urawa et al., "Investigations into the Suzuki-Miyaura coupling aiming at multikilogram synthesis of E2040 using (o-cyanophenyl)boronic esters", Journal of Organometallic Chemistry, vol. 653 (2002), pp. 269-278.
Bicerano, J. 2002, "For Tg at infinite molecular weights: Eq. 6.2, 6.3", Prediction of Polymer Properties, Third Edition, Marcel Dekker Inc.: New York, pp. 198-199.
Bicerano, J. 2002, "For Tg at other molecular weights: Eq. 6.4, 6.5, 6.8, 6.10" Prediction of Polymer Properties, Third Edition, Marcel Dekker Inc.: New York, p. 216-217.

(Continued)

*Primary Examiner* — Liam J Heincer
(74) *Attorney, Agent, or Firm* — Cantor Colburn LLP

(57) ABSTRACT

In a method of forming a polyacetal or polyketal, a specific acetal- or ketal-containing bis(aryl)acetal is coupled with itself or a comonomer in the presence of a catalyst and a base. The polymerization reaction tolerates hydroxyl and other functional groups on the bis(aryl)acetal. Among other applications, the polyacetals and polyketals are useful components of photoresist compositions.

10 Claims, 1 Drawing Sheet

(56) References Cited

FOREIGN PATENT DOCUMENTS

| WO | 9952915 | A1 | 10/1999 |
|---|---|---|---|
| WO | 0136386 | A1 | 5/2001 |
| WO | 0142211 | A2 | 6/2001 |
| WO | 02043760 | A1 | 6/2002 |
| WO | 03091262 | A1 | 11/2003 |
| WO | 2007099392 | A2 | 9/2007 |
| WO | 2008014497 | A2 | 1/2008 |
| WO | 2008021048 | A2 | 2/2008 |
| WO | 2008033197 | A2 | 3/2008 |
| WO | 2008070733 | A2 | 6/2008 |
| WO | 2008088690 | A2 | 7/2008 |
| WO | 2009061924 | A2 | 5/2009 |
| WO | 2011116951 | A1 | 9/2011 |
| WO | 2011159633 | A1 | 12/2011 |
| WO | 2011161451 | A1 | 12/2011 |
| WO | 2012004674 | A2 | 1/2012 |
| WO | 2012004675 | A2 | 1/2012 |
| WO | 2012004676 | A2 | 1/2012 |
| WO | 2012004680 | A2 | 1/2012 |
| WO | 2012004681 | A2 | 1/2012 |
| WO | 2012004683 | A2 | 1/2012 |
| WO | 2012006230 | A1 | 1/2012 |

OTHER PUBLICATIONS

Bicerano, J. 2002, "Solubility parameter at 298 K Eq. 5.4" Prediction of Polymer Properties, Third Edition, Marcel Dekker Inc.: New York, p. 137.

Bicerano, J. 2002, "For Tg at other molecular weights: Eq. 6.4, 6.5, 6.8, 6.10" Prediction of Polymer Properties, Third Edition, Marcel Dekker Inc.: New York, p. 212, 2 pages.

Fedors, "A Method for Estimating Both the Solubility Parameters and Molar Volumes of Liquids. * Supplement", Polymer Engineering and Science, Jun. 1974, vol. 14, No. 6, p. 472.

Fedors, "A Method for Estimating Both the Solubility Parameters and Molar Volumes of Liquids", Polymer Engineering and Science, Feb. 1974, vol. 14, No. 2, pp. 147-154.

Frahn et al., "Suzuki Polycondensation: On Catalyst Derived Phosphorus Incorporation and Reproducibiilty of Molecular Weights", Tetrahedron, vol. 53, No. 45, pp. 15459-15467, 1997.

Ito, "Chemical Amplification Resists for Microlithography", Adv Polym Sci (2005) 172: 37-245.

Karakaya et al., "Full coverage of a hydroxy-substituted poly(para-phenylene) with first- and second-generation dendritic wedges having isocyanate focal points", Acta Polymer., 47, pp. 79-84 (1996).

Kozawa et al., "Impact of Nonconstant Diffusion Coefficient on Latent Image Quality in 22 nm Fabrication using Extreme Ultraviolet Lithography", Journal of Photopolymer Science and Technology, 2008, vol. 21, No. 3, pp. 421-427.

Onishi et al., "Acid Catalyzed Resist for KrF Excimer Laser Lithography", Journal of Photopolymer Science and Technology, 4(3), pp. 337-340 (1991).

Sakamoto et al., "Suzuki Polycondencation: Polyarylenes a la carte", Macromolecular Rapid Communications, 2009, vol. 30, pp. 653-687.

Scheler et al., "Synthesis and Properties of Alternating Fluorene-Based Oligomers for Sub-mm Photopatterning", Macromol. Chem. Phys. 2010, 211, pp. 2081-2089.

Schluter et al, "The Tenth Anniversary of Suzuki Polycondensation (SPC)", Journal of Polymer Science, Part A, Polymer Chemistry, 2001, vol. 39, pp. 1533-1556.

Seechurn et al., "Air-Stable Pd(R-allyl)LCI (L=Q-Phos, P(t-Bu)3, etc.) Systems for C-C/N Couplings: Insight into the Structure-Activity Relationship and Catalyst Activation Pathway", J. Org. Chem. 2011, 76, pp. 7918-7932.

* cited by examiner

METHOD OF FORMING POLYARYL POLYMERS

FIELD

The present invention relates to a method of synthesizing polyaryl polymers, in particular polyacetals and polyketals.

INTRODUCTION

Polyacetals are known polymers that have has some use in microlithography. (As used herein, for brevity and except as otherwise noted, the term "acetal" shall be understood to be generic to "acetal" and "ketal", the term "oligoacetal" shall be understood to be generic to "oligoacetal" and "oligoketal", and the term "polyacetal" shall be understood to be generic to "polyacetal" and "polyketal".) The synthesis of polyacetals typically relies on a polycondensation reaction to form acetal moieties during the polymerization reaction. The polycondensation reactants include free or protected hydroxyl groups that are consumed in the acetal formation, so the resulting polymers do not typically contain free hydroxyl groups or other functional groups that would interfere with or be consumed in the typical acetal formation reactions.

There is a need for materials and methods than can be used to synthesize oligoacetals and polyacetals. It would be desirable if the methods were general to the formation of oligoacetals and polyacetals with and without free hydroxyl groups and other functional groups that are incompatible with polycondensation conditions.

SUMMARY

One embodiment is a method of forming a polymer, the method comprising: reacting a monomer in the presence of a catalyst and a base to form a polymer; wherein the monomer comprises a bis(aryl)acetal having the structure

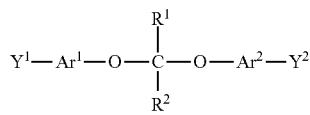

wherein $Y^1$ and $Y^2$ are each independently chloro, bromo, iodo, mesylate, tosylate, triflate, or $B^x$, wherein each occurrence of $B^x$ is independently a boron-containing functional group bonded to $Ar^1$ or $Ar^2$ via a boron atom; $Ar^1$ and $Ar^2$ are each independently unsubstituted or substituted $C_{6-18}$ arylene, or unsubstituted or substituted $C_{3-18}$ heteroarylene; and $R^1$ and $R^2$ are each independently hydrogen, unsubstituted or substituted $C_{1-18}$ linear or branched alkyl, unsubstituted or substituted $C_{3-18}$ cycloalkyl; unsubstituted or substituted $C_{6-18}$ aryl, or unsubstituted or substituted $C_{3-18}$ heteroaryl; and $R^1$ and $R^2$ are optionally covalently linked to each other to form a ring that includes $—R^1—C—R^2—$, where the central carbon is the acetal carbon; wherein when one of $Y^1$ and $Y^2$ is chloro, bromo, iodo, triflate, mesylate, or tosylate, and the other of $Y^1$ and $Y^2$ is $B^x$, the polymer comprises a plurality of repeat units having the structure

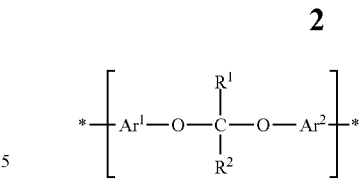

wherein $Ar^1$, $Ar^2$, $R^1$, and $R^2$ are defined above, and each occurrence of $Ar^1$, $Ar^2$, $R^1$, and $R^2$ is defined independently; wherein when $Y^1$ and $Y^2$ are each $B^x$, the monomer further comprises a bis(leaving group)arylene having the structure

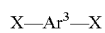

wherein each occurrence of X is independently chloro, bromo, iodo, triflate, mesylate, or tosylate; wherein $Ar^3$ is unsubstituted or substituted $C_{6-18}$ arylene, or unsubstituted or substituted $C_{3-18}$ heteroarylene; and wherein the polymer comprises a plurality of repeat units having the structure

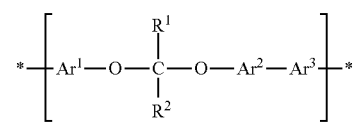

wherein $Ar^1$, $Ar^2$, $Ar^3$, $R^1$, and $R^2$ are defined above, and each occurrence of $Ar^1$, $Ar^2$, $Ar^3$, $R^1$, and $R^2$ is defined independently; and wherein when $Y^1$ and $Y^2$ are each independently selected from chloro, bromo, iodo, triflate, mesylate, or tosylate, the monomer further comprises a bis(boron-containing functional group)arylene having the structure

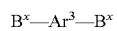

wherein each occurrence of $B^x$ is independently a boron-containing functional group bonded to $Ar^3$ via a boron atom; and wherein the polymer comprises a plurality of repeat units having the structure

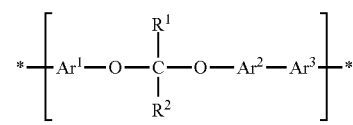

wherein $Ar^1$, $Ar^2$, $Ar^3$, $R^1$, and $R^2$ are defined above, and each occurrence of $Ar^1$, $Ar^2$, $Ar^3$, $R^1$, and $R^2$ is defined independently.

This and other embodiments are described in detail below.

DETAILED DESCRIPTION

Figure 1:
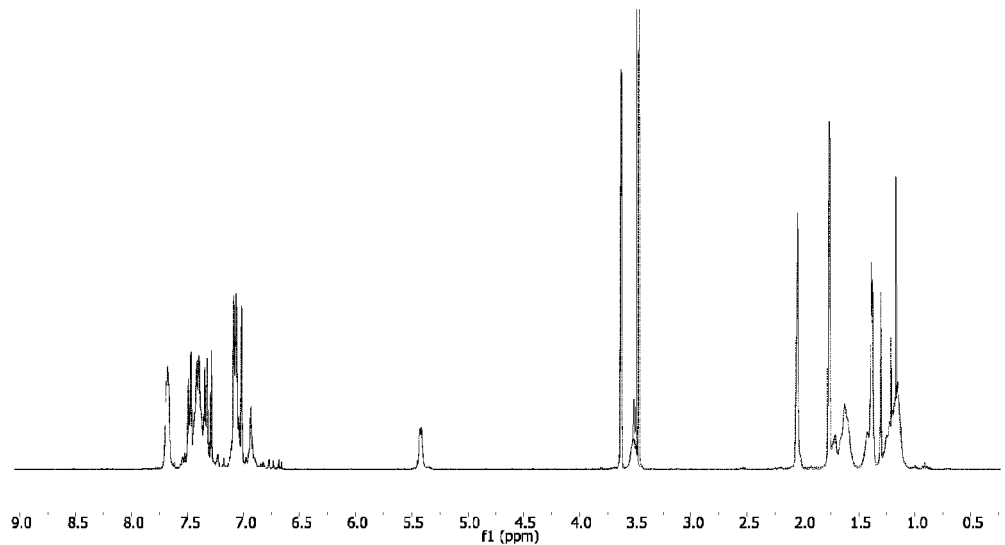
FIG. 1 presents superimposed proton nuclear magnetic resonance ($^1$H-NMR) spectra of the Preparative Example 3 polymer in acetone-$d_6$ without (solid) or with (dotted) $D_2O$.

The present method of forming polyacetals by catalyzed polymerization of bis(aryl)acetals can exhibit one or more of the following advantages relative to acetal-forming polycondensation methods and known Suzuki coupling or polymerization methods: the present method can be conducted at or near ambient temperature, it is compatible with monomers containing functional groups that are incompatible with acetal-forming polycondensation methods, such as phenols and base-labile functional groups such as acetate esters, it is capable of producing polymers, and it tolerates certain functional groups, such as ortho-alkoxy groups or free phenol groups in an aryl dihalide, that depress some Suzuki coupling and polycondensation reactions. It is important to note functional groups that only slightly depress bimolecular Suzuki coupling can be detrimental for Suzuki polycondensation reactions and significantly reduce product molecular weight. It is further important to note that in bimolecular coupling reactions it is always possible to increase yield by increasing the ratio of one of the coupling partners, which is not an option in Suzuki coupling and polycondensation reactions. Finally, it is known in the art that reaction conditions that are particularly favorable for bimolecular Suzuki reactions are not necessarily the best ones for Suzuki polymerization reactions.

As used herein, "substituted" means including at least one substituent such as a halogen (i.e., F, Cl, Br, I), hydroxyl, amino, thiol, carboxyl, carboxylate, amide, nitrile, sulfide, disulfide, nitro, $C_{1-18}$ alkyl, $C_{1-18}$ alkoxyl, $C_{6-18}$ aryl, $C_{6-18}$ aryloxyl, $C_{7-18}$ alkylaryl, or $C_{7-18}$ alkylaryloxyl. It will be understood that any group or structure disclosed with respect to the formulas herein may be so substituted unless otherwise specified, or where such substitution would significantly adversely affect the desired properties of the resulting structure. Also, "fluorinated" means having one or more fluorine atoms incorporated into the group. For example, where a $C_{1-18}$ fluoroalkyl group is indicated, the fluoroalkyl group can include one or more fluorine atoms, for example, a single fluorine atom, two fluorine atoms (e.g., as a 1,1-difluoroethyl group), three fluorine atoms (e.g., as a 2,2,2-trifluoroethyl group), or fluorine atoms at each free valence of carbon (e.g., as a perfluorinated group such as —$CF_3$, —$C_2F_5$, —$C_3F_7$, or —$C_4F_9$).

One embodiment is a method of forming a polymer, the method comprising: reacting a monomer in the presence of a catalyst and a base to form a polymer; wherein the monomer comprises a bis(aryl)acetal having the structure

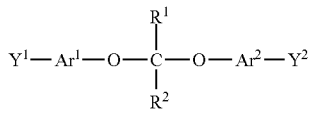

wherein $Y^1$ and $Y^2$ are each independently chloro, bromo, iodo, mesylate, tosylate, triflate, or $B^x$, wherein each occurrence of $B^x$ is independently a boron-containing functional group bonded to $Ar^1$ or $Ar^2$ via a boron atom; $Ar^1$ and $Ar^2$ are each independently unsubstituted or substituted $C_{6-18}$ arylene, or unsubstituted or substituted $C_{3-18}$ heteroarylene; and $R^1$ and $R^2$ are each independently hydrogen, unsubstituted or substituted $C_{1-18}$ linear or branched alkyl, unsubstituted or substituted $C_{3-18}$ cycloalkyl; unsubstituted or substituted $C_{6-18}$ aryl, or unsubstituted or substituted $C_{3-18}$ heteroaryl; and $R^1$ and $R^2$ are optionally covalently linked to each other to form a ring that includes —$R^1$—C—$R^2$—; wherein when one of $Y^1$ and $Y^2$ is chloro, bromo, iodo, triflate, mesylate, or tosylate, and the other of $Y^1$ and $Y^2$ is $B^x$, the polymer comprises a plurality of repeat units having the structure

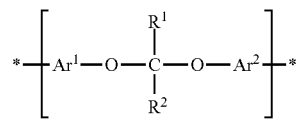

wherein $Ar^1$, $Ar^2$, $R^1$, and $R^2$ are defined above, and each occurrence of $Ar^1$, $Ar^2$, $R^1$, and $R^2$ is defined independently; wherein when $Y^1$ and $Y^2$ are each $B^x$, the monomer further comprises a bis(leaving group)arylene having the structure

wherein each occurrence of X is independently chloro, bromo, iodo, triflate, mesylate, or tosylate; wherein $Ar^3$ is unsubstituted or substituted $C_{6-18}$ arylene, or unsubstituted or substituted $C_{3-18}$ heteroarylene; and wherein the polymer comprises a plurality of repeat units having the structure

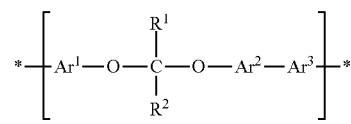

wherein $Ar^1$, $Ar^2$, $Ar^3$, $R^1$, and $R^2$ are defined above, and each occurrence of $Ar^1$, $Ar^2$, $Ar^3$, $R^1$, and $R^2$ is defined independently; and wherein when $Y^1$ and $Y^2$ are each independently selected from chloro, bromo, iodo, triflate, mesylate, or tosylate, the monomer further comprises a bis(boron-containing functional group)arylene having the structure

wherein each occurrence of $B^x$ is independently a boron-containing functional group bonded to $Ar^3$ via a boron atom; and wherein the polymer comprises a plurality of repeat units having the structure

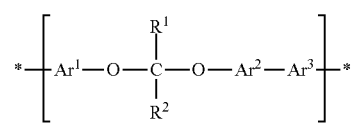

wherein $Ar^1$, $Ar^2$, $Ar^3$, $R^1$, and $R^2$ are defined above, and each occurrence of $Ar^1$, $Ar^2$, $Ar^3$, $R^1$, and $R^2$ is defined independently.

The method utilizes a bis(aryl)acetal having the structure shown above. In the bis(aryl)acetal structure, when one of $Y^1$ and $Y^2$ is chloro, bromo, iodo, triflate, mesylate, or tosylate, and the other of $Y^1$ and $Y^2$ is $B^x$, then the bis(aryl)acetal can be coupled to itself (homopolymerized) to form a polymer comprising a plurality of repeat units having the structure

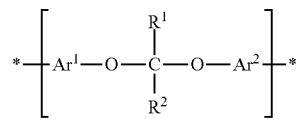

wherein $Ar^1$, $Ar^2$, $R^1$, and $R^2$ are defined above, and each occurrence of $Ar^1$, $Ar^2$, $R^1$, and $R^2$ is defined independently (that is, different species of the bis(aryl)acetal having $Y^1$ and $Y^2$ as defined here can be copolymerized). In some embodiments, $Y^2$ is chloro or bromo. In some embodiments $Y^2$ is bromo. As used herein, the term "plurality" means at least three. Also, the term "polymer" will be understood to encompass oligomers comprising as few as three repeat units. The desired number of repeat units will depend on the intended use of the polymer. For example, when the polymer is used in a photoresist composition, it may be desirable for the polymer to comprise at least 5 repeat units, specifically 5 to 200 repeat units. when one of $Y^1$ and $Y^2$ is chloro, bromo, iodo, triflate, mesylate, or tosylate, and the other of $Y^1$ and $Y^2$ is $B^x$, then the bis(aryl)acetal can, optionally, be copolymerized with a compound having the structure

wherein $B^x$, $Ar^3$, and X are defined above. This copolymerization yields a polymer comprising a plurality of repeat units having the structure

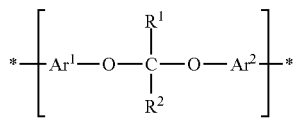

wherein $Ar^1$, $Ar^2$, $R^1$, and $R^2$ are defined above and each occurrence of $Ar^1$, $Ar^2$, $R^1$, and $R^2$ is defined independently; and a plurality of repeat units having the structure

wherein $Ar^3$ is defined above and each occurrence of $Ar^3$ is defined independently. In the context, it should be noted that the repeat units having the structure

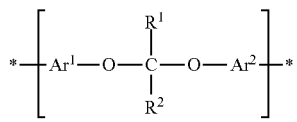

need not be adjacent to each other, and the plurality of repeat units having the structure

need not be adjacent to each other. In other words, the copolymer can be a random copolymer.

In other embodiments, when $Y^1$ and $Y^2$ are each $B^x$, then the bis(aryl)acetal is copolymerized with a bis(leaving group)arylene having the structure

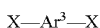

wherein X and $Ar^3$ are defined above. The resulting polymer comprises a plurality of repeat units having the structure

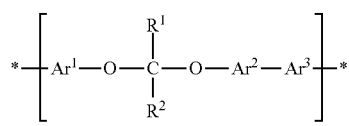

wherein $Ar^1$, $Ar^2$, $Ar^3$, $R^1$, and $R^2$ are defined above, and each occurrence of $Ar^1$, $Ar^2$, $Ar^3$, $R^1$, and $R^2$ is defined independently.

In still other embodiments, when $Y^1$ and $Y^2$ are each independently selected from chloro, bromo, iodo, triflate, mesylate, or tosylate, then the bis(aryl)acetal is copolymerized with a bis(boron-containing functional group)arylene having the structure

wherein each occurrence of $B^x$ is independently a boron-containing functional group bonded to $Ar^3$ via a boron atom; and wherein the polymer comprises a plurality of repeat units having the structure

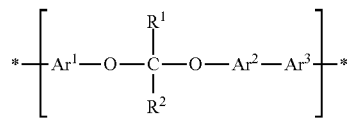

wherein $Ar^1$, $Ar^2$, $Ar^3$, $R^1$, and $R^2$ are defined above, and each occurrence of $Ar^1$, $Ar^2$, $Ar^3$, $R^1$, and $R^2$ is defined independently Whether present in the bis(aryl)acetal, the compound having the structure

or the bis(boron-containing functional group)arylene having the structure

each occurrence of $B^x$ is independently a boron-containing functional group bonded to the adjacent $Ar^1$, $Ar^2$, or $Ar^3$ via a boron atom. Examples of $B^x$ groups include $—BF_3^-M^+$, wherein each occurrence of $M^+$ is independently an alkali metal cation, or an unsubstituted or substituted ammonium ion; $—B(OH)_2$; and

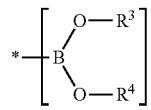

wherein $R^3$ and $R^4$ are each independently $C_{1-18}$ alkyl, $C_{3-18}$ cycloalkyl, or $C_{6-18}$ aryl; and $R^3$ and $R^4$ are optionally covalently linked to each other to form a ring that includes $—R^3—O—B—O—R^4—$.

In some embodiments, each occurrence of $B^x$ is independently

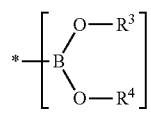

wherein $R^3$ and $R^4$ are each independently $C_{1-18}$ alkyl, $C_{3-18}$ cycloalkyl, or $C_{6-18}$ aryl; and $R^3$ and $R^4$ are optionally covalently linked to each other to form a ring that includes $—R^3—O—B—O—R^4—$.

Examples of $B^x$ species include

-continued

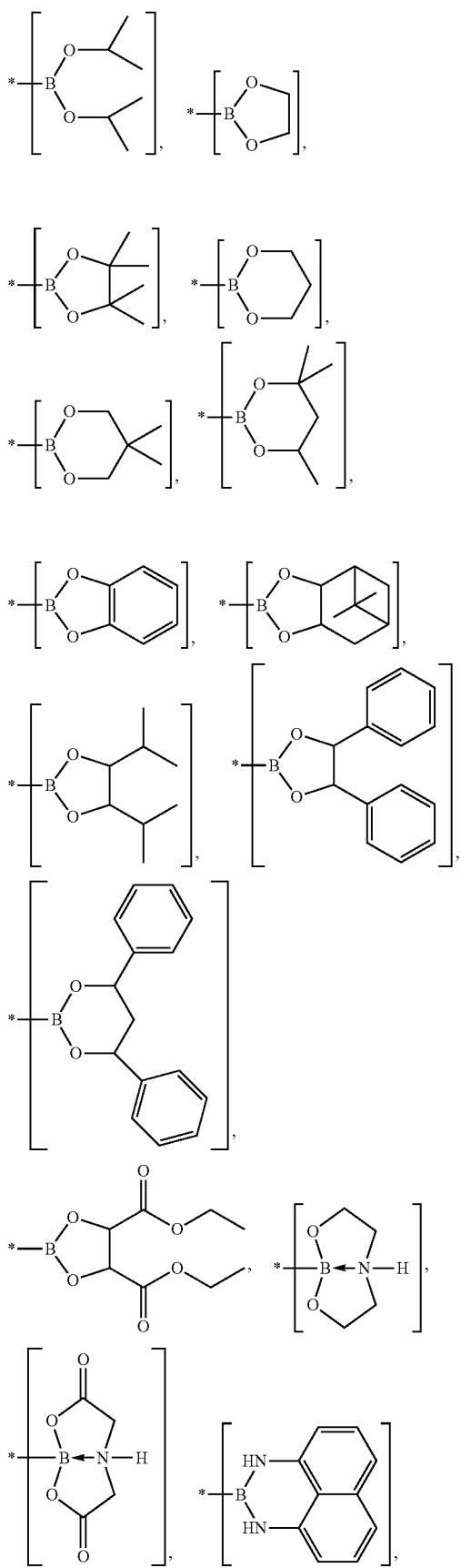

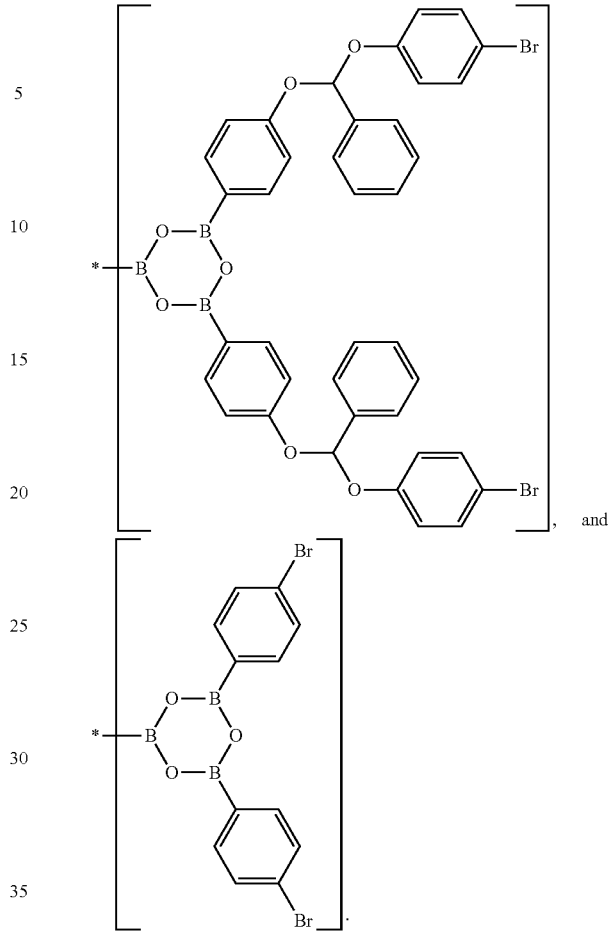

In the bis(aryl)acetal structure above, $Ar^1$ and $Ar^2$ are each independently unsubstituted or substituted $C_{6-18}$ arylene, or unsubstituted or substituted $C_{3-18}$ heteroarylene. In some embodiments, $Ar^1$ and $Ar^2$ are not covalently linked to each other to form a ring structure that includes —$Ar^1$—O—C—O—$Ar^2$—. In other embodiments, $Ar^1$ and $Ar^2$ are covalently linked to each other, for example via a second acetal group, to form a ring structure that includes —$Ar^1$—O—C—O—$Ar^2$—. Specific examples of $Ar^1$ and $Ar^2$ include unsubstituted or substituted 1,2-phenylene, unsubstituted or substituted 1,3-phenylene, unsubstituted or substituted 1,4-phenylene, unsubstituted or substituted 4,4'-biphenylene, unsubstituted or substituted 4,4"-p-terphenylene, unsubstituted or substituted 3,3"-p-terphenylene, unsubstituted or substituted 4,4"-m-terphenylene, unsubstituted or substituted 4,4"-p-terphenylene, unsubstituted or substituted 4,4"-o-terphenylene, unsubstituted or substituted 2,2"-o-terphenylene, unsubstituted or substituted 1,4-naphthylene, unsubstituted or substituted 2,7-naphthylene, unsubstituted or substituted 2,6-naphthylene, unsubstituted or substituted 1,5-naphthylene, unsubstituted or substituted 2,3-naphthylene, unsubstituted or substituted 1,7-naphthylene, unsubstituted or substituted 1,8-naphthylene, unsubstituted or substituted imidazo-2,4-ylene, 2,4-pyridylene, 2,5-pyridylene, unsubstituted or substituted 1,8-anthracenylene, unsubstituted or substituted 9,10-anthracenylene, unsubstituted or substituted 2,7-phenanthrenylene, unsubstituted or substituted 9,10-phenanthrenylene, unsubstituted or substituted 3,6-phenanthrenylene, unsubstituted or substituted 2,7-pyrenylene, unsubstituted or substituted 1,6-pyrenylene, unsubstituted or substituted-1,8-pyrenylene, unsubstituted or substituted 2,5-furanylene, unsubstituted or substituted 3,4-furanylene, unsubstituted or substituted 2,3-furanylene, unsubstituted or substituted 2,5-thiofuranylene, unsubstituted or substituted 3,4-thiofuranylene, unsubstituted or substituted 2,3-thiofuranylene, unsubstituted or substituted 2,5-oxazolylene, unsubstituted or substituted 2,7-fluorenylene, unsubstituted or substituted 2,5-benzofuranylene, unsubstituted or substituted 2,7-benzofuranylene, unsubstituted or substituted 5,7-benzofuranylene, unsubstituted or substituted 5,7-[1,3-benzoxazole], unsubstituted or substituted dithieno[3,2-b:2',3'-d]thiophene, and unsubstituted or substituted 2,7-xanthenylene.

In some embodiments, at least one of $Ar^1$, $Ar^2$, and $Ar^3$ is substituted with at least one functional group selected from the group consisting of hydroxyl, acetals, ketals, esters, and lactones.

In some embodiments, in at least one of the repeat units of the polymer, at least one of $R^1$, $R^2$, $Ar^1$, $Ar^2$ and $Ar^3$ (when present) is substituted with hydroxyl. In some embodiments, at least 10 mole percent of repeat units in the polymer comprise at least one hydroxyl. Within the limit, the mole percent of repeat units in the polymer comprising at least one hydroxyl can be up to 40, 60, 80, 90, or 95. In some embodiments, at least one of $R^1$, $R^2$, $Ar^1$, $Ar^2$, and $Ar^3$ (when present) is substituted with hydroxyl in at least 40 mole percent of the plurality of repeat units. In some embodiments, in 40 to 99 mole percent of the plurality of repeat units at least one of $Ar^1$, $Ar^2$, and $Ar^3$ (when present) is substituted with hydroxyl, and in 1 to 60 mole percent of the plurality of repeat units at least one of $Ar^1$, $Ar^2$ and $Ar^3$ is substituted with the acetal or ketal. A preferred acetal is —O—C(H)($R^5$)—$OR^6$, wherein $R^5$ is methyl and $R^6$ is cyclohexyl. In some embodiments, each occurrence of $Ar^1$, $Ar^2$, and $Ar^3$ is independently 1,3-phenylene or 1,4-phenylene.

The acetals can be monovalent acetals having the structure

wherein $R^5$ and $R^6$ are independently selected from the group consisting of unsubstituted or substituted $C_{1-18}$ linear or branched alkyl, unsubstituted or substituted $C_{3-18}$ cycloalkyl, unsubstituted or substituted $C_{6-18}$ aryl, and unsubstituted or substituted $C_{3-18}$ heteroaryl. In some embodiments, $R^5$ and $R^6$ are covalently connected to each others to form a ring structure. In some embodiments, $R^5$ or $R^6$ is covalently connected to the polymer backbone (e.g., via bonding to $R^1$ or $R^2$, or to one of $Ar^1$, $Ar^2$, and $Ar^3$ to which the oxygen end of the acetal is not already bound). In these embodiments, the acetal is part of a ring structure. The ring structure can include or not include $Ar^1$—O—C—O—$Ar^2$.

Specific examples of monovalent acetals having the structure —O—C(H)($R^5$)—$OR^6$ include

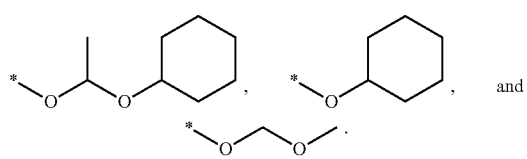

The acetals can also be divalent cyclic acetals attached via oxygen atoms to $Ar^1$, $Ar^2$, or $Ar^3$ as shown in the structure

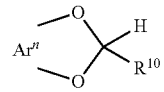

wherein $Ar^n$ is $Ar^1$, $Ar^2$, or $Ar^3$ (when present), or a combination of $Ar^1$ and $Ar^2$ (for example, when one acetal oxygen is bonded directly to $Ar^1$ and the other directly to $Ar^2$) or a combination of $Ar^2$ and $Ar^3$; $R^{10}$ is selected from the group consisting of unsubstituted or substituted $C_{1-18}$ linear or branched alkyl, unsubstituted or substituted $C_{3-18}$ cycloalkyl, unsubstituted or substituted $C_{6-18}$ aryl, and unsubstituted or substituted $C_{3-18}$ heteroaryl. In some embodiments, the cyclic acetal is part of a ring structure that includes $Ar^1$—O—C($R^1$)($R^2$)—O—$Ar^2$.

In other embodiments, the cyclic acetal is not part of such a ring structure.

The ketals can be monovalent ketals having the structure

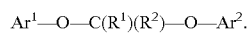

wherein $R^7$, $R^8$, and $R^9$ are independently selected from the group consisting of unsubstituted or substituted $C_{1-18}$ linear or branched alkyl, unsubstituted or substituted $C_{3-18}$ cycloalkyl, unsubstituted or substituted $C_{6-18}$ aryl, and unsubstituted or substituted $C_{3-18}$ heteroaryl. Optionally $R^7$, $R^8$, or $R^9$ is covalently connected to the polymer backbone such that the acetal is part of a ring structure.

The ketals can also be cyclic ketals attached via oxygen atoms to $Ar^1$ or $Ar^2$ as shown in the structure

wherein $Ar^n$ is $Ar^1$ or $Ar^2$, or a combination of $Ar^1$ and $Ar^2$ (for example, when one ketal oxygen is bonded directly to $Ar^1$ and the other directly to $Ar^2$); $R^{11}$ and $R^{12}$ are independently selected from the group consisting of unsubstituted or substituted $C_{1-18}$ linear or branched alkyl, unsubstituted or substituted $C_{3-18}$ cycloalkyl, unsubstituted or substituted $C_{6-18}$ aryl, and unsubstituted or substituted $C_{3-18}$ heteroaryl. In some embodiments, the cyclic ketal is part of a ring structure that includes $Ar^1$—O—C($R^1$)($R^2$)—O—$Ar^2$.

In other embodiments, the cyclic ketal is not part of such a ring structure.

The esters can have the structure $—(O)_a-(L^1)_b-C(=O)—OR^{13}$, wherein a is 0 or 1 and b is 0 or 1, provided that when a is 1 then b is 1; $R^{13}$ is selected from the group consisting of unsubstituted or substituted $C_{1-20}$ linear or branched alkyl (e.g., methyl, ethyl, n-propyl, i-propyl, n-butyl, i-butyl, t-butyl, diphenylmethyl, 2-phenylpropan-2-yl, 1,1-diphenylethan-1-yl, triphenylmethyl), unsubstituted or substituted $C_{3-20}$ cycloalkyl (e.g., cyclopentyl, cyclohexyl, methylcyclohexan-1-yl, ethylcyclohexan-1-yl, 1-norbornyl, 1-adamantlyl, 2-methylbicyclo[2.2.1]heptan-2-yl, 1-adamantlyl, 2-methyladamantan-2-yl), unsubstituted or substituted $C_{6-20}$ aryl (e.g., phenyl, 1-naphthyl, and 2-naphthyl), and unsubstituted or substituted $C_{3-20}$ heteroaryl (e.g., 2-imidazolyl, 4-imidazolyl, 2-pyridyl, 3-pyridyl, and 4-pyridyl); and wherein $L^1$ is selected from the group consisting of unsubstituted or substituted C$_{1-20}$ linear or branched alkylene (e.g., methane-1,1-diyl (—CH$_2$—), ethane-1,2-diyl (—CH$_2$CH$_2$—), ethane-1,1-diyl (—CH(CH$_3$)—), propane-2,2-diyl(—C(CH$_3$)$_2$—)), unsubstituted or substituted C$_{3-20}$ cycloalkylene (e.g., 1,1-cyclopentanediyl, 1,2-cyclopentanediyl, 1,1-cyclohexanediyl, 1,4-cyclohexanediyl), unsubstituted or substituted C$_{6-20}$ arylene (e.g., 1,3-phenylene, 1,4-phenylene, 1,4-naphthylene, 1,5-naphthylene, 2,6-naphthylene), and unsubstituted or substituted C$_{3-20}$ heteroarylene (e.g., imidazo-2,4-ylene, 2,4-pyridylene, 2,5-pyridylene). In some embodiments, R$^{13}$ and L$^1$ are covalently connected to each others to form a lactone. In some embodiments, R$^{13}$ is bonded to the adjacent ester oxygen atom via a tertiary carbon atom, for example,

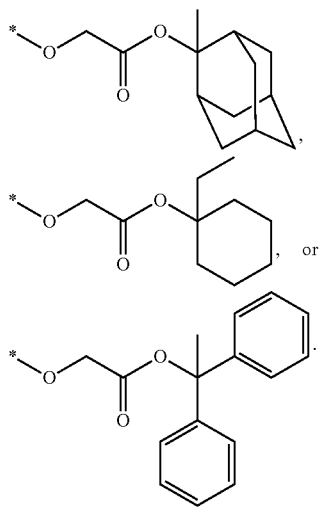

Alternatively, the esters can have the structure

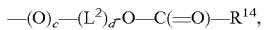

wherein c is 0 or 1 and d is 0 or 1, provided that when c is 1 then d is 1; R$^{14}$ is selected from the group consisting of unsubstituted or substituted C$_{1-20}$ linear or branched alkyl (e.g., methyl, ethyl, n-propyl, i-propyl, n-butyl, i-butyl, t-butyl, diphenylmethyl, 2-phenylpropan-2-yl, 1,1-diphenylethan-1-yl, and triphenylmethyl), unsubstituted or substituted C$_{3-20}$ cycloalkyl (e.g., cyclopentyl, cyclohexyl, 1-norbornyl, 1-adamantlyl, 2-methylbicyclo[2.2.1]heptan-2-yl, 2-methyladamantan-2-yl), unsubstituted or substituted C$_{6-20}$ aryl (e.g., phenyl, 1-naphthyl, 2-naphthyl), and unsubstituted or substituted C$_{3-20}$ heteroaryl (e.g., 2-imidazolyl, 4-imidazolyl, 2-pyridyl, 3-pyridyl, 4-pyridyl); and wherein L$^2$ is selected from the group consisting of unsubstituted or substituted C$_{1-20}$ linear or branched alkylene (e.g., methane-1,1-diyl (—CH$_2$—), ethane-1,2-diyl (—CH$_2$CH$_2$—), ethane-1,1-diyl (—CH(CH$_3$)—), propane-2,2-diyl (—C(CH$_3$)$_2$—), 2-methylpropane-1,2-diyl(—CH$_2$C(CH$_3$)$_2$—), diphenylmethylene (—C(C$_6$H$_5$)$_2$—), 1-phenylmethane-1,1-diyl (—CH(C$_6$H$_5$)—), 2-phenylpropane-1,2-diyl (—CH$_2$C(CH$_3$)(C$_6$H$_5$)—), 1,1-diphenylethane-1,2-diyl(—CH$_2$C(C$_6$H$_5$)$_2$)—), unsubstituted or substituted C$_{3-20}$ cycloalkylene (e.g., 1,1-cyclopentanediyl, 1,2-cyclopentanediyl, 1,1-cyclohexanediyl, 1,4-cyclohexanediyl, ethylcyclohexane-1,4-diyl, 4-methyladamantane-1,4-diyl), unsubstituted or substituted C$_{6-20}$ arylene (e.g., 1,3-phenylene, 1,4-phenylene, 1,4-naphthylene, 1,5-naphthylene, 2,6-naphthylene), and unsubstituted or substituted C$_{3-20}$ heteroarylene (e.g., imidazo-2,4-ylene, 2,4-pyridylene, 2,5-pyridylene). In some embodiments, R$^{14}$ and L$^2$ are covalently connected to each others to form a lactone. A specific example of an ester having the structure —(O)$_c$-(L$^2$)$_d$-O—C(=O)—R$^{14}$ is

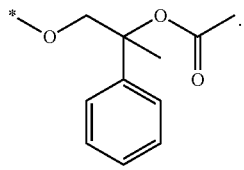 [SMILES: *OCC(C)(OC(C)=O)c1ccccc1]

The lactones can have the structure

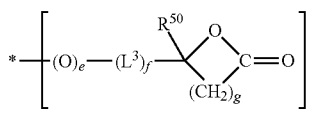

wherein e is 0 or 1; f is 0 or 1; g is 1, 2, 3, or 4 (specifically 2); R$^{50}$ is hydrogen, unsubstituted or substituted C$_{1-18}$ linear or branched alkyl, unsubstituted or substituted C$_{3-18}$ cycloalkyl, unsubstituted or substituted C$_{6-18}$ aryl, or unsubstituted or substituted C$_{3-18}$ heteroaryl; and L$^3$ is selected from the group consisting of unsubstituted or substituted C$_{1-20}$ linear or branched alkylene (e.g., unsubstituted or substituted C$_{3-20}$ cycloalkylene (e.g., 1,1-cyclopentanediyl, 1,2-cyclopentanediyl, 1,1-cyclohexanediyl, 1,4-cyclohexanediyl), unsubstituted or substituted C$_{6-20}$ arylene (e.g., 1,3-phenylene, 1,4-phenylene, 1,4-naphthylene, 1,5-naphthylene, 2,6-naphthylene), and unsubstituted or substituted C$_{3-20}$ heteroarylene (e.g., imidazo-2,4-ylene, 2,4-pyridylene, 2,5-pyridylene).

In some embodiments, in at least one of the repeat units of the polymer, at least one of R$^1$, R$^2$, Ar$^1$, Ar$^2$ and Ar$^3$ (when present) is substituted with hydroxyl. In some embodiments, at least one of R$^1$, R$^2$, Ar$^1$, Ar$^2$, and Ar$^3$ (when present) is substituted with hydroxyl in at least 40 mole percent of the plurality of repeat units. In some embodiments, in 40 to 99 mole percent of the plurality of repeat units at least one of Ar$^1$, Ar$^2$, and Ar$^3$ (when present) is substituted with hydroxyl, and in 1 to 60 mole percent of the plurality of repeat units at least one of Ar$^1$, Ar$^2$ and Ar$^3$ is substituted with the acetal or ketal. A preferred acetal is —O—C(H)(R$^5$)—OR$^6$, wherein R$^5$ is methyl and R$^6$ is cyclohexyl. In some embodiments, each occurrence of Ar$^1$, Ar$^2$, and Ar$^3$ is independently 1,3-phenylene or 1,4-phenylene.

When used in applications in which the polymer is exposed to acid to promote fragmentation, it may be desirable for the polymer to exclude robust linkages between the Ar$^1$ and Ar$^2$ rings. Thus, in some embodiments, Ar$^1$ and Ar$^2$ are not covalently linked with one another to form a ring structure that includes —Ar$^1$—O—C—O—Ar$^2$—.

Specific examples of Ar$^1$, Ar$^2$, and Ar$^3$ include unsubstituted or substituted 1,2-phenylene, unsubstituted or substituted 1,3-phenylene, unsubstituted or substituted 1,4-phenylene, unsubstituted or substituted 4,4'-biphenylene, unsubstituted or substituted 4,4"-p-terphenylene, unsubstituted or substituted 3,3"-p-terphenylene, unsubstituted or substituted 4,4"-m-terphenylene, unsubstituted or substituted 4,4"-p-terphenylene, unsubstituted or substituted 4,4"-o-terphenylene, unsubstituted or substituted 2,2"-o-terphenylene, unsubstituted or substituted 1,4-naphthylene, unsubstituted or substituted 2,7-naphthylene, unsubstituted or substituted 2,6-naphthylene, unsubstituted or substituted 1,5-naphthylene, unsubstituted or substituted 2,3-naphthylene, unsubstituted or substituted 1,7-naphthylene, unsubstituted or substituted 1,8-naphthylene, unsubstituted or substituted imidazo-2,4-ylene, 2,4-pyridylene, 2,5-pyridylene, unsubstituted or substituted 1,8-anthracenylene, unsubstituted or substituted 9,10-anthracenylene, unsubstituted or substituted 2,7-phenanthrenylene, unsubstituted or substituted 9,10-phenanthrenylene, unsubstituted or substituted 3,6-phenanthrenylene, unsubstituted or substituted 2,7-pyrenylene, unsubstituted or substituted 1,6-pyrenylene, unsubstituted or substituted 1,8-pyrenylene, unsubstituted or substituted 2,5-furanylene, unsubstituted or substituted 3,4-furanylene, unsubstituted or substituted 2,3-furanylene, unsubstituted or substituted 2,5-thiofuranylene, unsubstituted or substituted 3,4-thiofuranylene, unsubstituted or substituted 2,3-thiofuranylene, unsubstituted or substituted 2,5-oxazolylene, unsubstituted or substituted 2,7-fluorenylene, unsubstituted or substituted 2,5-benzofuranylene, unsubstituted or substituted 2,7-benzofuranylene, unsubstituted or substituted 5,7-benzofuranylene, unsubstituted or substituted 5,7-[1,3-benzoxazole], unsubstituted or substituted dithieno[3,2-b:2',3'-d]thiophene, and unsubstituted or substituted 2,7-xanthenylene. In some embodiments, each occurrence of $Ar^1$, $Ar^2$, and $Ar^3$ (when present) is independently 1,3-phenylene or 1,4-phenylene.

In the bis(aryl)acetal structure above, $R^1$ and $R^2$ are each independently hydrogen, unsubstituted or substituted $C_{1-18}$ linear or branched alkyl (e.g., methyl, ethyl, 1-propyl, 2-propyl, 1-butyl, 2-butyl, 1methyl-2-propyl, diphenylmethyl, 2-phenylpropan-2-yl, 1,1-diphenylethan-1-yl, and triphenylmethyl), unsubstituted or substituted $C_{3-20}$ cycloalkyl (e.g., cyclopentyl, cyclohexyl, 1-norbornyl, 1-adamantlyl, 2-methylbicyclo[2.2.1]heptan-2-yl, 2-methyladamantan-2-yl); unsubstituted or substituted $C_{6-18}$ aryl (e.g., phenyl, 1-naphthyl, 2-naphthyl, anthracenyl), or unsubstituted or substituted $C_{3-18}$ heteroaryl (e.g., 2-imidazolyl, 4-imidazolyl, 2-pyridyl, 3-pyridyl, 4-pyridyl); and $R^1$ and $R^2$ are optionally covalently linked to each other to form a ring that includes

—$R^1$—C—$R^2$—.

In some embodiments, at least one of $R^1$ and $R^2$ is hydrogen or methyl. In some embodiments, $R^1$ is hydrogen, and $R^2$ is selected from phenyl, ortho-methoxyphenyl, meta-methoxyphenyl, and para-methoxyphenyl. In some embodiments, $R^1$ is hydrogen and $R^2$ is unsubstituted or substituted phenyl. When $R^2$ is substituted phenyl, it can be substituted with a hydroxyl group, an acetal group, an ester group (including a lactone), or other such group that would be incompatible with polyacetal formation via acetal-generating polycondensation or would cause undesired polymer crosslinking. As described in a co-filed application, the present inventors have determined that such groups are tolerated in the Suzuki polycondensation reaction in which polyacetals are synthesized from the bis(aryl)acetal. Two specific examples of bis(aryl)acetal compounds in which $R^1$ and $R^2$ are covalently linked to each other to form a ring that includes

—$R^1$—C—$R^2$—

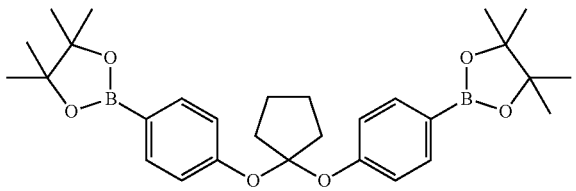

are

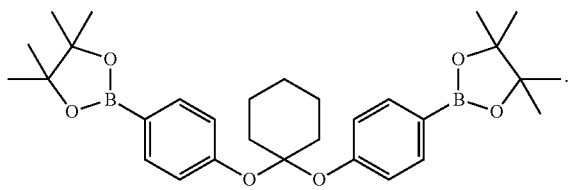

Specific examples of bis(aryl)acetals include

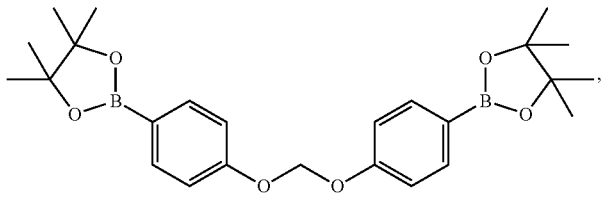

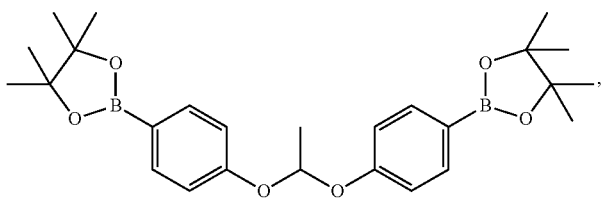

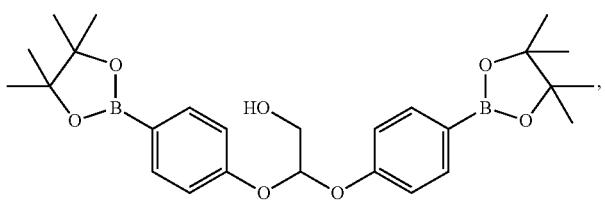

-continued
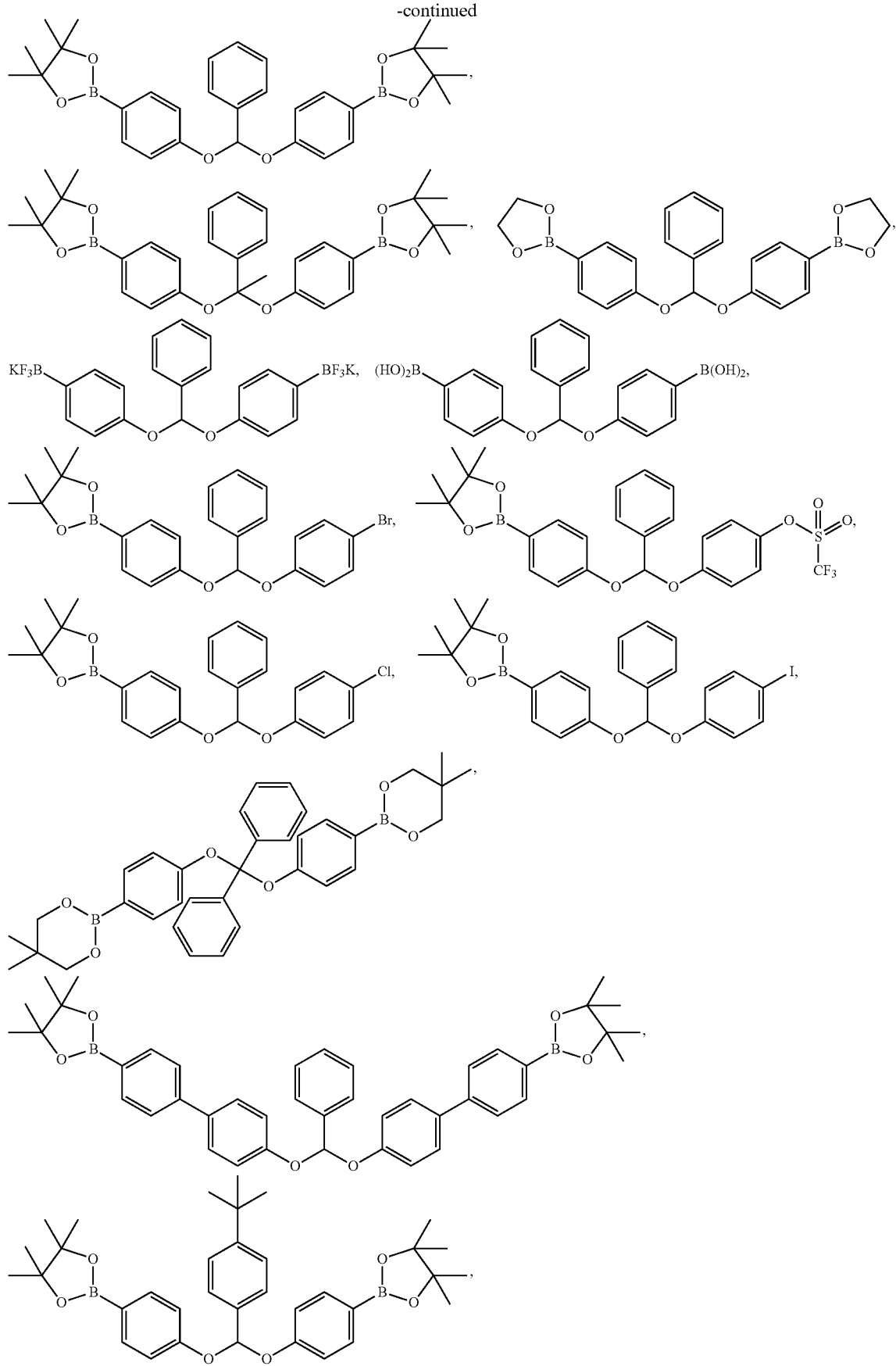

-continued
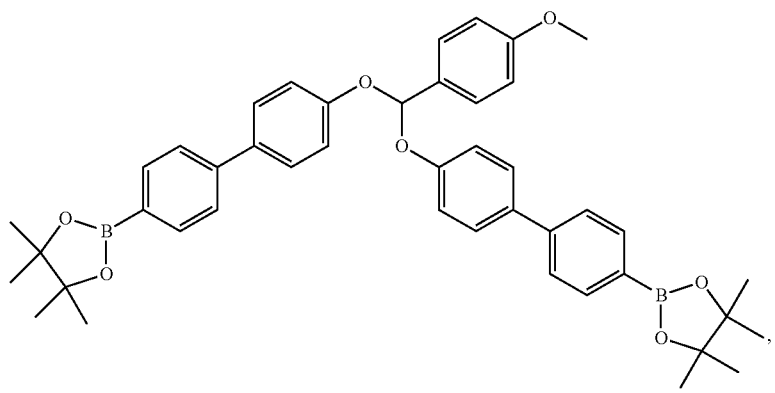
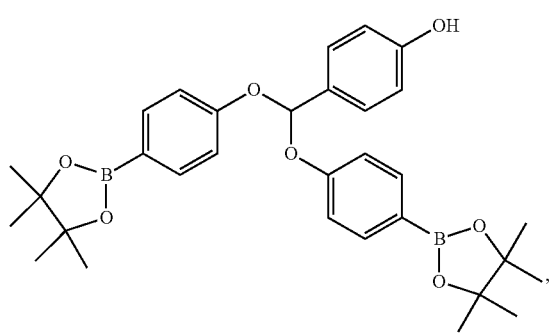
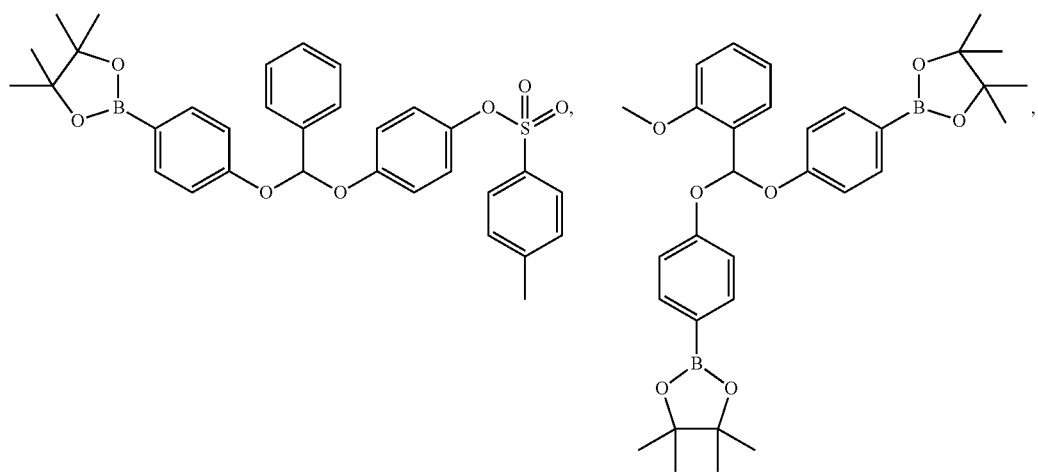
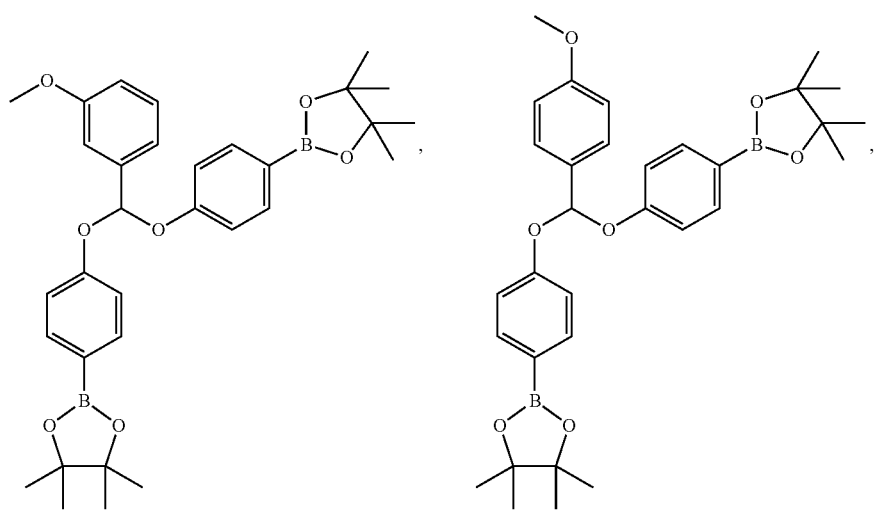

-continued
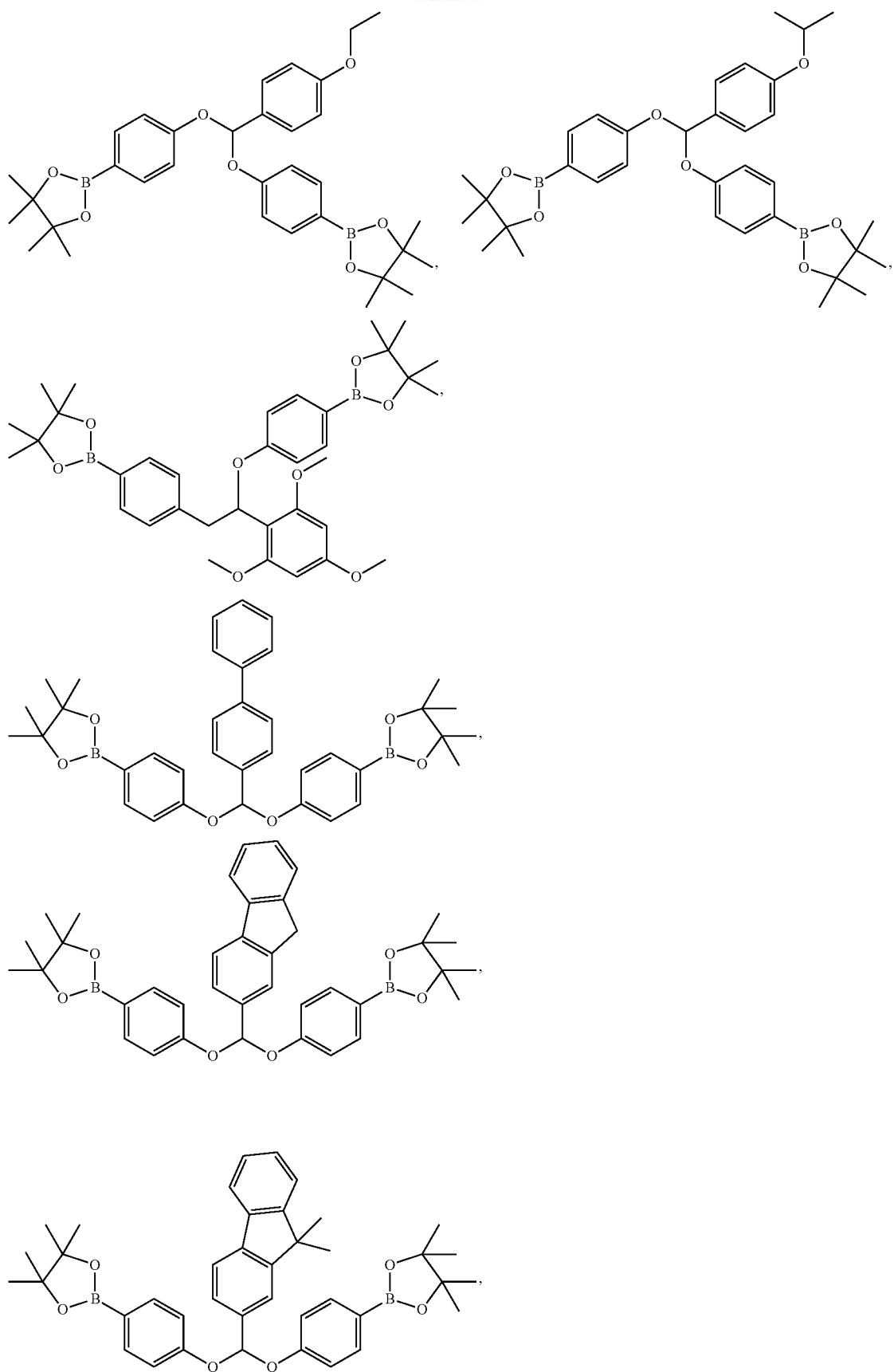

-continued
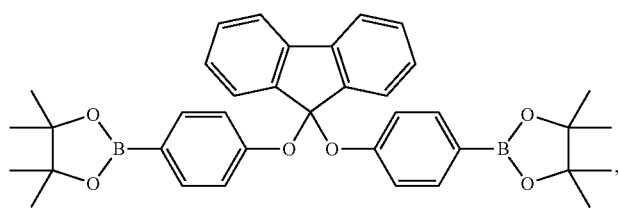
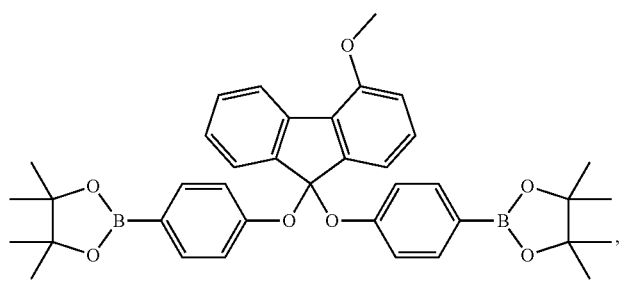
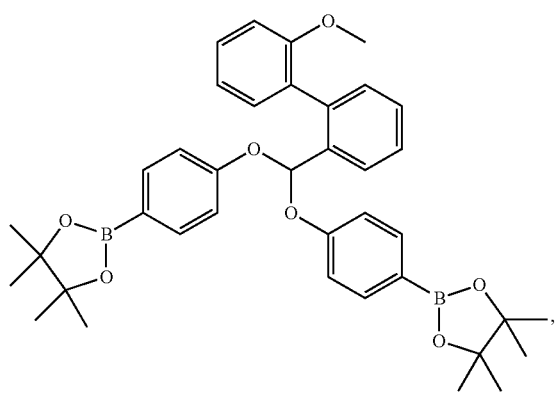
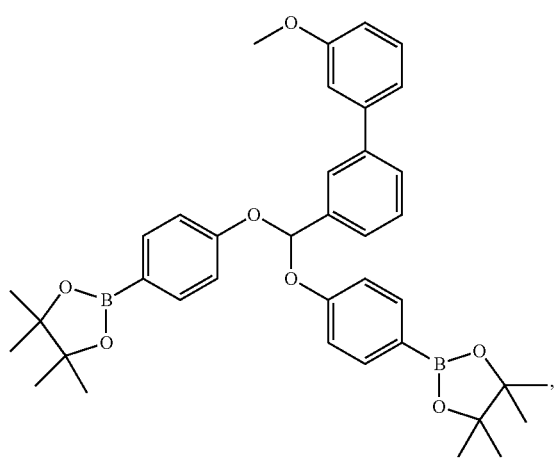
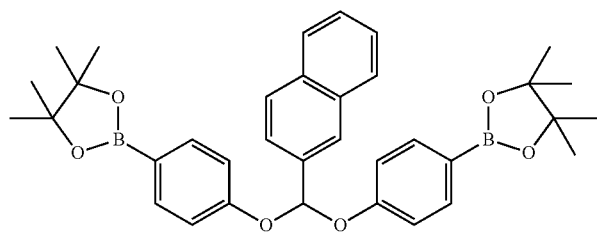

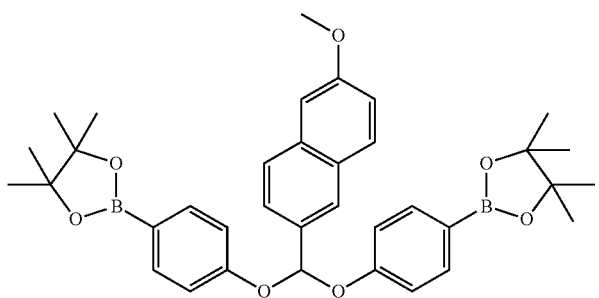
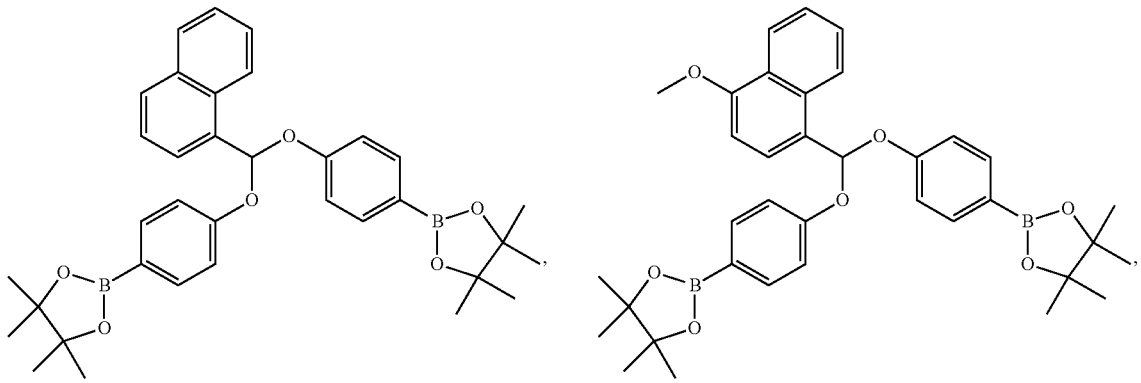
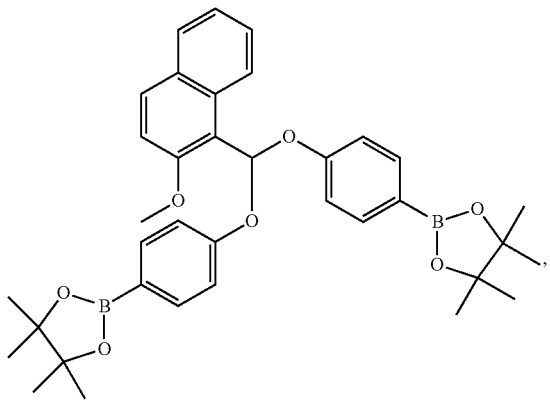
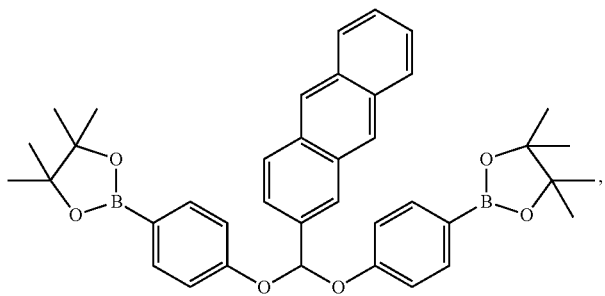

-continued
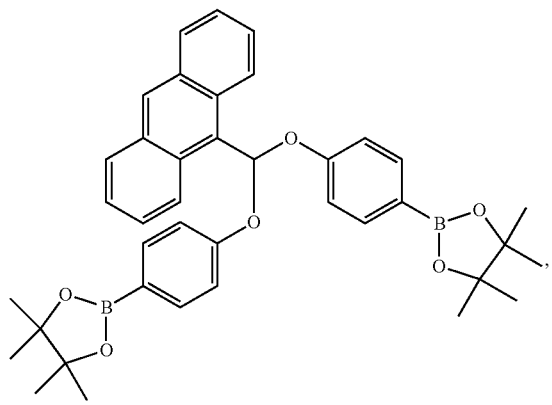
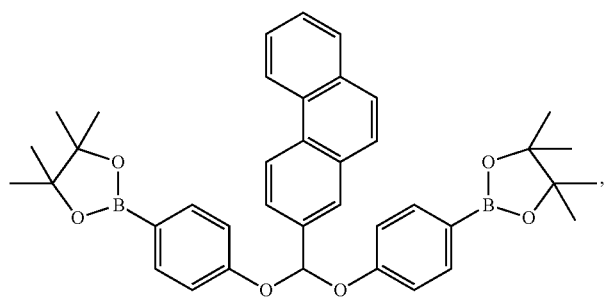
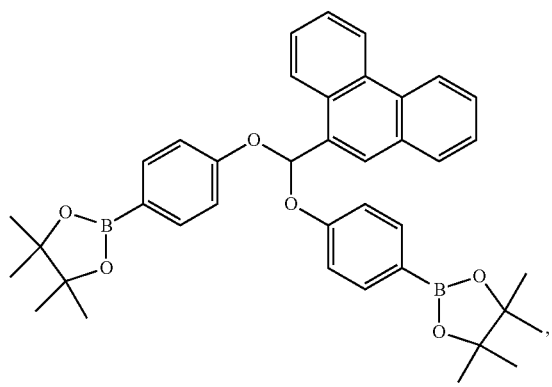
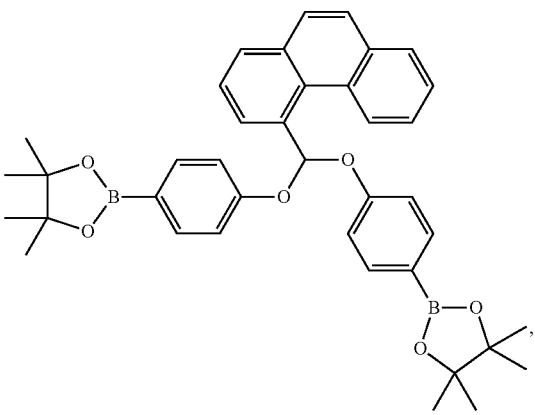
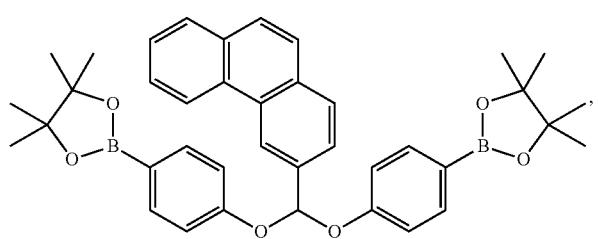
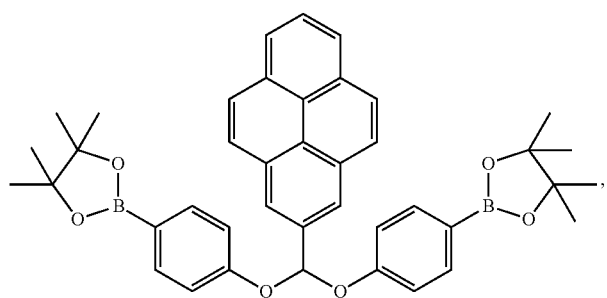

-continued
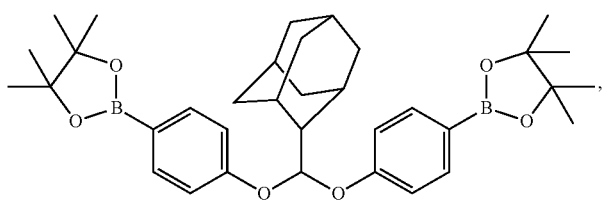
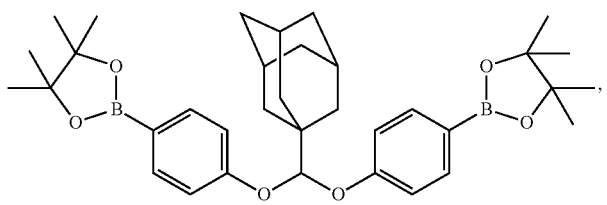
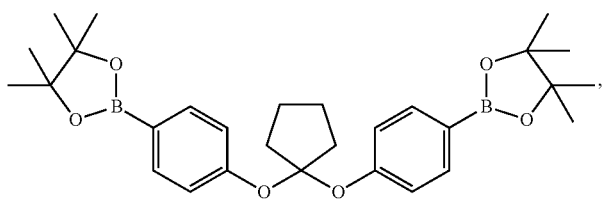
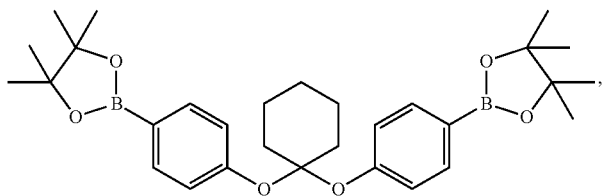
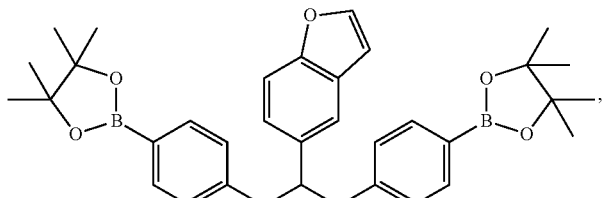
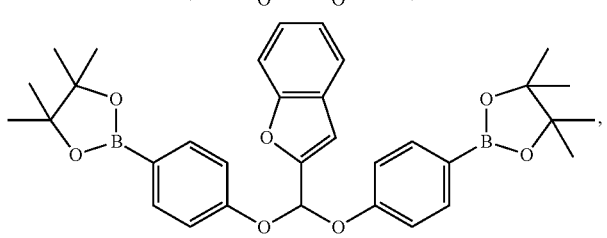
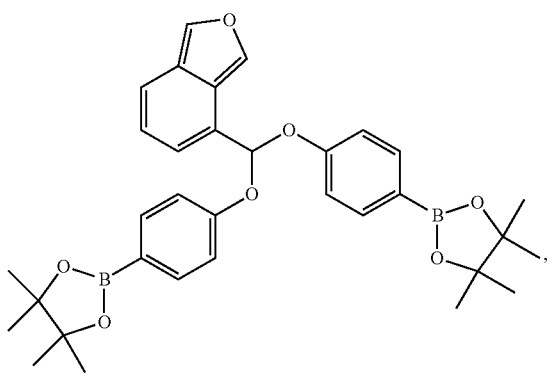
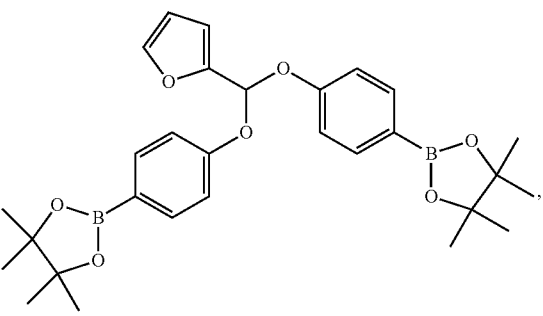

-continued
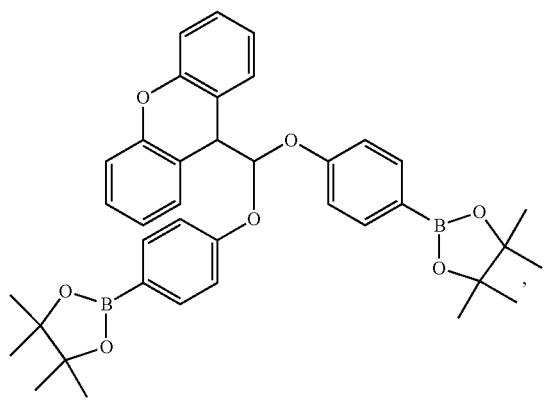
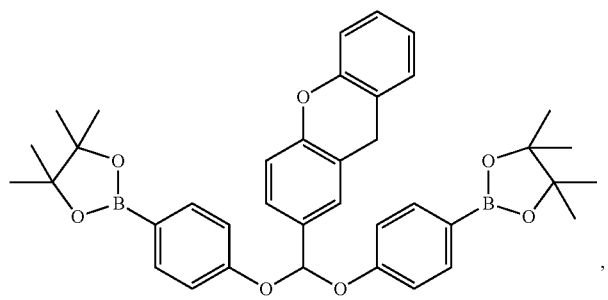
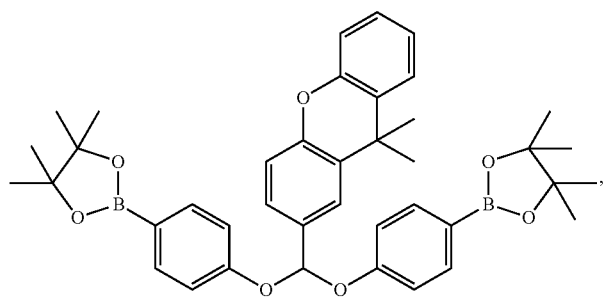
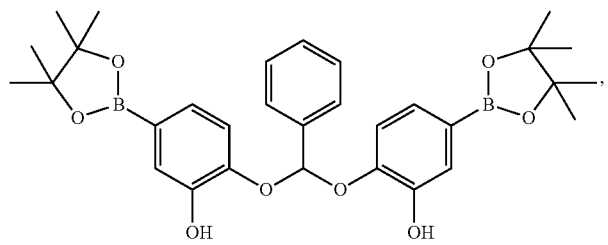
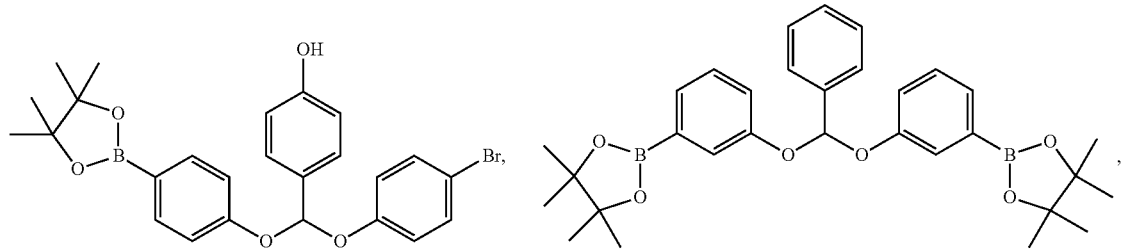
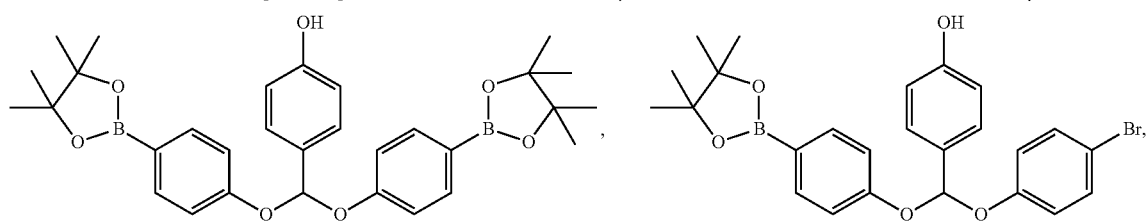

-continued
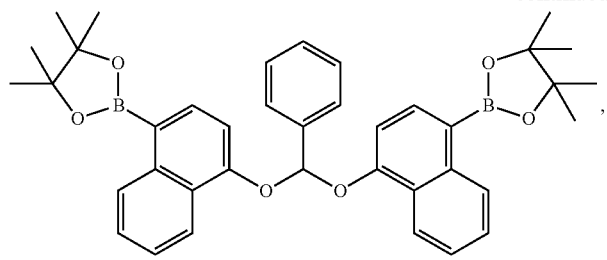
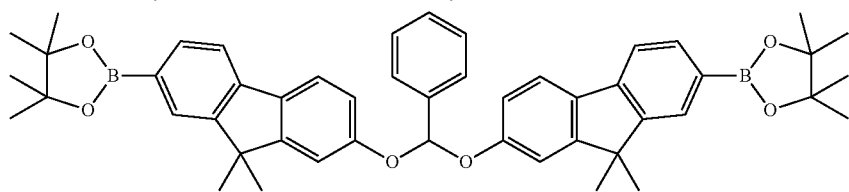
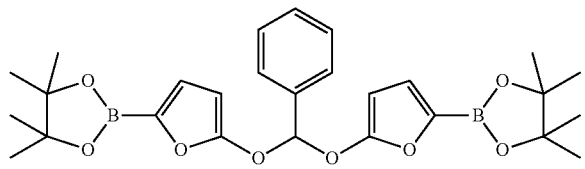
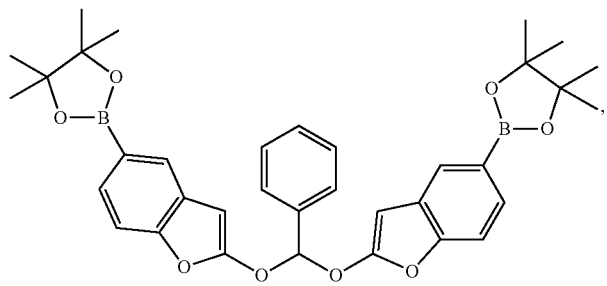
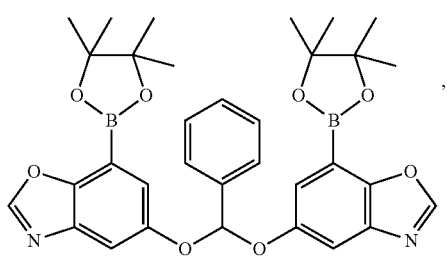
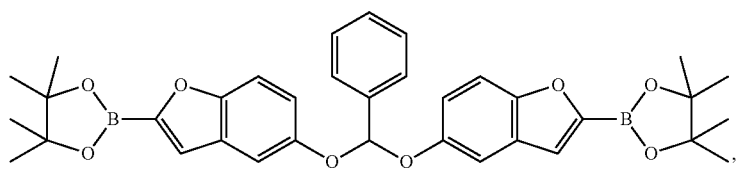
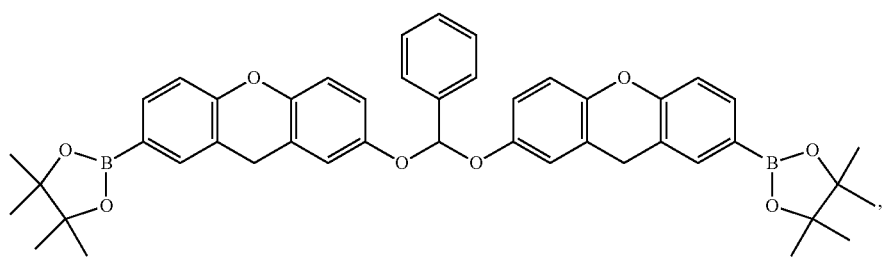
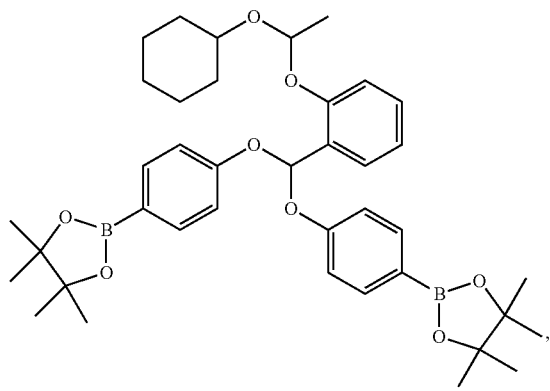
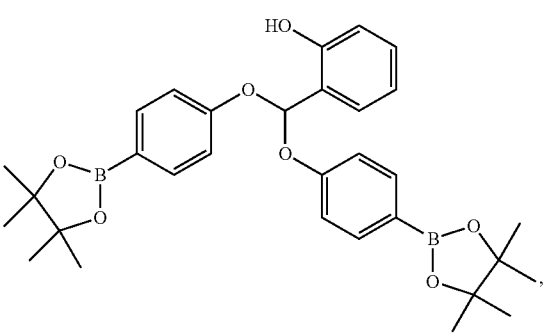

-continued
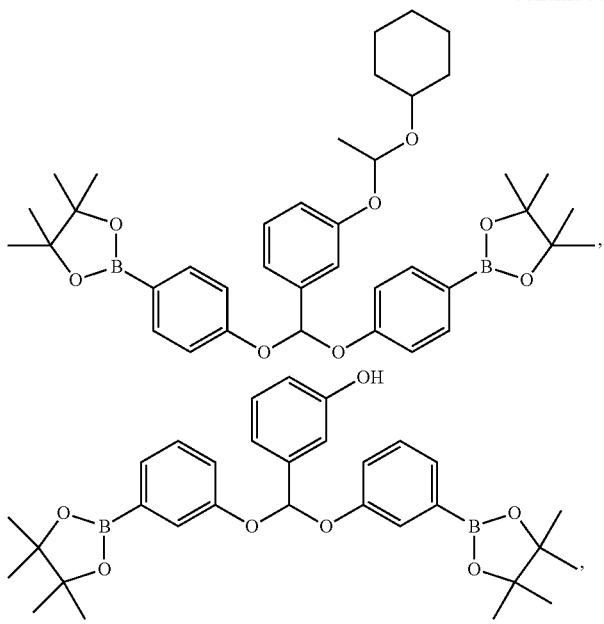
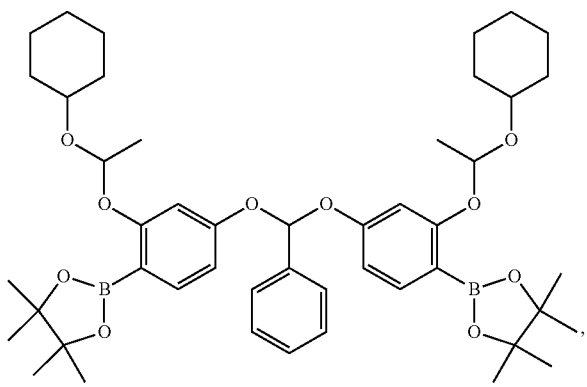
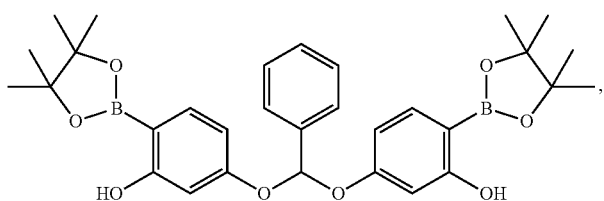
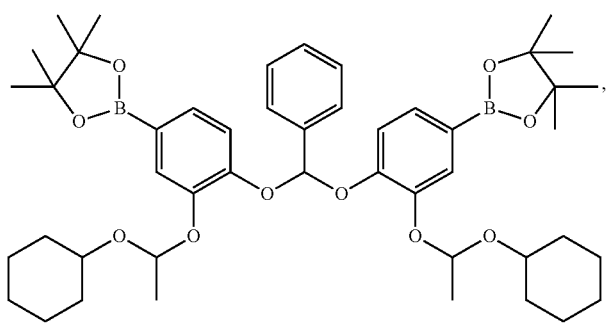

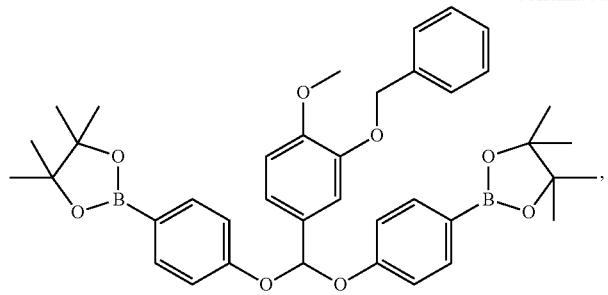
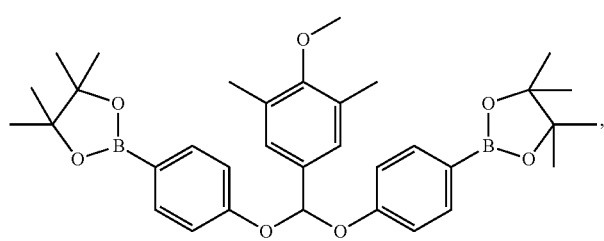
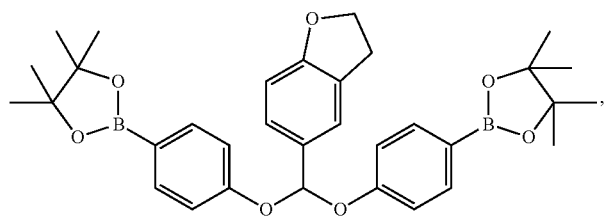
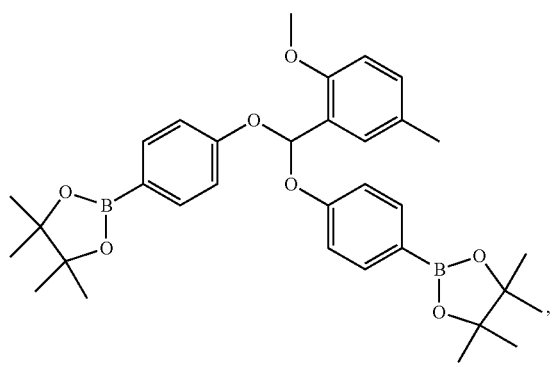
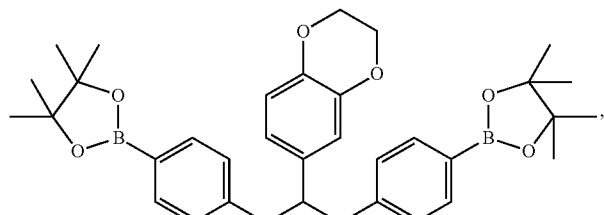
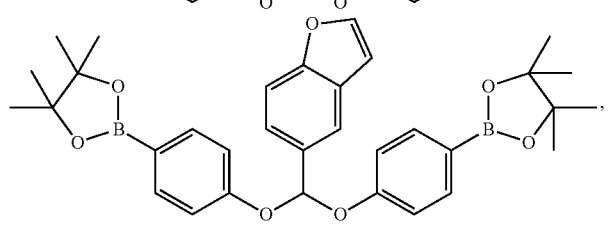

-continued
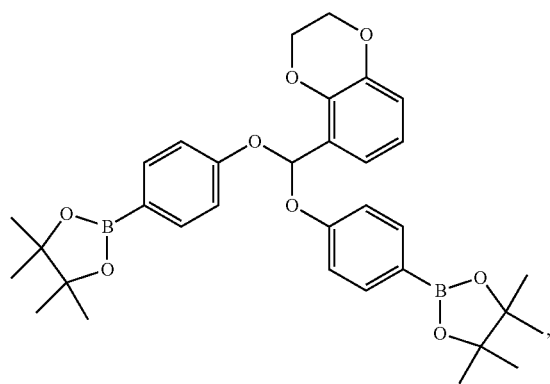
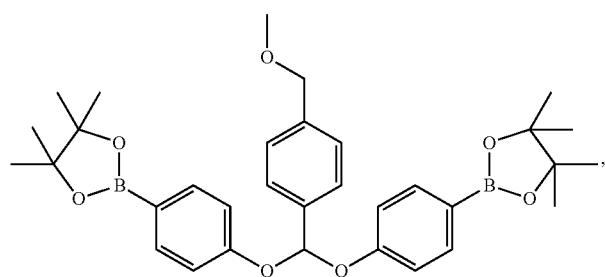
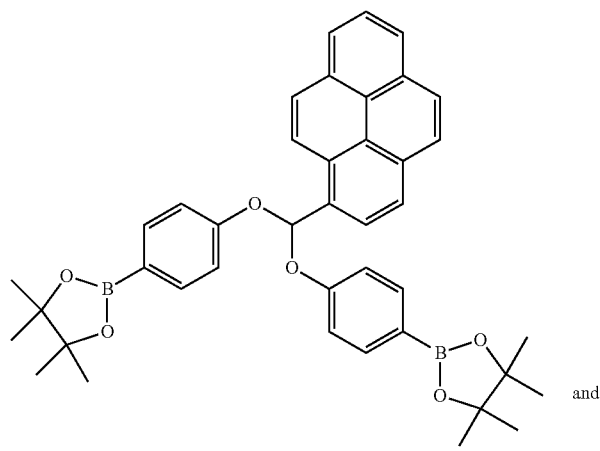 and

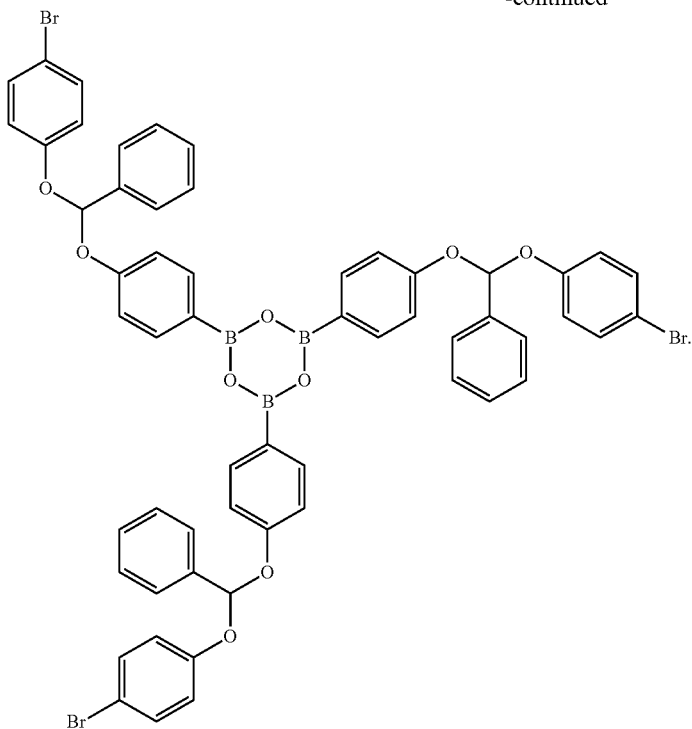
Examples of X—Ar$^a$—X, B$_x$—Ar$^3$—B$_x$, and B$_x$—Ar$^3$—X include
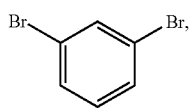
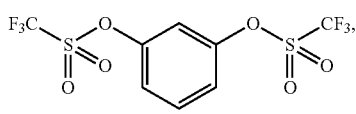
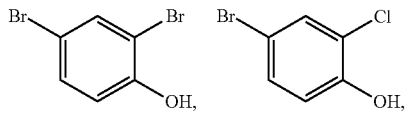
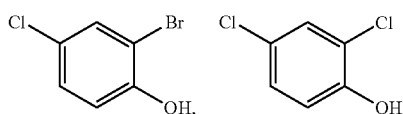
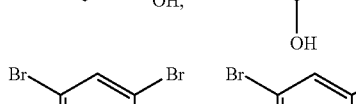
-continued
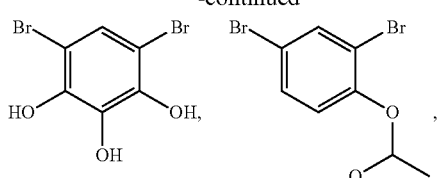
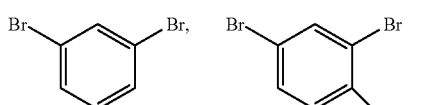
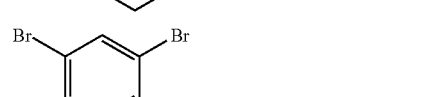
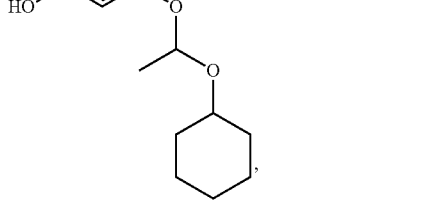

-continued
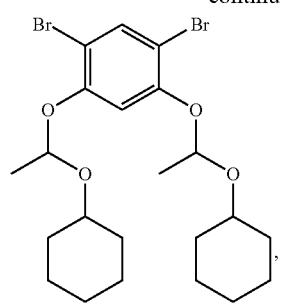
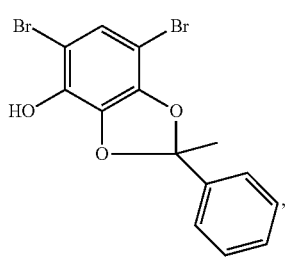
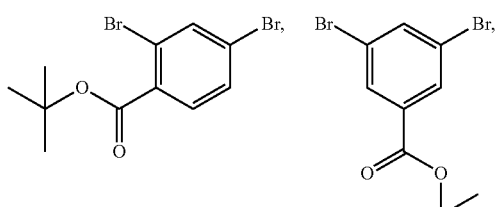
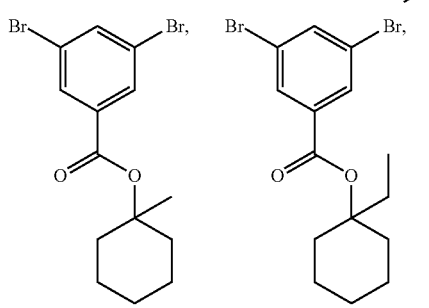
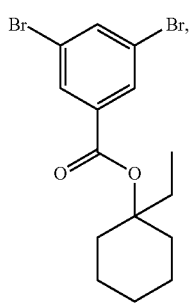
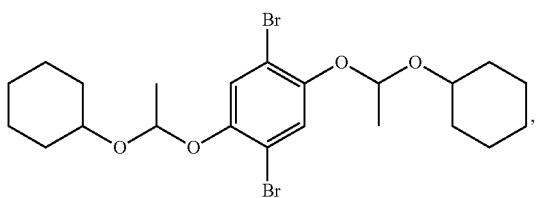
-continued
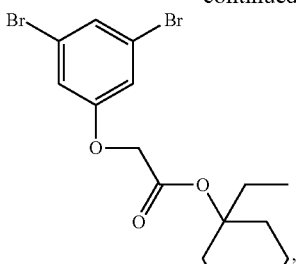
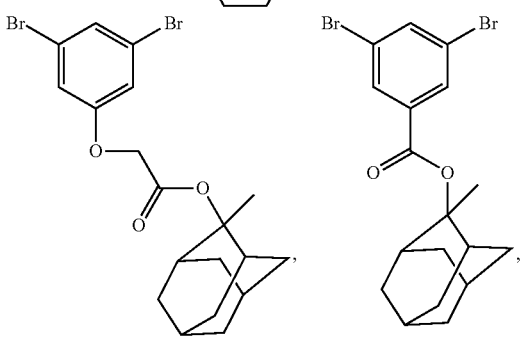
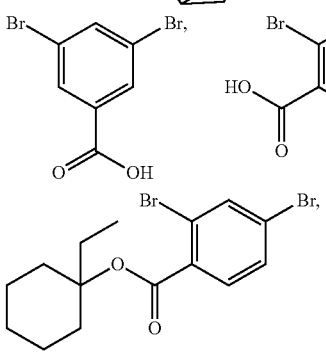
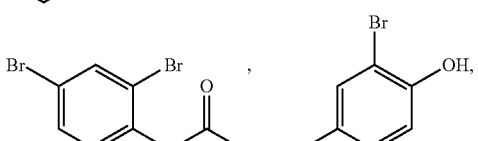
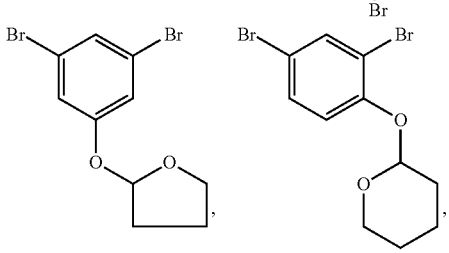
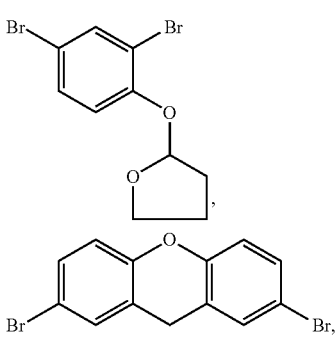

-continued
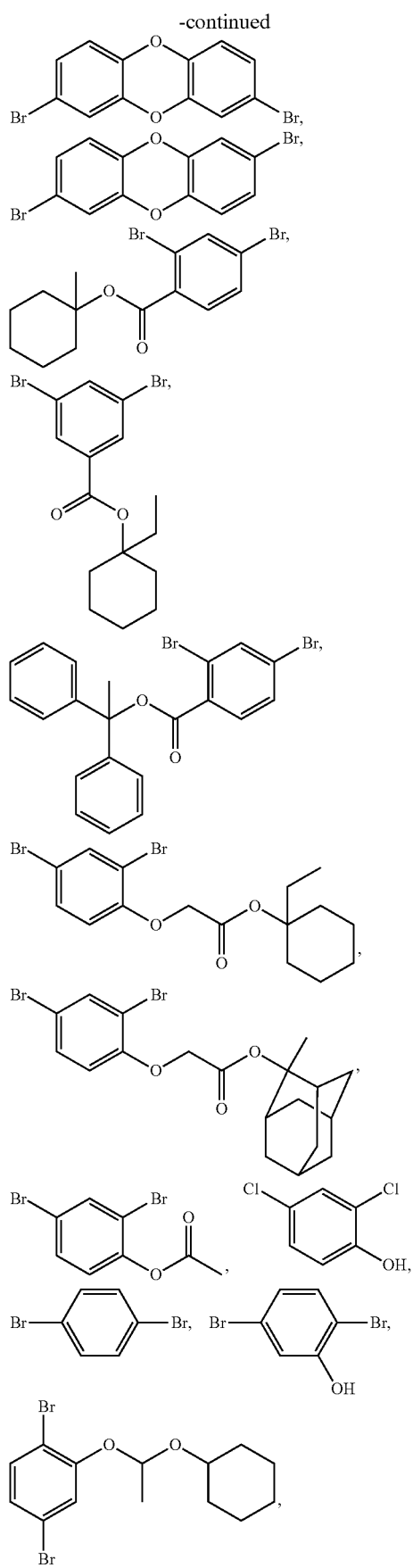
-continued
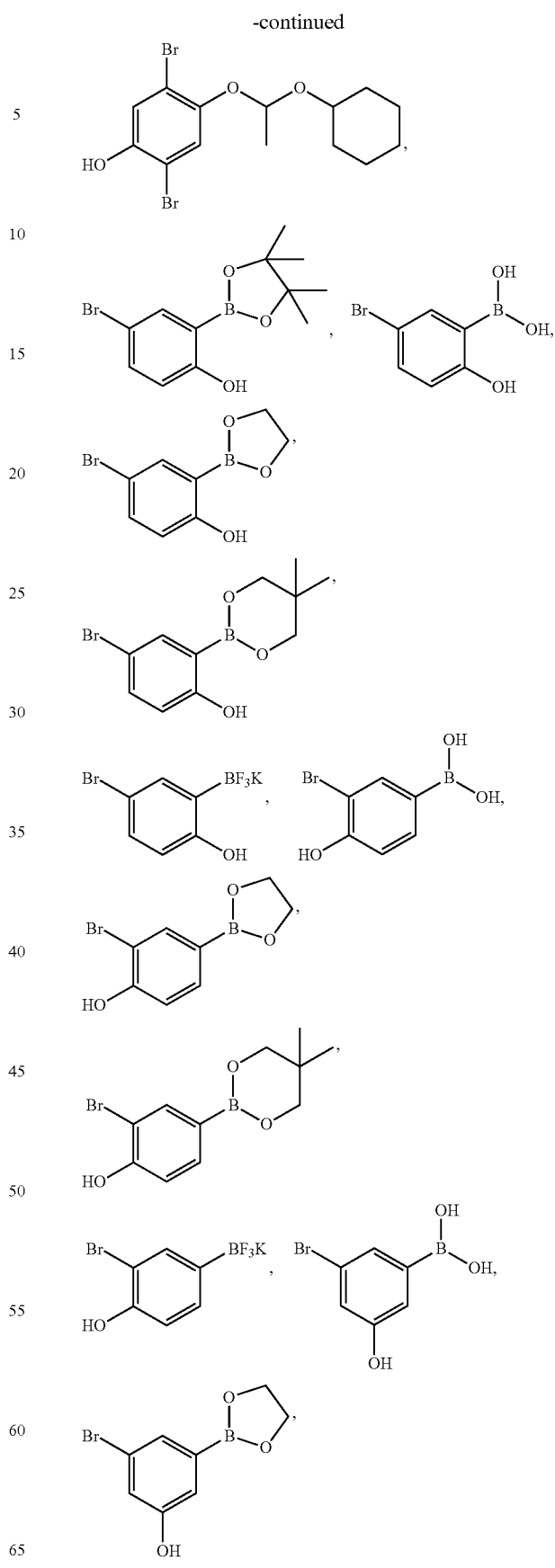

-continued
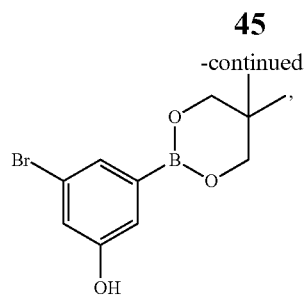
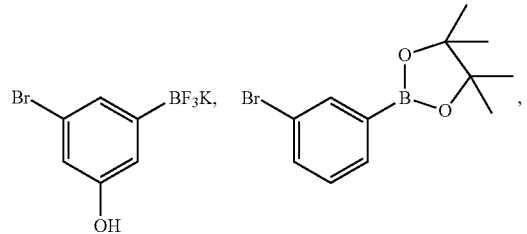
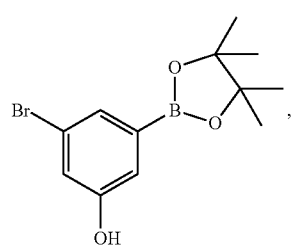
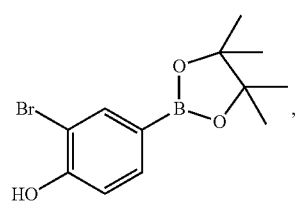
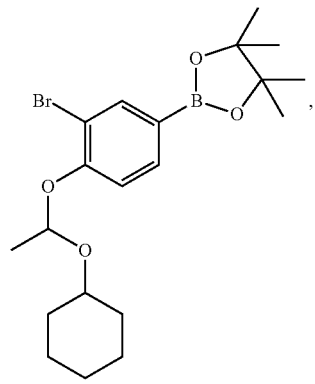
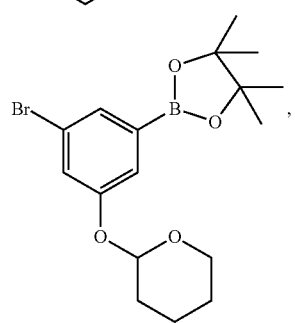
-continued
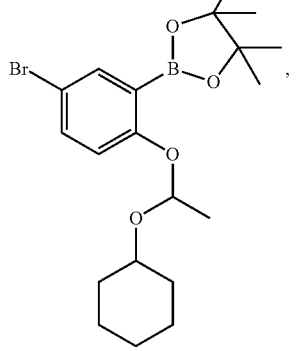
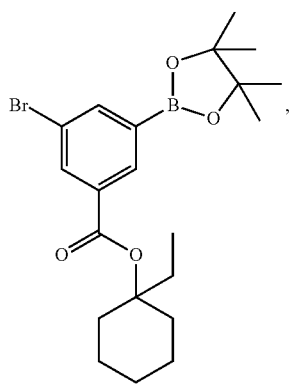
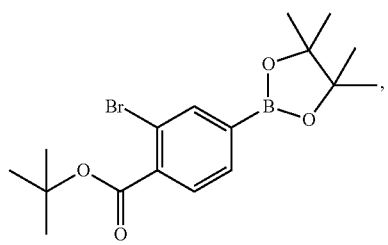
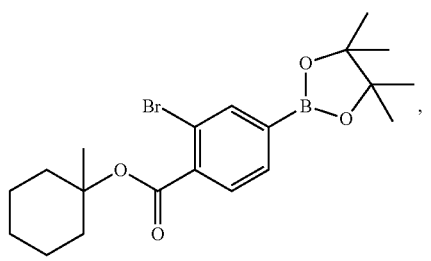
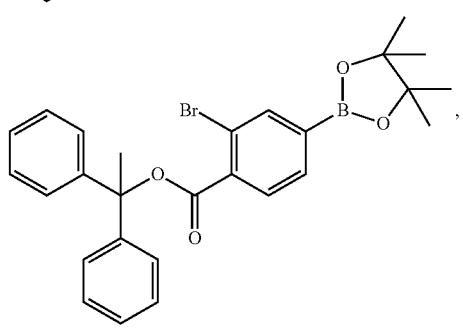

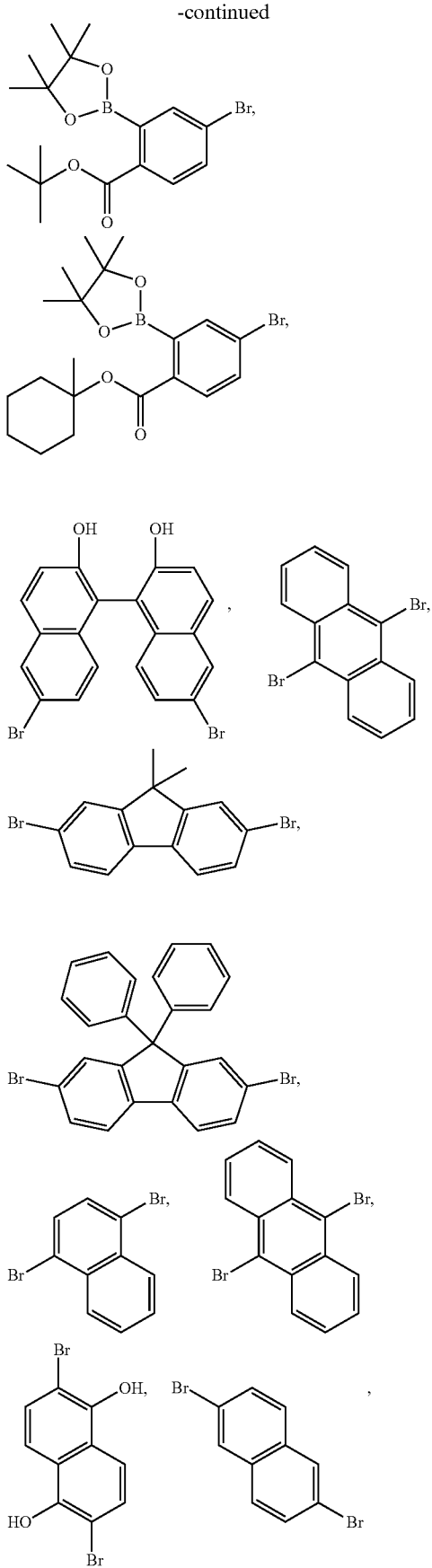
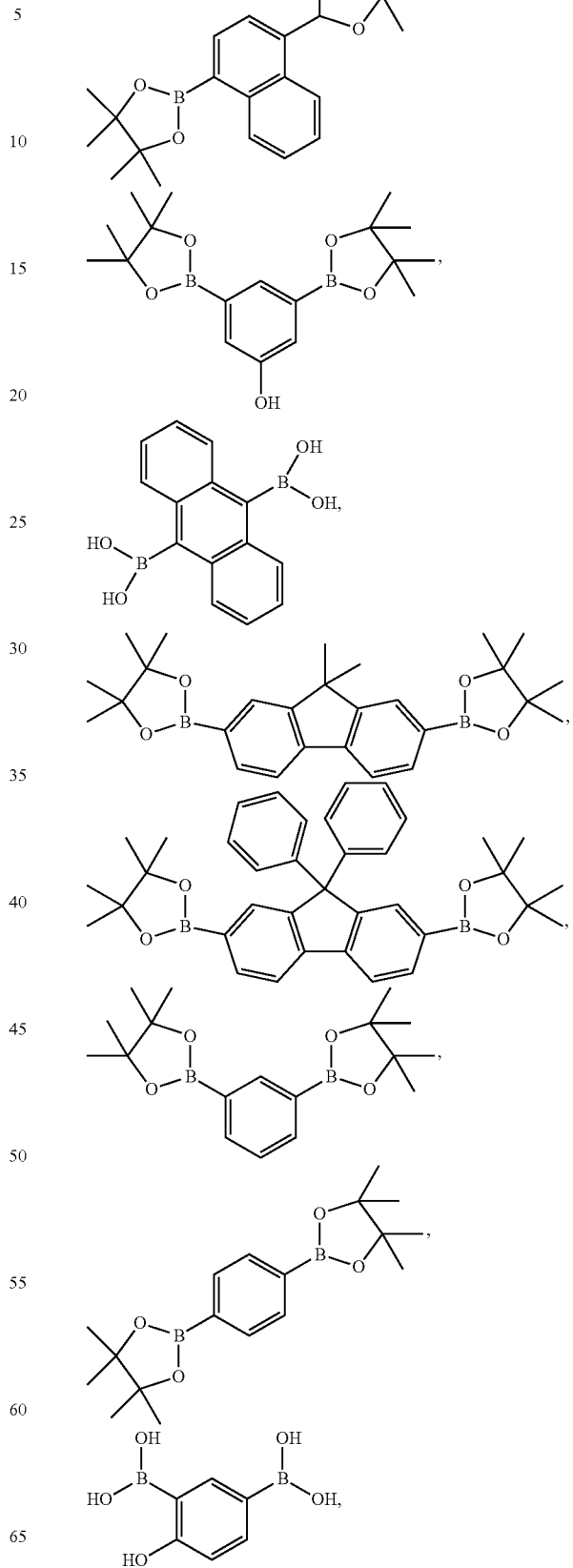

-continued
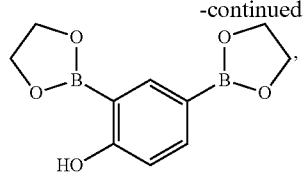
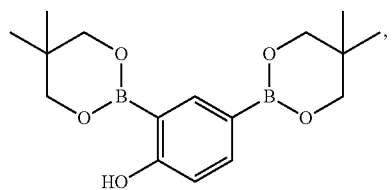
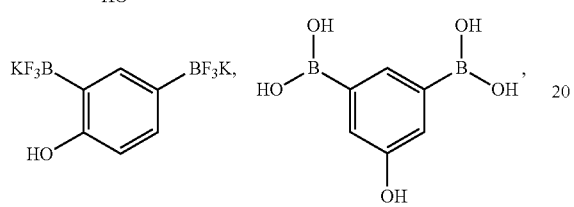
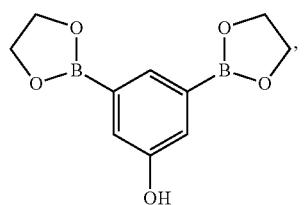
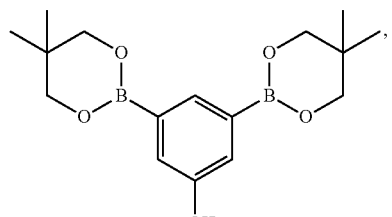
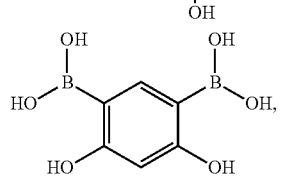
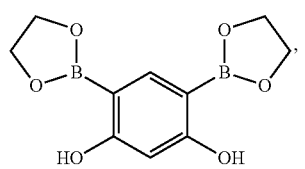
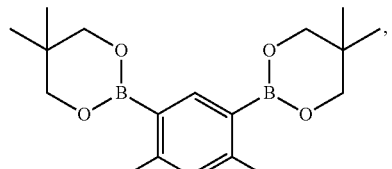
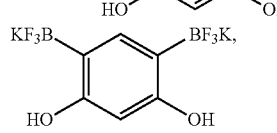
-continued
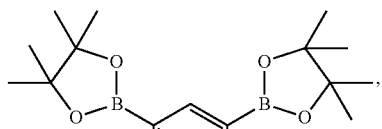
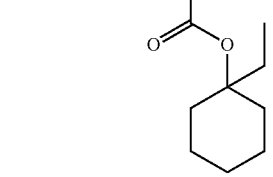
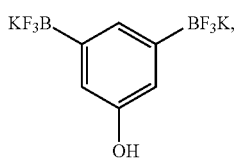
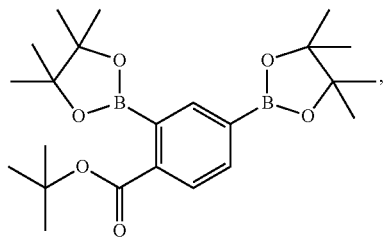
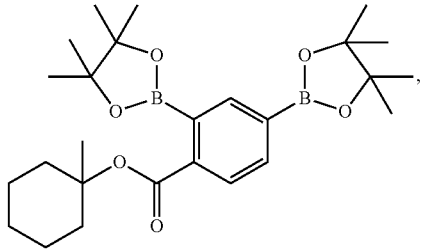
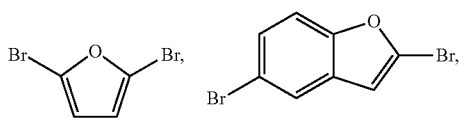
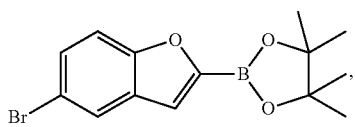
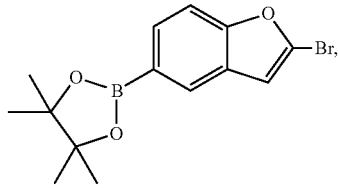
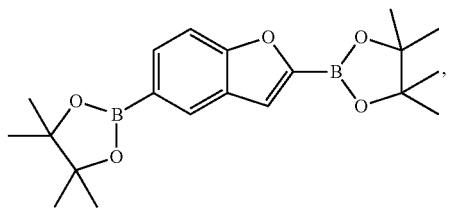

-continued

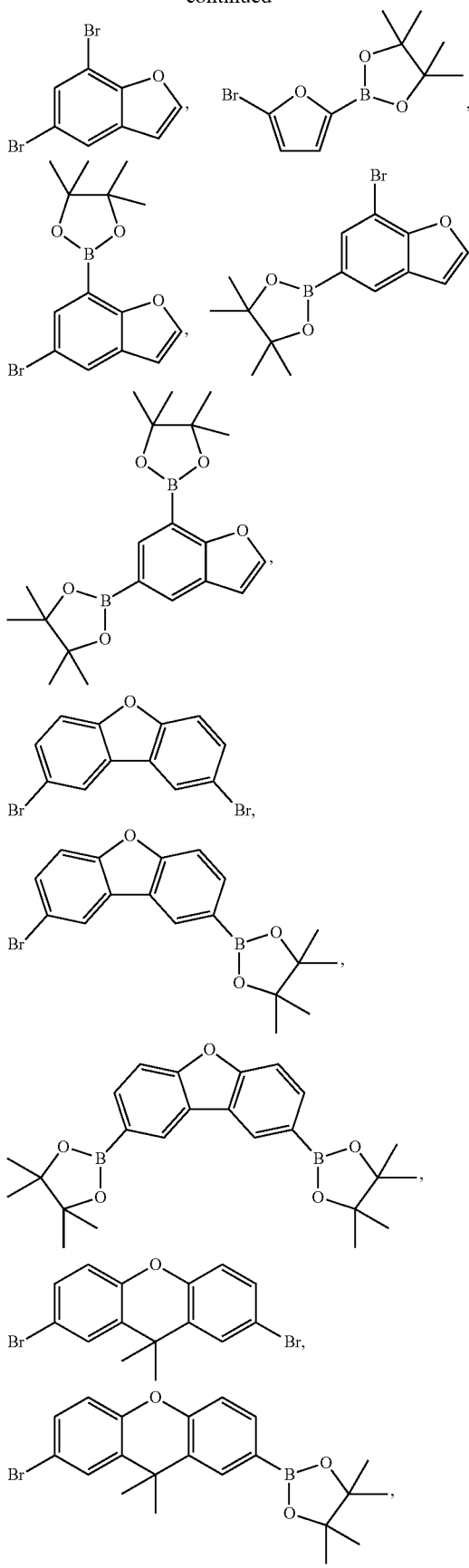

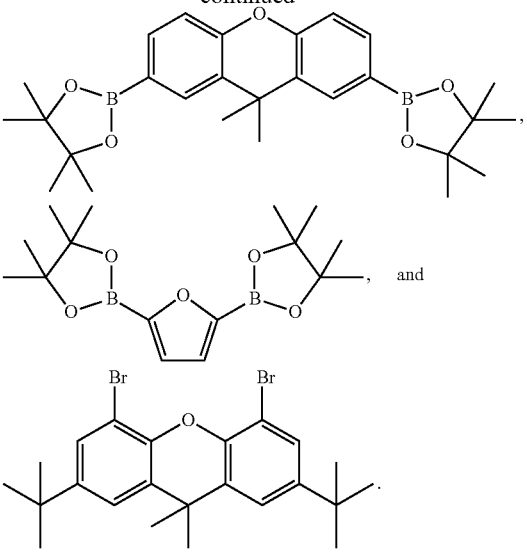

In a very specific embodiment of the bis(aryl)acetal structure above, Y is $B^x$; each occurrence of $B^x$ is

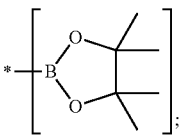

$Ar^1$ and $Ar^2$ are 1,4-phenylene; $R^1$ is hydrogen; and $R^2$ is phenyl.

Synthesis of the bis(aryl)acetal is described in co-filed U.S. patent application Ser. No. 13/943,232, filed Jul. 16, 2013.

The method utilizes a catalyst to polymerize the bis(aryl) acetal, optionally in combination with the bis(leaving group) arylene. In general, the catalyst is a Suzuki coupling catalyst. Reviews of Suzuki polycondensation and resulting polymers have been published by Schlüter et al. in *Macromol. Rapid Commun.* 2009, 30, 653 and *J. Polym. Sci. Part A. Polym. Chem.* 2001, 39, 1533. The present inventors have determined that particularly active catalysts for polymerization include those having the structure

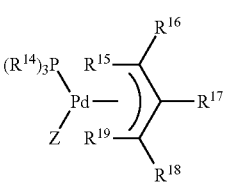

wherein each occurrence of $R^{14}$ is independently unsubstituted or substituted $C_{1-18}$ linear or branched alkyl, unsubstituted or substituted $C_{3-18}$ cycloalkyl, unsubstituted or substituted $C_{6-18}$ aryl, or unsubstituted or substituted ferrocenyl; $R^{15}$, $R^{16}$, $R^{17}$, $R^{18}$, $R^{19}$ are, independently, hydrogen, $C_{1-6}$ linear or branched alkyl, $C_{3-6}$ cycloalkyl, or phenyl; and Z is selected from the group consisting of fluorine, chlorine, bromine, iodine, cyano (—CN), cyanate (—OCN), isocyanate (—NCO), thiocyanate (—SCN), isothiocyanate (—NCS), nitro (—$NO_2$), nitrite (—ON=O), azide (—N=$N^+$=$N^-$), and hydroxyl. Methods of preparing such catalysts are described in C. C. C. Johansson Seechurn, S. L. Parisel, and T. J. Calacot, *J. Org. Chem.* 2011, 76, 7918-7932, where the catalysts are used for bimolecular coupling. In a very specific embodiment of the method, in the bis(aryl)acetal structure, $Y^1$ and $Y^2$ are each $B^x$, each occurrence of $B^x$ is

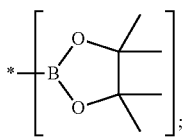

$Ar^1$ and $Ar^2$ are 1,4-phenylene; $Ar^3$ is 1,3-phenylene substituted with hydroxyl or an acetal, —O—C(H)($R^5$)—$OR^6$, wherein $R^5$ is methyl and $R^6$ is cyclohexyl; $R^1$ is hydrogen; $R^2$ is phenyl, ortho-methoxyphenyl, meta-methoxyphenyl, or para-methoxyphenyl; and in the catalyst structure above, each occurrence of $R^{14}$ is t-butyl; $R^{15}$ is methyl; $R^{16}$, $R^{17}$, $R^{18}$, and $R^{19}$ are hydrogen; and Z is chlorine.

The concentration of the catalyst can vary depending on factors including the bis(aryl)acetal structure, the catalyst structure, and the polymerization reaction temperature, but the mole ratio of catalyst to bis(aryl)acetal is generally $1\times10^{-6}$:1 to 0.05:1, specifically $1\times10^{-5}$:1 to 0.01:1, more specifically $1\times10^{-4}$:1 to 0.005:1.

In addition to the catalyst, a base is used in the polymerization reaction. A wide variety of bases can be employed, as long as they do not decompose the catalyst or the bis(aryl) acetal. Suitable bases include carbonate salts (such as lithium carbonate, sodium carbonate, potassium carbonate, rubidium carbonate, cesium carbonate, ammonium carbonate, and substituted ammonium carbonates, as well as the corresponding hydrogen carbonate salts), phosphate salts (including lithium phosphate, sodium phosphate, potassium phosphate, rubidium phosphate, cesium phosphate, ammonium phosphate, and substituted ammonium phosphates, as well as the corresponding hydrogen phosphate salts), and acetate salts (including lithium acetate, sodium acetate, potassium acetate, rubidium acetate, cesium acetate, ammonium acetate, and substituted ammonium acetates).

Suitable bases further include carboxylic acid salts (other than acetate salts) such as salts of formate, fluoroacetate, and propionate anions with lithium, sodium, potassium, rubidium, cesium, ammonium, and substituted ammonium cations; metal dihydroxides such as magnesium dihydroxide, calcium dihydroxide, strontium dihydroxide, and barium dihydroxide; metal trihydroxides such as aluminum trihydroxide, gallium trihydroxide, indium trihydroxide, thallium trihydroxide; non-nucleophilic organic amines such as triethylamine, N,N-diisopropylethylamine (Hünig's base), 1,4-diazabicyclo[2.2.2]octane (DABCO), 1,5-Diazabicyclo[4.3.0]non-5-ene (DBN), 1,8-Diazabicyclo[5.4.0]undec-7-ene (DBU); bis(silyl)amide salts such as the lithium, sodium, and potassium salts of bis(trimethylsilyl)amide; alkoxide salts such as the lithium, sodium, and potassium salts of t-butoxide; and 1,8-bis(dimethylamino)naphthalene (PROTON-SPONGE™).

In some embodiments, the base is selected from potassium carbonate, cesium carbonate, potassium phosphate, sodium acetate, and combinations thereof. In some embodiments, the base comprises potassium phosphate.

The base and particularly hydrophilic bases can, optionally, be employed in the presence of a phase transfer catalyst and/or water and/or an organic solvent.

The base is typically used in an amount of at least one equivalent per equivalent of bis(aryl)acetal. In some embodiments, the base amount is 1 to 10 equivalents per equivalent of bis(aryl)acetal, specifically 2 to 6 equivalents per equivalent of bis(aryl)acetal.

The polymerization reaction can be conducted in a solvent. Suitable solvents include, for example, tetrahydrofuran, 1,4-dioxane, 1,2-dimethoxyethane, methyl t-butyl ether, diethylether, ethanol, propanol, n-butanol, s-butanol, t-butanol, dimethylformamide, toluene, acetonitrile, and combinations thereof. The solvent can further include water to facilitate the dissolution of inorganic salts, if any, or to improve conversion yield.

The polymerization can be conducted over a wide range of temperatures. In some embodiments, the polymerization is conducted at a temperature of 0 to 100° C. Within this range, the polymerization temperature can be 10 to 80° C., specifically 20 to 70° C.

The time required for polymerization can be determined by the skilled person without undue experimentation and will depend on factors including the identity of the bis(aryl)acetal, the identity of the bis(leaving group)arylene (if any), the identity of the catalyst, and the polymerization temperature. In some embodiments, the polymerization time is 30 minutes to 200 hours. Within this range, the polymerization time can be 10 to 100 hours, specifically 20 to 50 hours.

In some embodiments, the substructure

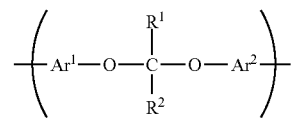

within any of the repeat units

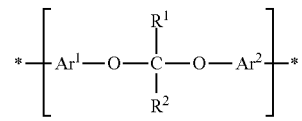

or

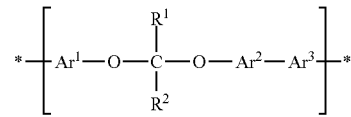

is selected from the group consisting of

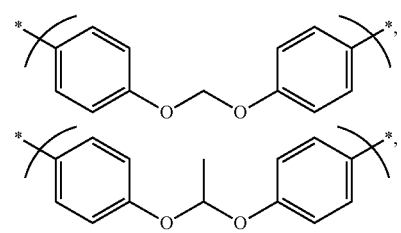

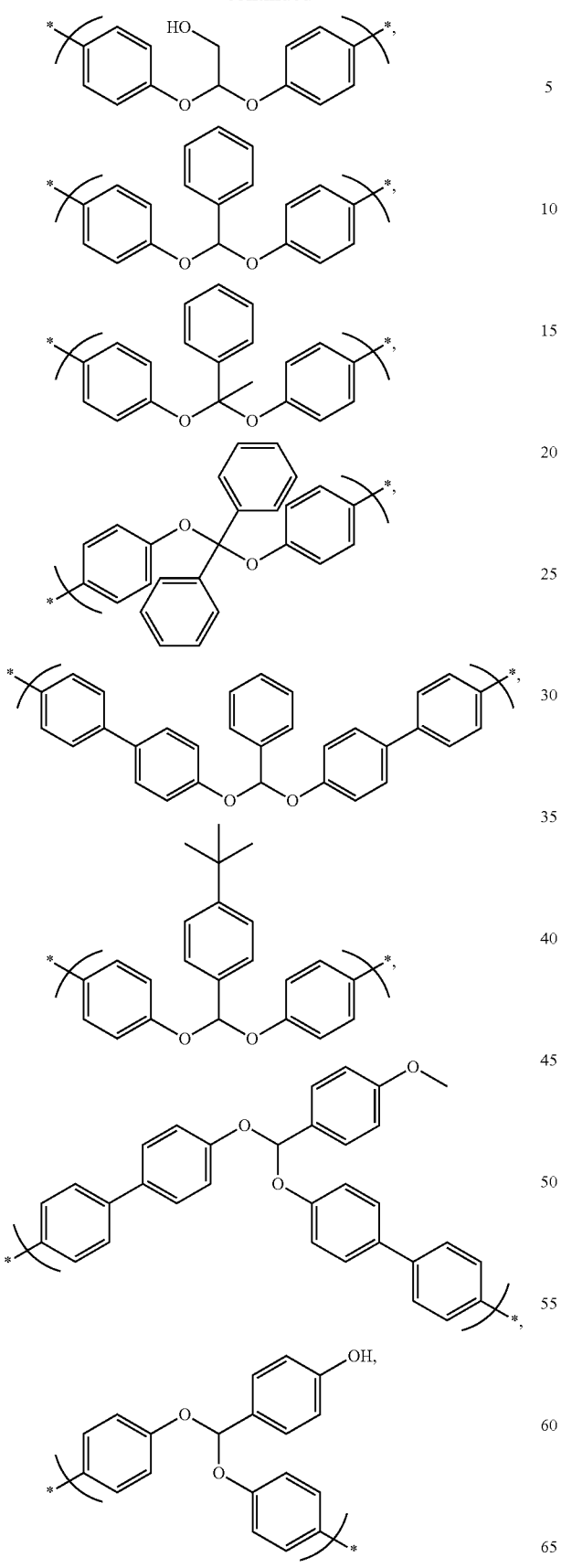
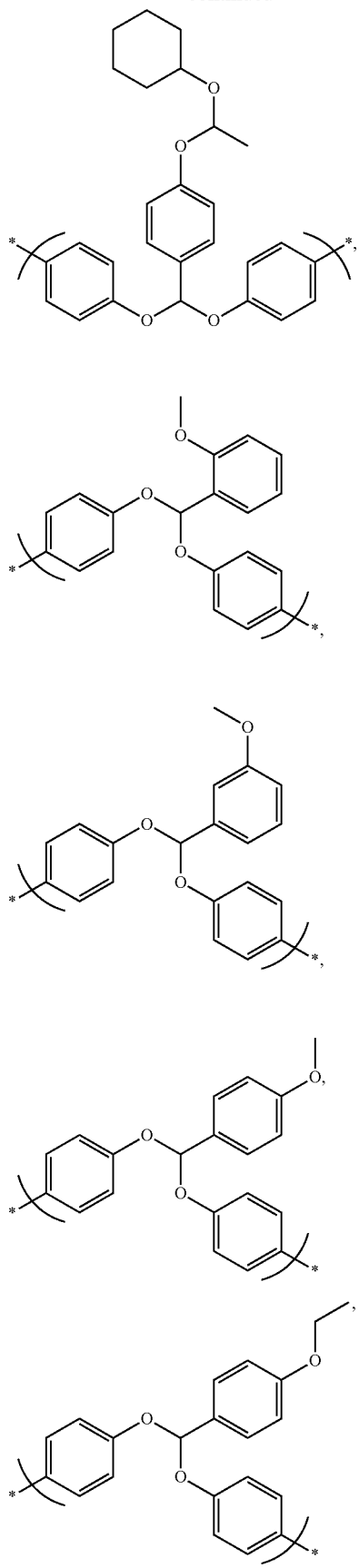

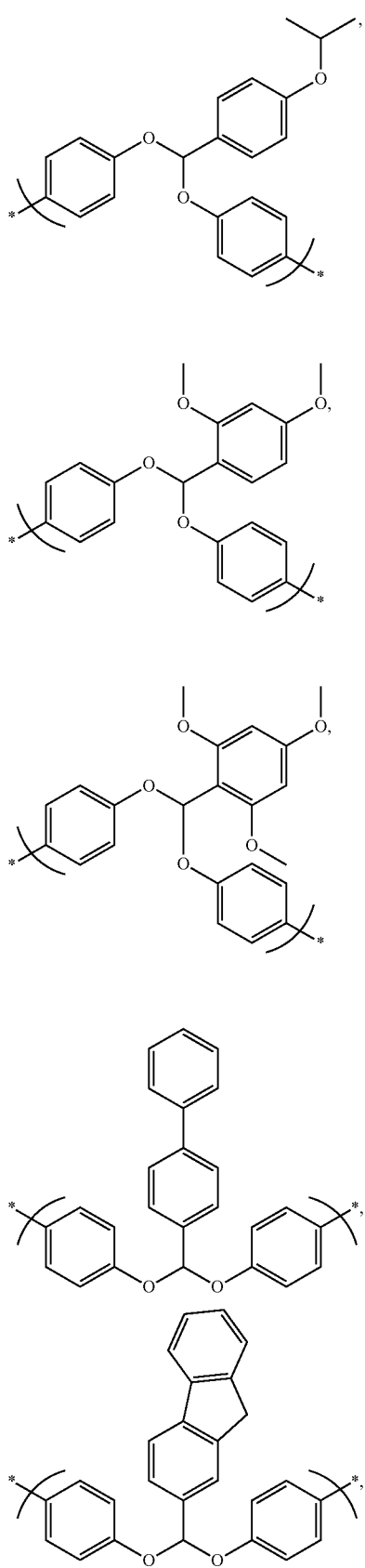
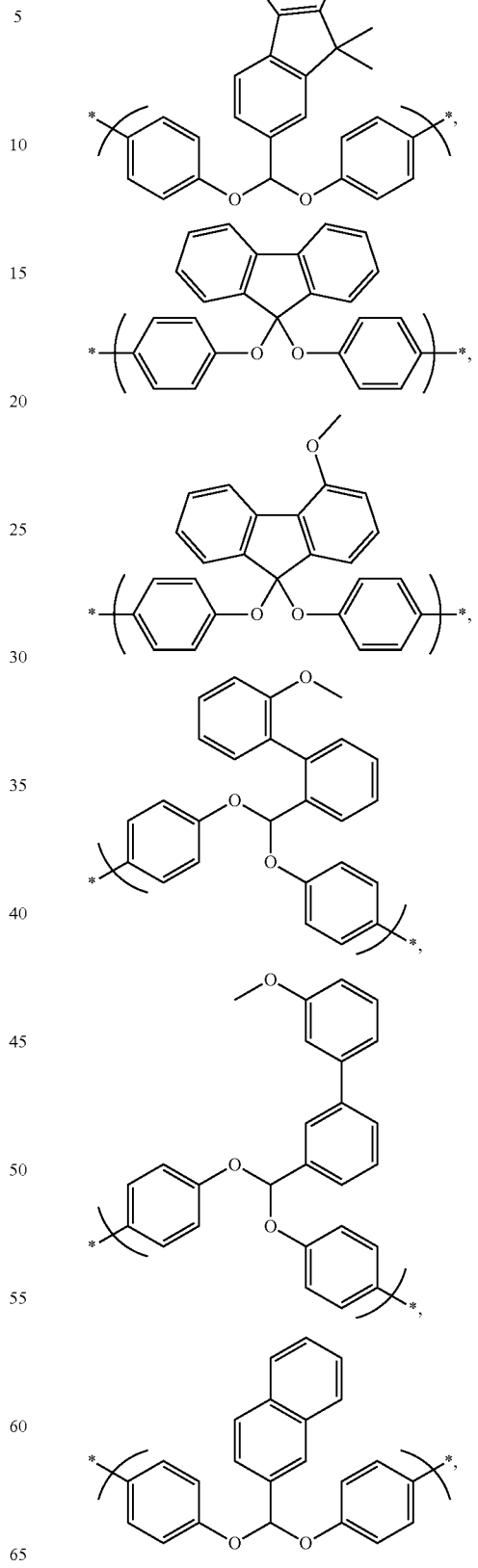

59
-continued
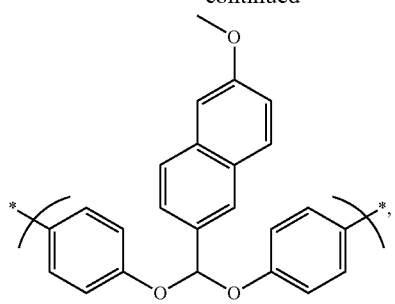
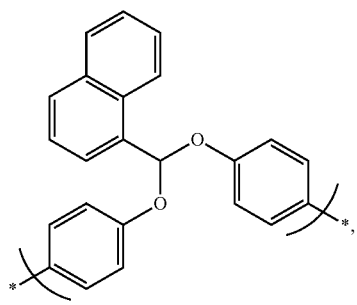
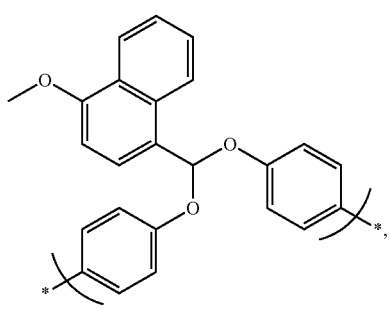
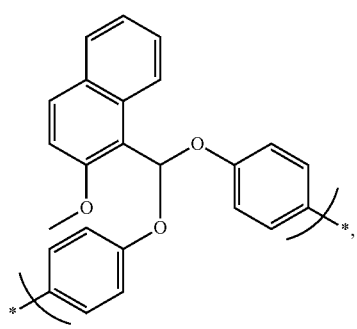
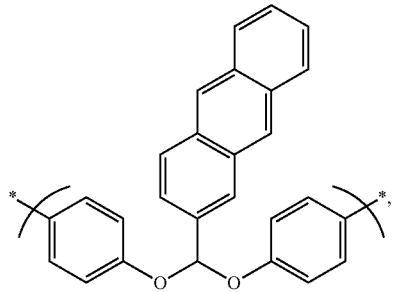
60
-continued
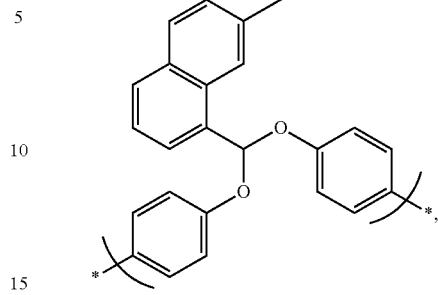
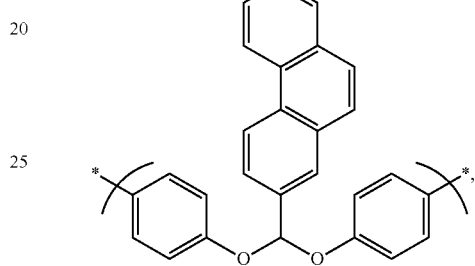
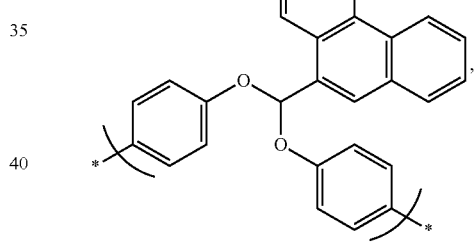
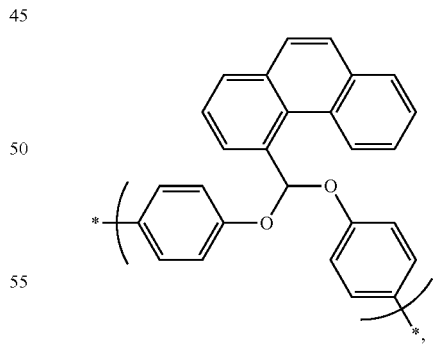
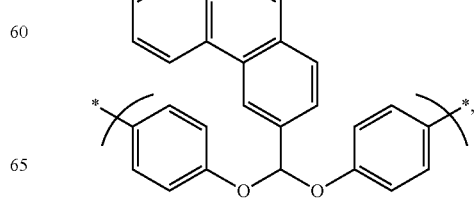

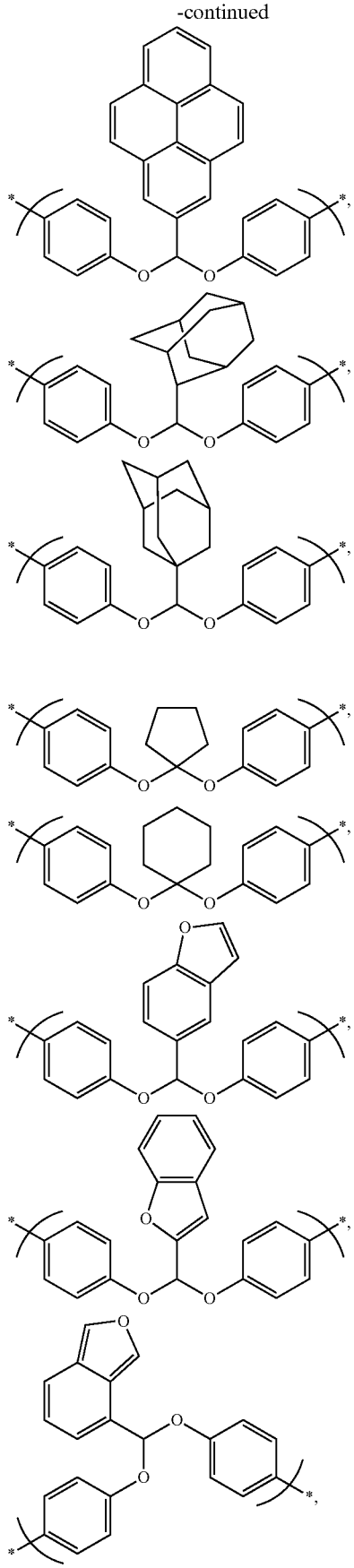
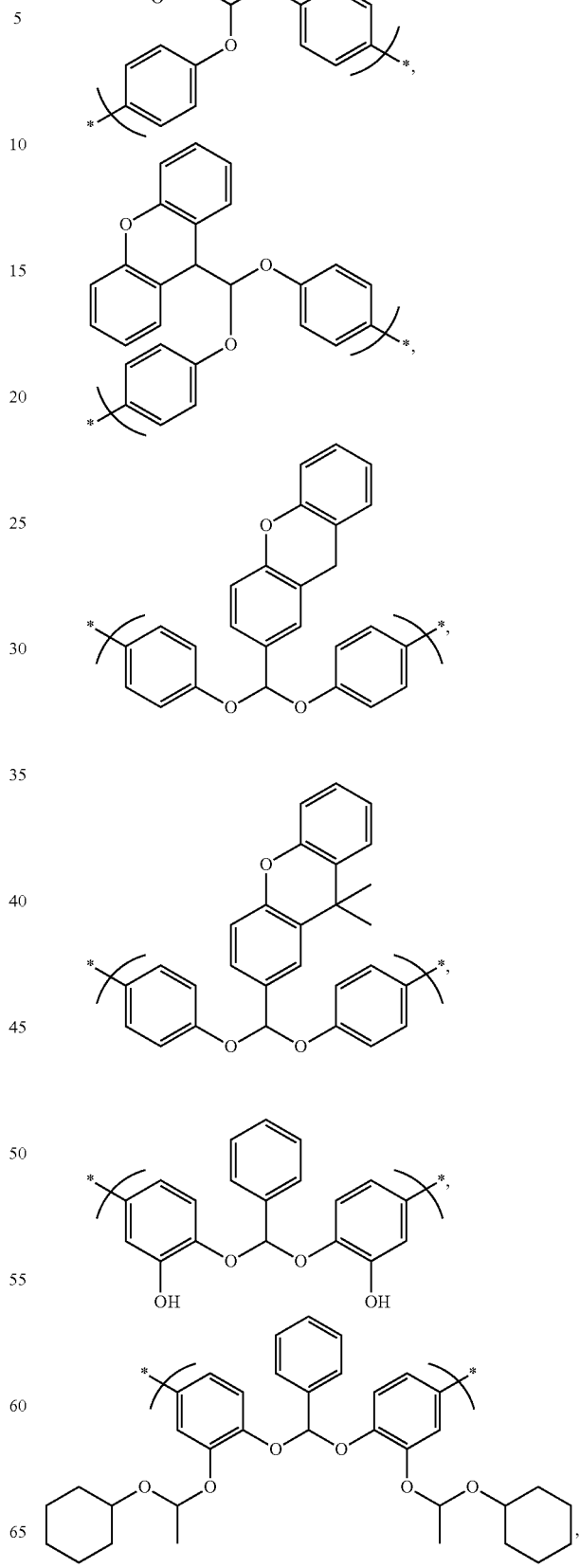

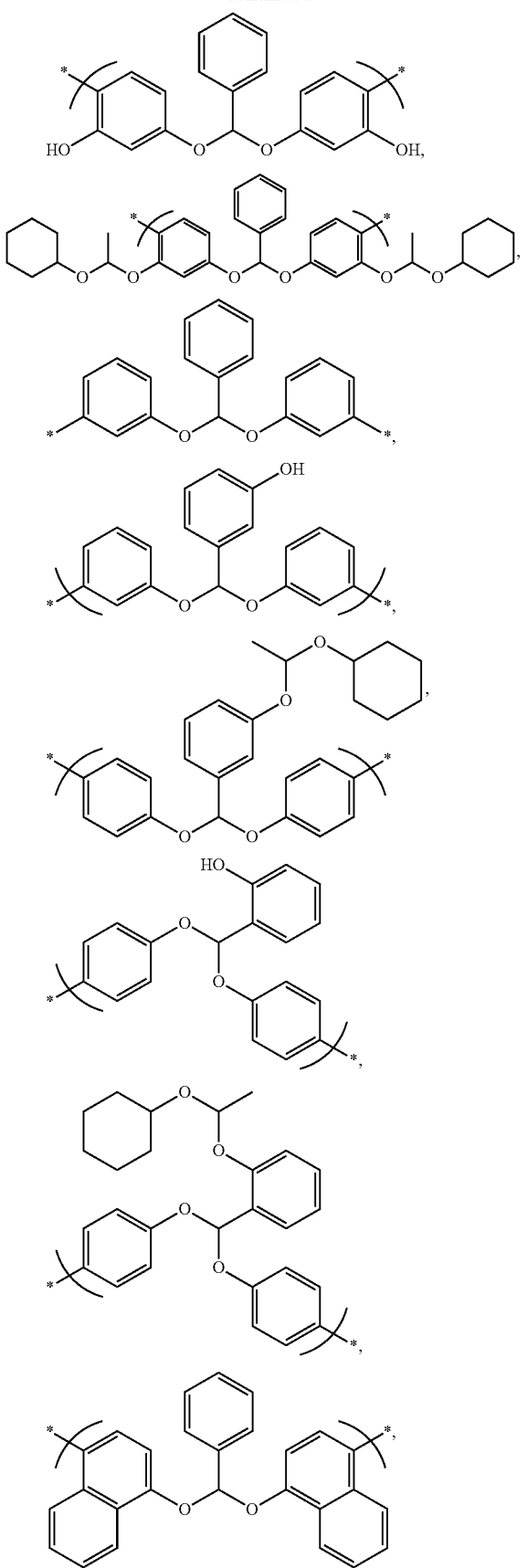
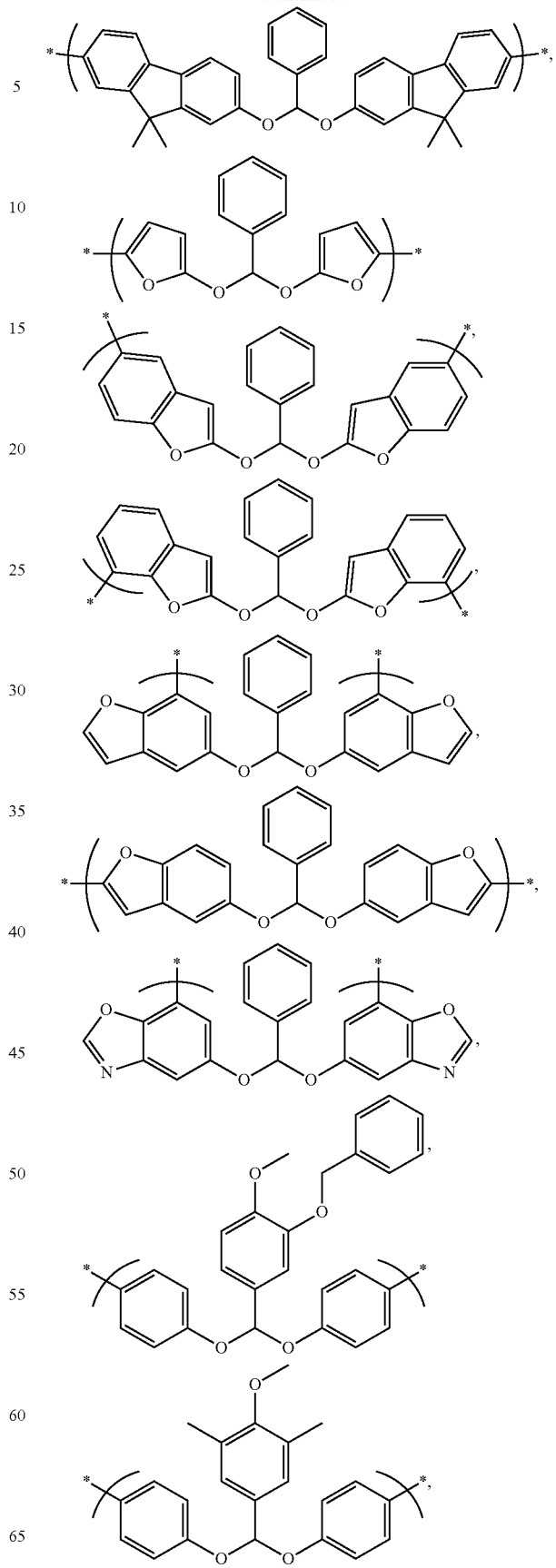

65
-continued
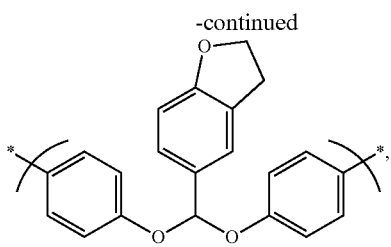,
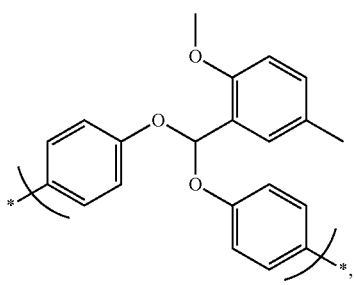,
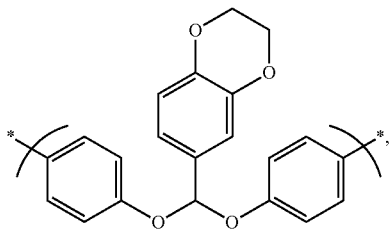,
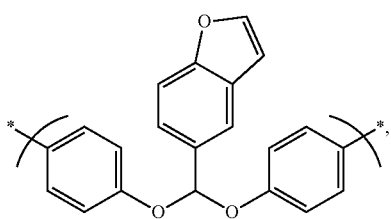,
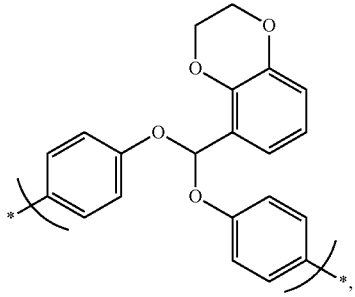,
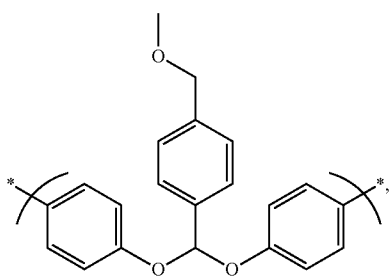,
66
-continued
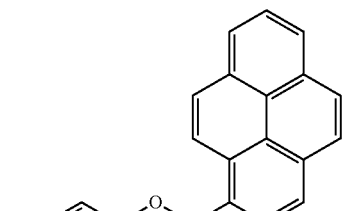 and
.
In some embodiments, the substructure
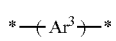
within any of the repeat units
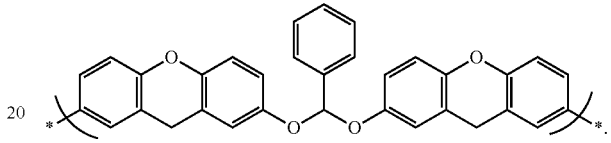
is selected from the group consisting of
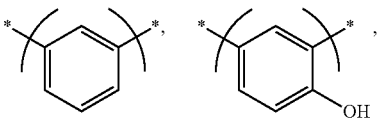
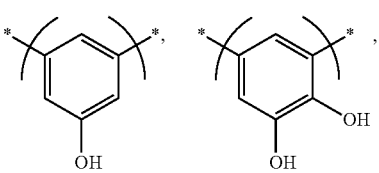
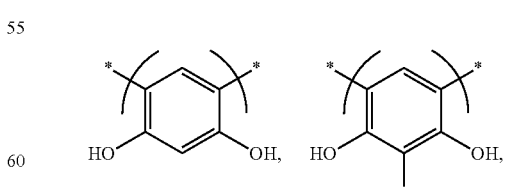
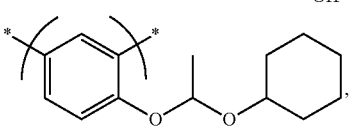,

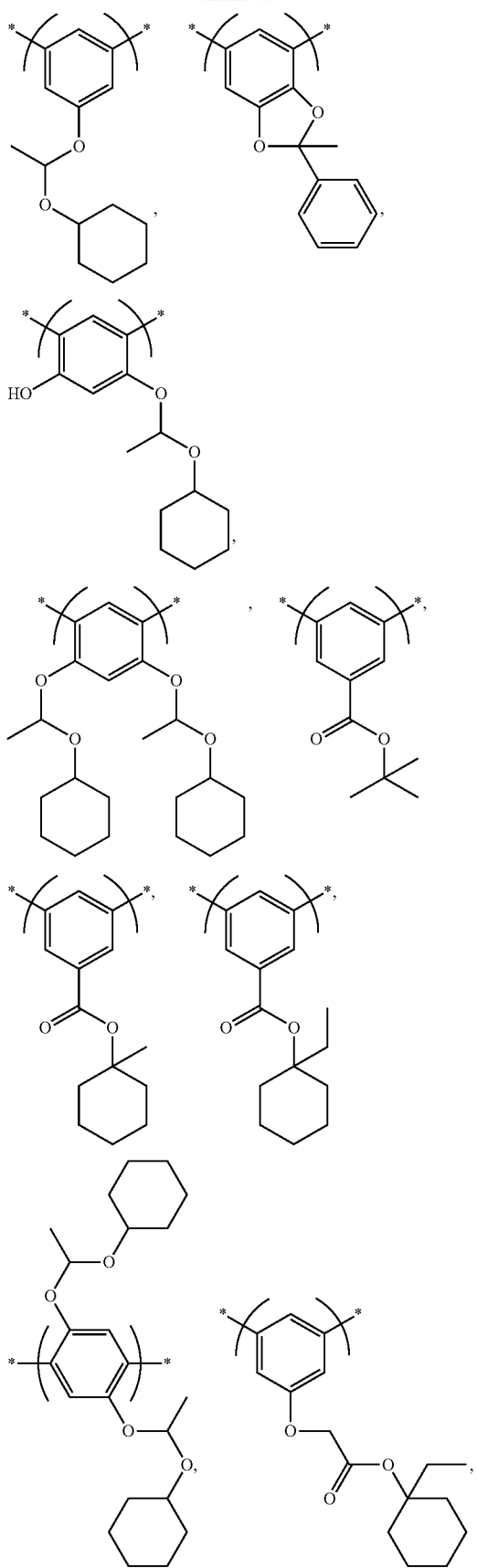
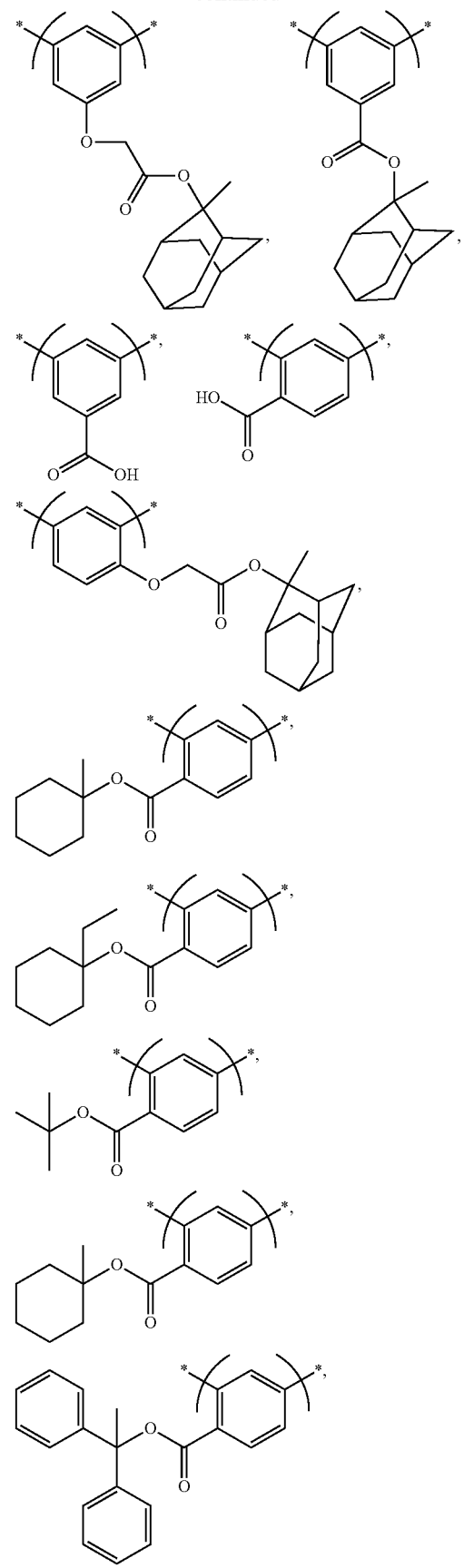

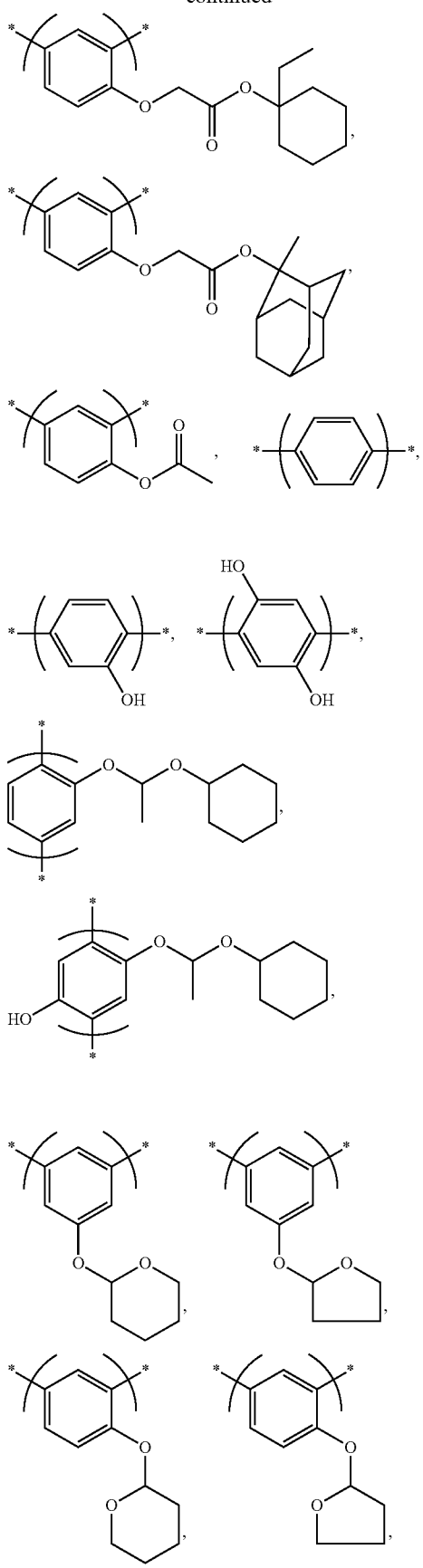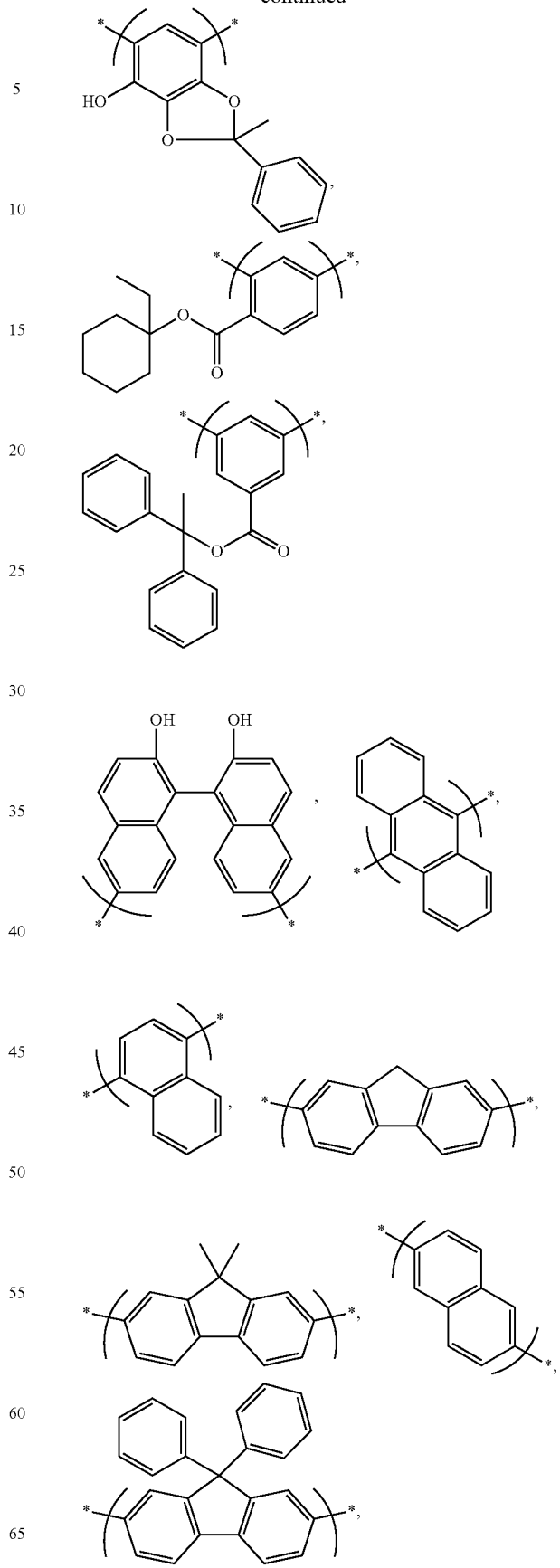

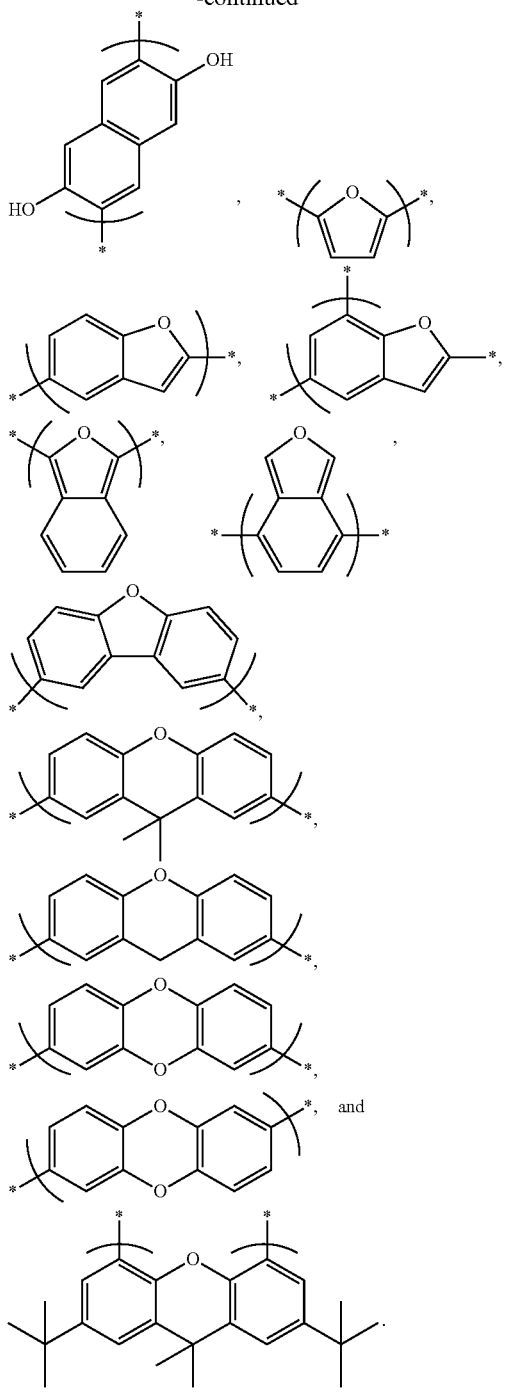

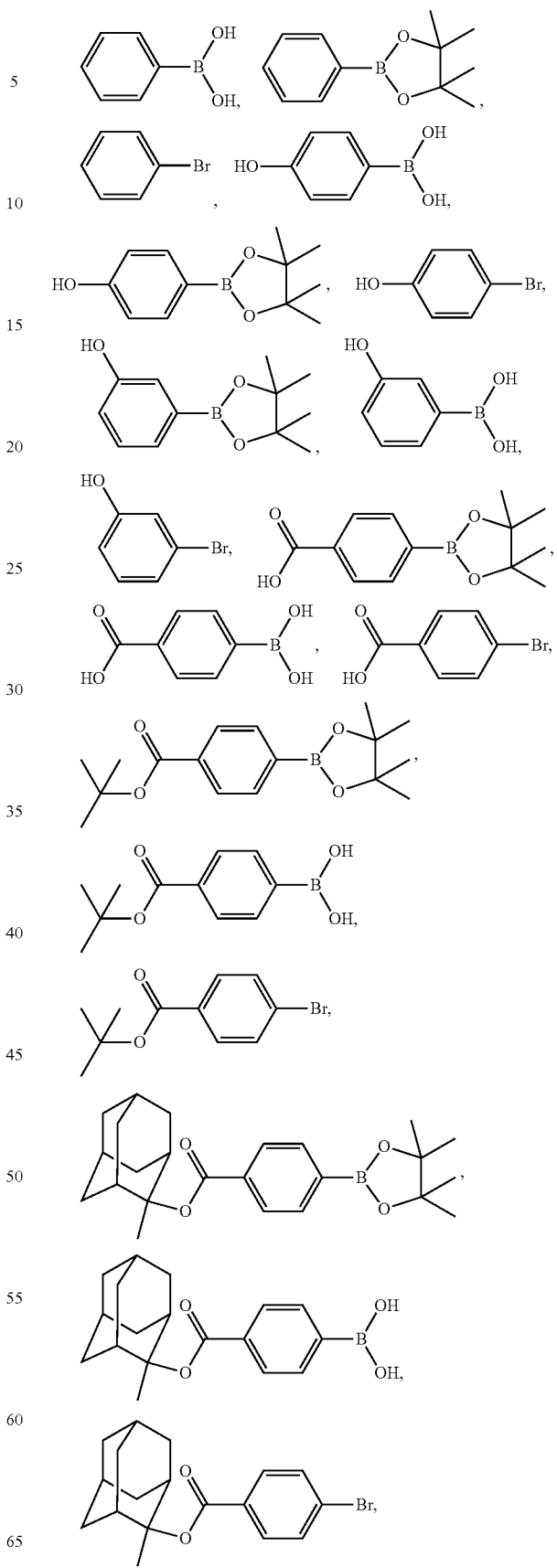

In some embodiments, the polymer is end capped by addition of one or more compounds that will react with terminal $B^x$ or X groups of the polymer chain. In these embodiments, the monomer further comprises an endcapping agent selected from $Ar^4$—X, $Ar^4$—$B^x$, and combinations thereof, wherein $Ar^4$ is an unsubstituted or substituted $C_{6-18}$ arylene, or unsubstituted or substituted $C_{3-18}$ heteroarylene, and X and $B^x$ are defined above. Specific examples for endcapping compounds include -continued

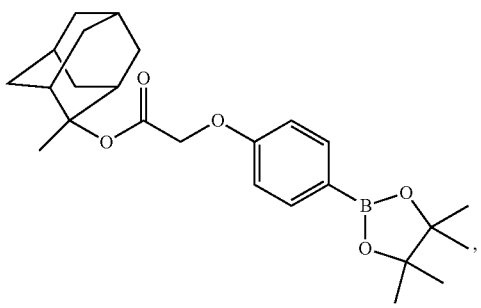

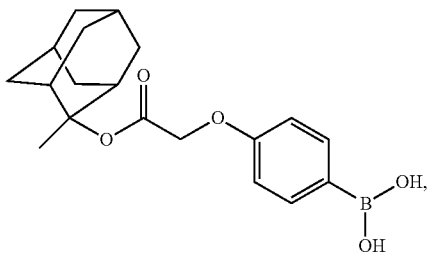

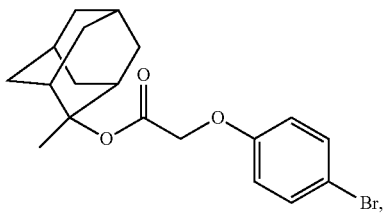

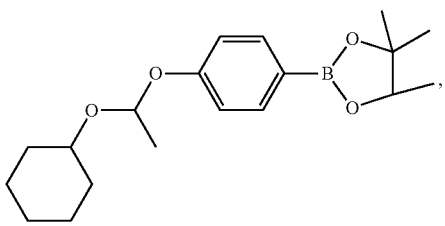

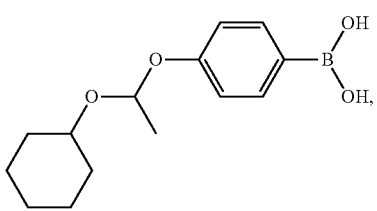

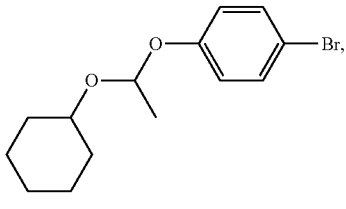

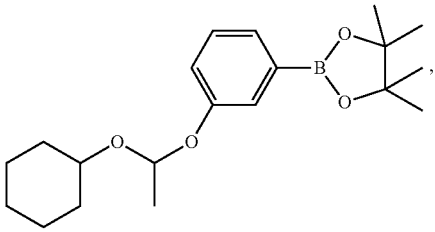

-continued

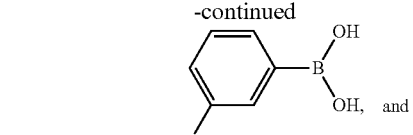

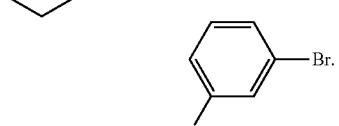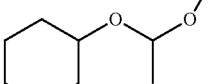

In some embodiments, at least one endcapping agent is added after substantial completion of the polymerization reaction (i.e., after completion of reaction of bifunctional monomer) as a method to (1) reduce the halogen and/or boron content of the polymer and/or (2) to adjust polymer properties that include solubility and substrate adhesion. In some embodiments, suitable amounts range from 0.01 equivalents to 5 equivalents with respect to the initial monomer concentration, more specifically, 0.1 equivalents to 0.3 equivalents with respect to the initial monomer concentration.

In some embodiments, the endcapping reagent is added at the beginning or during the course of the polymerization as a method to (1) limit molecular weight, (2) reduce the halogen and/or boron content of the final polymer and/or (3) to adjust specific polymer properties that include solubility and substrate adhesion. Suitable amounts of the end capping reagent dependent on the targeted molecular weight and/or relative reactivity of the end capping reagent in comparison with monomer reactivity and range from 0.0001 equivalents to 1 equivalent with respect to initial monomer concentration.

The polyacetals produced by the present method are useful compounds due to their ability to fragment into at least two smaller molecules upon treatment with Brønsted or Lewis acids or upon electron impact or ionization. Such fragmentation can be used to alter the physicochemical properties (including solubility, aggregation state, glass transition temperature, melting point, and vapor pressure) of materials or formulations comprising the polyacetals. The polyacetals can be used in various articles and applications, including biological applications (e.g., pH-dependent delivery of active agents including pharmaceuticals), prodrugs and amplified drug release, microencapsulation and extended release applications (e.g., encapsulation of active agents for pharmaceutical or agricultural applications); diagnostic applications; signal amplification; photoresists for lithography, including lithography using ultraviolet (UV) wavelengths, extreme ultraviolet wavelengths (EUV), and electron beams, photoresist topcoats and underlayers; electronic devices including patternable light emitting devices (OLED/PLED), photovoltaic devices, organic thin-film transistors (TFTs), and molecular logic gates; photographic applications such as detection or imaging of radioactive compounds or UV radiation; and pH indicators.

The invention is further illustrated by the following examples.

GENERAL PROCEDURES

All solvents and reagents were obtained in commercially available qualities purum, puriss. or p.a. Dry solvents were obtained from in-house purification/dispensing system (hexane, toluene, tetrahydrofuran and diethyl ether) or purchased from Sigma-Aldrich, Fisher Scientific, or Acros.

Proton nuclear magnetic resonance ($^1$H-NMR) spectra (500 megahertz (MHz) or 400 MHz) were obtained on a Varian VNMRS-500 or VNMRS-400 spectrometer at 30° C. unless otherwise noted. The chemical shifts were referenced to tetramethylsilane (TMS) (δ=0.00) in CDCl$_3$, Benzene-d$_5$ (7.15) in Benzene-d$_6$ or tetrahydrofuran-d$_7$ (THF-d$_7$; δ 3.58 (used) and 1.73) in THF-d$_8$. If necessary, peak assignment was carried out with the help of COSY, HSQC or NOESY experiments. $^{13}$C-NMR spectra (125 MHz or 100 MHz) were obtained on a Varian VNMRS-500 or VNRMS-400 spectrometer, chemical shifts were solvent or standard signals (0.0—TMS in CDCl$_3$, 128.02—Benzene-d$_6$, 67.57 (53.37)— lid. A heat/cool/heat temperature profile at a ramp rate of 10° C./minute was used, under nitrogen purge. Samples were heated from room temperature to 150° C., cooled to −90° C., and heated again to 150° C. Data analysis was performed using TA Universal Analysis software.

Thermal decomposition temperatures ($T_d$) were measured by thermogravimetric analysis (TGA) on a TA Instruments Q50001R with Infrared accessory and autosampler. Approximately 5 milligrams of each sample was weighed into a TA high-temperature platinum pan. Samples were loaded at room temperature (using autosampler) and ramped to 600° C. at 10° C./minute under a constant dried air purge. Data analysis was performed using TA Universal Analysis software.

PREPARATIVE EXAMPLE 1

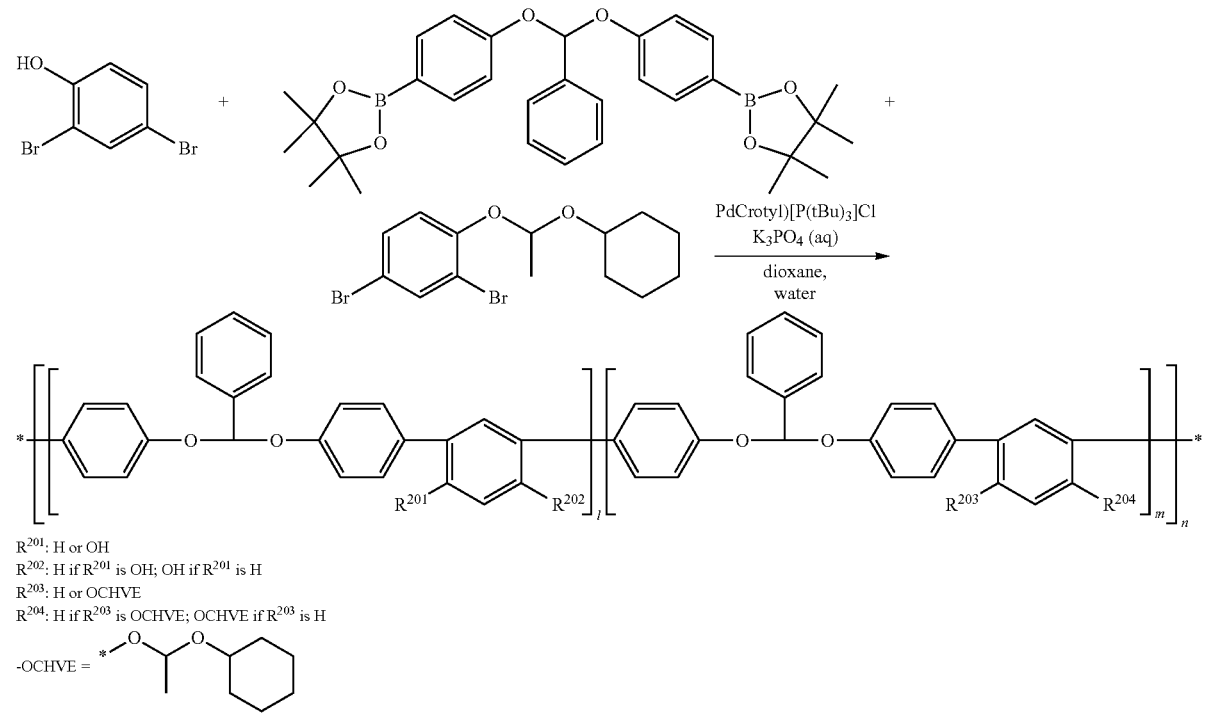

$R^{201}$: H or OH
$R^{202}$: H if $R^{201}$ is OH; OH if $R^{201}$ is H
$R^{203}$: H or OCHVE
$R^{204}$: H if $R^{203}$ is OCHVE; OCHVE if $R^{203}$ is H

THF-d$_8$). If NMR was used for quantification purposes, single scan experiments or relaxation delays of ≥30 seconds were used.

Polymers were analyzed as follows. Weight average molecular weight ($M_n$) and number average molecular weight ($M_w$) and polydispersity (D=$M_w/M_n$) were determined by gel permeation chromatography. Two milligrams of the polymer sample was dissolved in 1.0 milliliter of uninhibited THF, followed by 0.22 micrometer membrane filtration and injection of 50 microliters of the resulting sample into an Agilent 1100 Series GPC system coupled to a refractive index detector. The following analysis conditions were used: column: 300×7.5 mm Agilent PLgel 5 µm MIXED-C; column temperature 35° C.; mobile phase: THF; flow 1 mL/min; detector temperature: 35° C.

Melting points ($T_m$) and glass transition temperatures ($T_g$) were obtained by differential scanning calorimetry (DSC) using a TA Instruments Q2000 DSC, using T4 calibration (Indium, Sapphire). Approximately 5 milligrams of each sample was weighed into a TZero Aluminum DSC pan with In the example outlined below, 30% of the repeat units contain —OCHVE and 70% of the repeat units contain a free phenol.

pBEBA-2,4-DBP-CHVE (30%). Under nitrogen, 2,2'-(((phenylmethylene)bis(oxy))bis(4,1-phenylene))-bis(4,4,5,5-tetramethyl-1,3,2-dioxaborolane) (8.000 grams, 15.14 millimoles, 1.000 equivalent) and 2,4-dibromo-1-(1-(cyclohexyloxy)ethoxy)benzene (1.632 gram, 4.316 millimole, 0.285 equivalents) were combined in a round bottom flask. Under nitrogen, in a separate vial, potassium phosphate (10.06 grams, 47.4 millimole, 3.13 equivalents) was dissolved in deoxygenated water (13 milliliters). Under nitrogen, in a separate vial, Pd(crotyl)(P(tBu)$_3$)Cl (6.0 milligrams, 15 micromole, 0.001 equivalent) was dissolved in degassed 1,4-dioxane (200 microliters). 1,4-dioxane (50 milliliters) was added to the main reaction vessel followed by the potassium phosphate solution. The mixture was vigorously stirred, until both phases were well-blended. The catalyst solution was then added via cannula. The reaction mixture was stirred for 5 hours, then 2,4-dibromophenol (2.537 grams, 10.07 millimoles, 0.665 equivalent) was added. The reaction mixture was stirred vigorously overnight. After an additional 20-22 hours, phenyl boronic acid end cap (0.277 gram, 2.27 millimoles, 0.15 equivalent) was added. The reaction was stirred vigorously overnight. After an additional 20-24 hours, bromobenzene end cap (477 microliters, 4.54 millimole, 0.30 equivalents) was added. The reaction was stirred vigorously overnight.

The reaction mixture was worked up by adding 50 milliliters diluted brine and 100 milliliters ethyl acetate followed by shaking in an extraction funnel. The aqueous layer was removed and the remaining organic phase was further washed with brine (1×50 milliliters). The organic phase was transferred into a round bottom flask equipped with reflux condenser, a saturated aqueous solution of sodium diethyldithiodicarbamate (~10 milliliters) was added, and the mixture was vigorously stirred under reflux for 60 minutes. The organic phase was separated, dried over magnesium sulfate, and filtered through a three layered plug of CELITE™ diatomaceous earth (~0.25 inch on top), FLORISIL™ activated magnesium silicate (0.15 inch in middle) and silica gel (0.15 inch on bottom). The crude product was fully eluted with 200 milliliters ethyl acetate and the combined organic phases were washed with deionized water (5×50 milliliters) and concentrated on the rotary evaporator. The residue was taken up in ethyl acetate (~50 milliliters) with toluene (5-10 milliliters). The polymer was precipitated by drop-wise addition to stirred methanol (700 milliliters). Once the addition was complete, the suspension was stirred for 30 minutes and then allowed to settle. The precipitate was collected by filtering through a pre-washed disposable filter cartridge and air dried. The residue was again taken up in ethyl acetate (~50 milliliters) with toluene (5-10 milliliters), and the precipitation procedure repeated twice. After the final precipitation, the filter cake was dried under high vacuum oven at ~65° C. overnight. The product was obtained in form of a colorless powder (5.55 grams, 91% polymerization yield). DSC: $T_g$ at 136.1° C.; TGA: $T_d$ (5% weight loss) at 270.9° C.; GPC (against PS standard): $M_n$=6.44 kilodaltons (kDa), $M_w$=13.4 kDa, D=2.08; $^1$H NMR (500 MHz, THF-d$_8$) δ 8.28-8.16 (2.8%), 7.75-7.62 (9.4%), 7.60-7.16 (40.0%), 7.13-6.80 (24.7%), 5.43-5.31 (1.1%), 3.53-3.37 (1.2%), 1.71-1.06 (23.0%); [Integration ratio δ 8.20/5.36 71:29]; $^{13}$C NMR (101 MHz, THF-d$_8$) δ 156.74, 156.44, 156.40, 154.83, 154.42, 139.16, 137.33, 136.41, 135.90, 135.40, 134.07, 134.04, 133.99, 133.36, 133.34, 133.32, 131.72, 131.42, 129.95, 129.82, 129.68, 129.61, 129.38, 129.36, 129.33, 128.54, 128.31, 127.88, 127.51, 127.10, 126.99, 118.79, 118.52, 118.49, 118.47, 118.44, 117.55, 117.52, 117.48, 117.38, 117.21, 109.32, 101.30, 101.25, 101.20, 101.15, 101.03, 100.26, 84.37, 75.08, 67.57, 34.38, 33.23, 26.75, 24.85, 21.71.

PREPARATIVE EXAMPLE 2

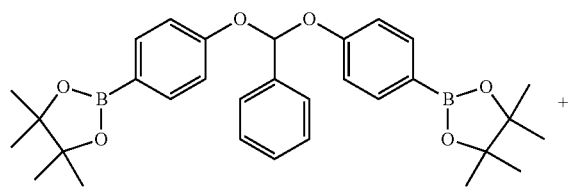

+

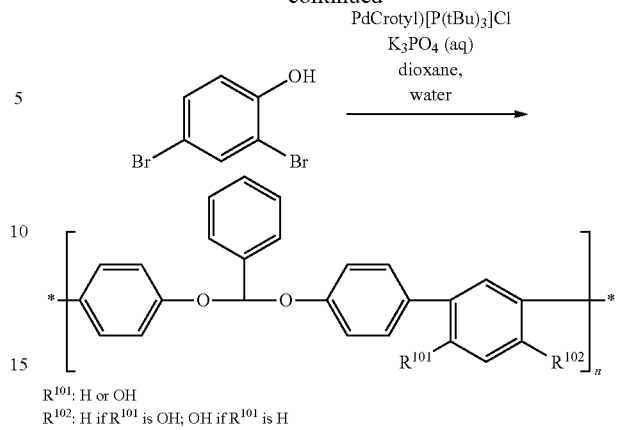

pBEBA-2,4-DBP (0%). Under nitrogen, 2,2'-(((phenylmethylene)bis(oxy))bis(4,1-phenylene))-bis(4,4,5,5-tetramethyl-1,3,2-dioxaborolane) (6.000 grams, 11.36 millimole, 1.000 equivalent) and 2,4-dibromophenol (2.718 gram, 10.79 millimole, 0.950 equivalent) were combined in a round bottom flask. Under nitrogen, in a separate vial, potassium phosphate (7.54 gram, 35.5 millimoles, 3.13 equivalents) were dissolved in deoxygenated water (10 milliliters). Under nitrogen, in a separate vial, Pd(crotyl)(P(tBu)$_3$)Cl (4.5 milligrams, 11.4 micromoles, 0.001 equivalents) was dissolved in degassed 1,4-dioxane (200 microliters). 1,4-dioxane (45 milliliters) was added to the main reaction vessel followed by the potassium phosphate solution. The mixture was vigorously stirred, until a homogeneous emulsion formed. The catalyst solution was then added via cannula. The reaction was stirred vigorously overnight. After an additional 20-22 hours, phenyl boronic acid end cap (208 milligrams, 1.70 millimole, 0.15 equivalent) was added. The reaction was stirred for an additional 7-8 hours, then bromobenzene end cap (358 microliters, 3.41 millimoles, 0.30 equivalent) was added. The reaction was stirred vigorously overnight.

The reaction was worked up by adding 50 milliliters diluted brine and 100 milliliters ethyl acetate followed by shaking in an extraction funnel. The aqueous layer was removed and the remaining organic phase was further washed with brine (1×50 milliliters). The organic phase was transferred into a round bottom flask equipped with reflux condenser, a saturated aqueous solution of sodium diethyldithiodicarbamate (~10 milliliters) was added, and the mixture was vigorously stirred under reflux for 60 minutes. Brine (30 milliliters) was added, the organics phase was isolated, dried over magnesium sulfate, and filtered through a three layered plug of CELITE™ diatomaceous earth (~0.25" on top), FLORISIL™ activated magnesium silicate (0.15" in middle) and silica gel (0.15" on bottom). The crude product was fully eluted with ethyl acetate (200 milliliters) and the combined organic phases were concentrated on the rotary evaporator. The residue was taken up in ethyl acetate (~50 milliliters) with toluene (5-10 milliliters). The polymer was precipitated by drop-wise addition to stirred methanol (700 milliliters). Once the addition was complete, the suspension was stirred for 30 minutes and then allowed to settle. The precipitate was collected by filtering through a pre-washed disposable filter cartridge and air dried. The residue was again taken up in ethyl acetate (~50 milliliters) with toluene (5-10 milliliters), and the precipitation procedure repeated twice. After the final precipitation, the filter cake was dried under high vacuum oven at ~65° C. overnight. The product was received in form of a colorless powder (3.68 g, 88% polymerization yield). DSC: $T_g$ at 147.7° C.; TGA: $T_d$ (5% weight loss) at 291.0° C.; GPC (against PS standard): $M_n$=5.98 kDa, $M_w$=13.5 kDa, Đ=2.26; $^1$H NMR (400 MHz, THF-$d_8$) δ 8.23-8.16 (4.8%), 7.73-7.17 (61.7%), 7.09-6.98 (22.7%), 6.93-6.75 (11.3%); $^{13}$C NMR (101 MHz, THF-$d_8$) δ 156.46, 154.81, 139.19, 136.41, 134.06, 134.04, 133.41, 133.38, 131.43, 130.32, 129.95, 129.70, 129.62, 129.39, 129.37, 129.34, 128.88, 128.32, 127.88, 127.52, 127.13, 118.48, 118.44, 118.27, 117.57, 117.54, 117.40, 101.27, 101.15, 101.08, 101.03, 67.57.

PREPARATIVE EXAMPLE 3

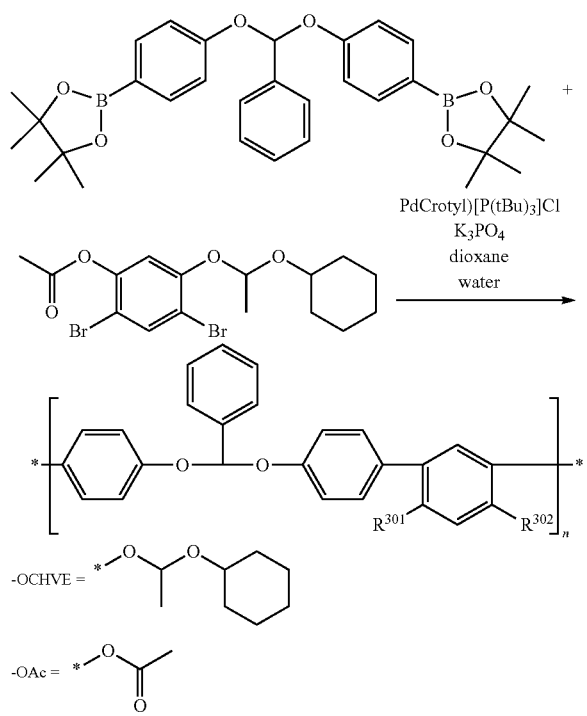

pBEBA-2,4-DBR-CHVE/Ac (50%/50%). 2,2'-(((phenylmethylene)bis(oxy))-bis(4,1-phenylene))-bis(4,4,5,5-tetramethyl-1,3,2-dioxaborolane) (6.0100 gram, 11.55 millimoles, 1.0 equivalent) and 2,4-dibromo-5-(1-(cyclohexyloxy)ethoxy)phenyl acetate (4.7845 gram, 10.97 millimoles, 0.950 equivalent) were combined in a round bottom flask and brought into a nitrogen glove box. Inside the nitrogen glove box, in a separate vial, potassium phosphate (7.6675 gram, 36.1 millimoles, 3.13 equivalents) was dissolved in degassed water (10 milliliter). In a separate small vial, Pd(crotyl)(P(tBu)$_3$)Cl catalyst (4.6 milligram, 11.55 micromoles, 0.001 equivalent) was dissolved in 1,4-dioxane (200 microliters). 1,4-Dioxane (45 milliliters) was added to the reaction round bottom flask followed by the potassium phosphate solution. The mixture was vigorously stirred with a large stir bar until both phases were well blended. The catalyst solution was then added via pipette. The reaction was stirred vigorously for two days at room temperature. Phenyl boronic acid end cap (211 milligrams, 1.73 millimoles, 0.15 equivalents) was added and the reaction was stirred vigorously for an additional 7 hours. Bromobenzene end cap (0.36 milliliters, 3.46 millimoles, 0.30 equivalent) was added and the reaction was stirred vigorously for an additional 17 hours.

The reaction was worked up outside of the glove box by adding water (20-25 milliliters), brine (20-30 milliliters) and ethyl acetate (100 milliliters). The organic layer was separated and stirred with saturated solution of disodium dithiodicarbamate (3 milliliters) and water (10 milliliters) at 80° C. for 1 hour. Once cooled, brine (20 milliliters) was added and the organic layer was separated and the aqueous phase re-extracted with ethyl acetate (1×50 milliliters). The combined organic phases were washed with brine (1×50 milliliters), dried over magnesium sulfate and filtered through a three layered plug of CELITE™ diatomaceous earth, FLORISIL™ activated magnesium silicate, and silica gel. The polymer was fully eluted with ethyl acetate (~200 milliliters) and the filtrate was concentrated under reduced pressure. The residue was taken up in ethyl acetate (~50 milliliters) and with toluene (5-10 milliliters). The polymer was precipitated by adding drop-wise to 700 milliliters vigorously stirring hexanes. Once the addition was complete, the suspension was stirred for 30 minutes and then allowed to settle. The precipitate was collected by and air dried. The precipitate was dissolved in ethyl acetate (~50 milliliters) with toluene (5-10 milliliters) and the precipitation procedure was repeated. The final product was bottled and dried in vacuum oven at ~65° C. overnight. The final product with fully intact acetate groups was obtained in the form of a colorless solid in a yield of 4.528 grams. GPC (polystyrene standard): $M_n$=5.30 kDa, $M_w$=10.0 kDa, Đ=1.9; $^1$H-NMR (400 MHz, THF-$d_8$) δ 7.70-7.59 (5.9%), 7.52-7.20 (22.1%), 7.12-6.81 (17.0%), 5.48-5.15 (2.4%), 3.52-3.39 (2.5%), 2.07-1.90 (7.4%), 1.69-0.97 (42.8%).

Superimposed $^1$H-NMR spectra of the polymer in acetone-$d_6$ without (solid line) or with (dashed line) $D_2O$ are presented in FIG. 1. The spectra superimpose perfectly. Phenolic protons in similar polymers typically appear at a chemical shift of δ≈8.2 but are not present in the NMR spectra, indicating that all of the phenol groups bear protecting groups. The identical spectrums further indicate that no acidic protons (such as phenolic protons) are present in the polymer. In addition, a peak at δ 2.00 is visible, which is not visible for similar polymers that do not contain acetate side chains.

Figure 2:
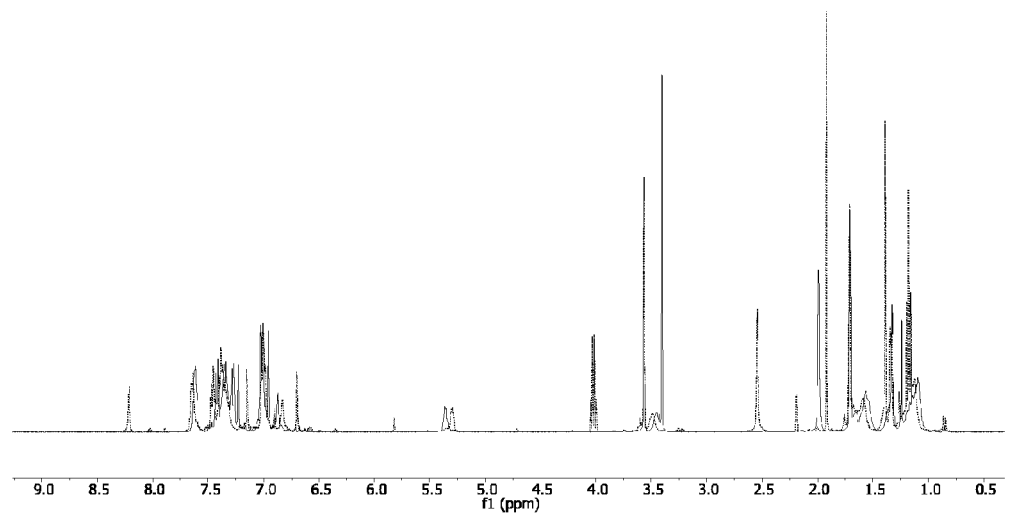
FIG. 2 presents superimposed $^1$H-NMR spectra of the Preparative Example 3 polymer untreated (solid) and sodium hydroxide-treated (dotted) in THF-$d_8$.

Superimposed $^1$H-NMR spectra of untreated polymer (solid line) and NaOH-treated polymer (dashed line, some EtOAc signals) in THF-$d_8$ are presented in FIG. 2. The spectrum of the NaOH-treated polymer shows deprotection of acetyl groups (absence of peak at δ 2.00) and appearance of free phenol groups (presence of peak at δ 8.2).

COMPARISONS OF CATALYSTS AND BASES

These examples illustrate the activities of different Suzuki coupling catalysts in the copolymerization below, utilizing a difficult-to-polymerize dihalide monomer:

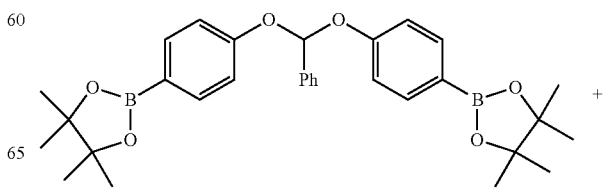

-continued

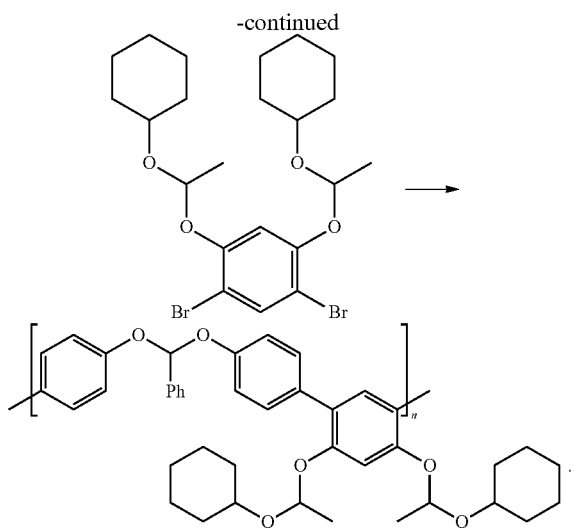

Inside a nitrogen-purged glovebox, catalyst solutions were prepared having the compositions summarized in Table 1. In each case, the solvent was 1,4-dioxane.

TABLE 1

| Catalyst Solution | Compound(s) | milligrams | micromoles | total volume (µL) |
|---|---|---|---|---|
| 1 | s-Phos[1] | 7.8 | 18.9 | 1,000 |
|   | Palladium acetate | 1.7 | 7.6 | |
| 2 | Pd(PPh$_3$)$_4$ | 8.8 | 7.6 | 1,000 |
| 3 | Pd(dppf[2])Cl$_2$ | 5.5 | 7.6 | 1,000 |
| 4 | cataCXium ™ A[3] | 6.8 | 18.9 | 1,000 |
|   | Palladium acetate | 1.7 | 7.6 | |
| 5 | tri-t-butylphosphine | 3.8 | 18.9 | 1,000 |
|   | Palladium acetate | 1.7 | 7.6 | |
| 6 | Pd(crotyl)(PtBu$_3$)Cl[4] | 3.0 | 7.6 | 1,000 |

[1]s-Phos is 2-Dicyclohexylphosphino-2',6'-dimethoxybiphenyl (CAS Reg. No. 657408-07-6).
[2]dppf is bis(diphenylphosphino)ferrocene (CAS Reg. No. 72287-26-4).
[3]cataCXium ™ A is di(1-adamantyl)-n-butylphosphine (CAS Reg. No. 321921-71-5).
[4]Pd(crotyl)(PtBu$_3$)Cl is chloro(crotyl)(tri-tert-butylphosphine)palladium(II) (CAS Reg. No. 1334497-00-5).

2,2'-(((Phenylmethylene)bis(oxy))bis(4,1-phenylene))bis(4,4,5,5-tetramethyl-1,3,2-dioxaborolane) (1.520 grams, 2.877 millimoles) and the dibromide shown in the equation above (1.494 grams, 2.871 millimoles, 0.998 equivalents) were taken up in 10.5 mL of 1,4-dioxane. 55 microliter aliquots of this mixture were distributed to 18 vials, labeled A-R. To vials A-F K$_3$PO$_4$ (101 milligrams, 476 micromoles, 3.14 equivalents) was added. To vials G-L, Cs$_2$CO$_3$ (197 milligrams, 606 micromoles, 4 equivalents) was added. To vials A-L, degassed water (121 microliters) was added. To vials M-R, degassed NaOH (aq.), (5 M, 121 microliters, corresponding to 606 micromoles NaOH, 4 equivalents) was added.

Twenty microliters of catalyst solution 1 was added to vials A, G, M. Twenty microliters of catalyst solution 2 was added to vials B, H, N. Twenty microliters of catalyst solution 3 was added to vials C, J, O. Twenty microliters of catalyst solution 4 was added to vials D, K, P. Twenty microliters of catalyst solution 5 was added to vials E, L, Q. Twenty microliters of catalyst solution 6 was added to vials F, M, R. In each case, the added catalyst corresponded to 0.001 equivalents palladium.

Reactions were run over night at 60° C., phase separated, filtered through a plug of silica (fully eluted with ethyl acetate), concentrated, and analyzed by GPC. The results are summarized in Table 2. All experiments with Pd(crotyl)(PtBu$_3$)Cl as a catalyst show higher M$_w$ values compared to the other catalysts tested under identical conditions, and M$_n$ are also higher except that the s-Phos/PdOAc2 catalyst of Experiment M produced a slightly higher Mn value than did the Pd(crotyl)(PtBu$_3$)Cl catalyst of Experiment R.

TABLE 2

Experiments at 60° C.

| Experiment | Catalyst | Base | M$_n$ | M$_w$ | PDI |
|---|---|---|---|---|---|
| A | s-Phos/PdOAc2 | K$_3$PO$_4$ | 5507 | 9784 | 1.7766 |
| B | Pd(PPh3)4 | K$_3$PO$_4$ | 1060.9 | 1656.5 | 1.5614 |
| C | Pd(dppf)Cl2 | K$_3$PO$_4$ | 668.53 | 958.96 | 1.3188 |
| D | CataCXium ™ A/ PdOAc2 | K$_3$PO$_4$ | 3872.7 | 5521.1 | 1.4257 |
| E | (tBu)3P/Pd(OAc)2 | K$_3$PO$_4$ | 761.5 | 1997.9 | 2.6236 |
| F | Pd(crotyl)(PtBu3)Cl | K$_3$PO$_4$ | 7115 | 16040 | 2.2544 |
| G | s-Phos/PdOAc2 | Cs$_2$CO$_3$ | 4429.3 | 7251 | 1.637 |
| H | Pd(PPh3)4 | Cs$_2$CO$_3$ | 954.63 | 1439.2 | 1.5076 |
| I | Pd(dppf)Cl2 | Cs$_2$CO$_3$ | 726.79 | 1093 | 1.5039 |
| J | CataCXium ™ A/ PdOAc2 | Cs$_2$CO$_3$ | 3575.5 | 5019.9 | 1.404 |
| K | (tBu)3P/Pd(OAc)2 | Cs$_2$CO$_3$ | 479.68 | 958.61 | 1.9985 |
| L | Pd(crotyl)(PtBu3)Cl | Cs$_2$CO$_3$ | 5565.6 | 9983 | 1.7937 |
| M | s-Phos/PdOAc2 | NaOH | 5675.5 | 17714 | 3.1211 |
| N | Pd(PPh3)4 | NaOH | 3229 | 5234.9 | 1.6212 |
| O | Pd(dppf)Cl2 | NaOH | 812.03 | 1638.8 | 2.0181 |
| P | CataCXium ™ A/ PdOAc2 | NaOH | 726.04 | 2277.7 | 3.1371 |
| Q | (tBu)3P/Pd(OAc)2 | NaOH | 1573.4 | 3862.9 | 2.4551 |
| R | Pd(crotyl)(PtBu3)Cl | NaOH | 5395.9 | 23953 | 4.4391 |

Experiments A and F were repeated, except at room temperature rather than 60° C. The results, presented in Table 3, show that the Experiment F' at room temperature conditions, using Pd(crotyl)(PtBu$_3$)Cl catalyst and K$_3$PO$_4$ base, produced substantially higher Mn and Mw values than the Experiment A' at room temperature conditions. Pd(crotyl)(PtBu$_3$)Cl catalyzed the reaction to give a molecular weight of about 7.7 kilodaltons (kDa), which was ideal for the targeted application (photoresists), whereas s-Phos/PdOAc$_2$ catalyst produced a polymer with insufficient molecular weight for use in photoresists.

TABLE 3

Experiments at Room Temperature

| Experiment | Catalyst | Base | M$_n$ | M$_w$ | PDI |
|---|---|---|---|---|---|
| A' | s-Phos/PdOAc2 | K$_3$PO$_4$ | 1264 | 2399.1 | 1.898 |
| F' | Pd(crotyl)(PtBu3)Cl | K$_3$PO$_4$ | 4862.9 | 7753.7 | 1.5944 |

The invention claimed is:

1. A method of forming a polymer, the method comprising:
reacting a monomer in the presence of a catalyst and a base to form a polymer;
wherein the monomer comprises a bis(aryl)acetal having the structure

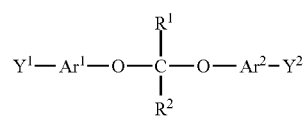

wherein
Y$^1$ and Y$^2$ are each independently chloro, bromo, iodo, mesylate, tosylate, triflate, or B$^x$, wherein each occurrence of $B^x$ is independently a boron-containing functional group bonded to $Ar^1$ or $Ar^2$ via a boron atom;

$Ar^1$ and $Ar^2$ are each independently unsubstituted or substituted $C_{6-18}$ arylene, or unsubstituted or substituted $C_{3-18}$ heteroarylene; and $R^1$ and $R^2$ are each independently hydrogen, unsubstituted or substituted $C_{1-18}$ linear or branched alkyl, unsubstituted or substituted $C_{3-18}$ cycloalkyl; unsubstituted or substituted $C_{6-18}$ aryl, or unsubstituted or substituted $C_{3-18}$ heteroaryl; and $R^1$ and $R^2$ are optionally covalently linked to each other to form a ring that includes

—$R^1$—C—$R^2$—;

wherein when one of $Y^1$ and $Y^2$ is chloro, bromo, iodo, triflate, mesylate, or tosylate, and the other of $Y^1$ and $Y^2$ is $B^x$, the polymer comprises a plurality of repeat units having the structure

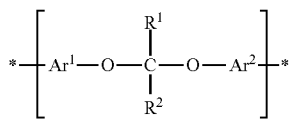

wherein $Ar^1$, $Ar^2$, $R^1$, and $R^2$ are defined above, and each occurrence of $Ar^1$, $Ar^2$, $R^1$, and $R^2$ is defined independently; wherein when $Y^1$ and $Y^2$ are each $B^x$, the monomer further comprises a bis(leaving group)arylene having the structure

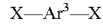

wherein each occurrence of X is independently chloro, bromo, iodo, triflate, mesylate, or tosylate;

wherein $Ar^3$ is unsubstituted or substituted $C_{6-18}$ arylene, or unsubstituted or substituted $C_{3-18}$ heteroarylene; and wherein the polymer comprises a plurality of repeat units having the structure

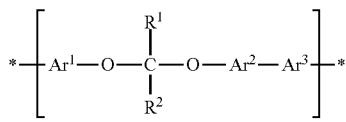

wherein $Ar^1$, $Ar^2$, $Ar^3$, $R^1$, and $R^2$ are defined above, and each occurrence of $Ar^1$, $Ar^2$, $Ar^3$, $R^1$, and $R^2$ is defined independently; and wherein when $Y^1$ and $Y^2$ are each independently selected from chloro, bromo, iodo, triflate, mesylate, or tosylate, the monomer further comprises a bis(boron-containing functional group)arylene having the structure $B^x$—$Ar^3$—$B^x$ wherein each occurrence of $B^x$ is independently a boron-containing functional group bonded to $Ar^3$ via a boron atom; and wherein the polymer comprises a plurality of repeat units having the structure

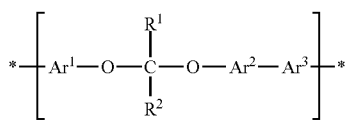

wherein $Ar^1$, $Ar^2$, $Ar^3$, $R^1$, and $R^2$ are defined above, and each occurrence of $Ar^1$, $Ar^2$, $Ar^3$, $R^1$, and $R^2$ is defined independently.

2. The method of claim 1, wherein one of $Y^1$ and $Y^2$ is chloro, bromo, iodo, triflate, mesylate, or tosylate, and the other of $Y^1$ and $Y^2$ is $B^x$.

3. The method of claim 1, wherein $Y^1$ and $Y^2$ are each $B^x$, and the monomer further comprises the bis(leaving group) arylene having the structure X—$Ar^3$—X.

4. The method of claim 1, wherein $Y^1$ and $Y^2$ are each independently selected from chloro, bromo, iodo, triflate, mesylate, or tosylate, and the monomer further comprises the bis(boron-containing functional group)arylene having the structure $B^x$—$Ar^3$—$B^x$.

5. The method of claim 1, wherein each occurrence of $B^x$ is independently selected from —$BF_3^-M^+$, wherein each occurrence of $M^+$ is independently an alkali metal cation, or an unsubstituted or substituted ammonium ion; —$B(OH)_2$; and

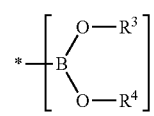

wherein $R^3$ and $R^4$ are each independently $C_{1-18}$ alkyl, $C_{3-18}$ cycloalkyl, or $C_{6-18}$ aryl; and $R^3$ and $R^4$ are optionally covalently linked to each other to form a ring that includes

—$R^3$—O—B—O—$R^4$—.

6. The method of claim 1, wherein at least one of $Ar^1$, $Ar^2$, and $Ar^3$ is substituted with at least one functional group selected from the group consisting of hydroxyl, acetals, ketals, esters, and lactones.

7. The method of claim 1, wherein in at least one of the repeat units of the polymer, at least one of $R^1$, $R^2$, $Ar^1$, $Ar^2$ and $Ar^3$ is substituted with hydroxyl.

8. The method of claim 1, wherein $Ar^1$ and $Ar^2$ are not covalently linked with one another to form a ring structure that includes —$Ar^1$—O—C—O—$Ar^2$.

9. The method of claim 1, wherein the catalyst or a pre-catalyst thereof has the structure

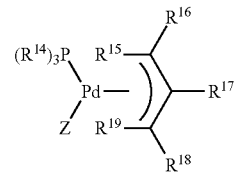

wherein each occurrence of $R^{14}$ is independently unsubstituted or substituted $C_{1-18}$ linear or branched alkyl, unsubstituted or substituted $C_{3-18}$ cycloalkyl, unsubstituted or substituted $C_{6-18}$ aryl, or unsubstituted or substituted ferrocenyl;

$R^{15}$, $R^{16}$, $R^{17}$, $R^{18}$, $R^{19}$ are, independently, hydrogen, $C_{1-6}$ linear or branched alkyl, $C_{3-6}$ cycloalkyl, or phenyl; and Z is selected from the group consisting of fluorine, chlorine, bromine, iodine, cyano (—CN), cyanate (—OCN), isocyanate (—NCO), thiocyanate (—SCN), isothiocyanate (—NCS), nitro (—$NO_2$), nitrite (—ON=O), azide (—N=$N^+$=$N^-$), and hydroxyl.

10. The method of claim 9, wherein
Y is $B^x$;
each occurrence of $B^x$ is

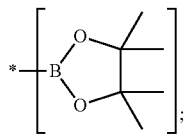
(5)

$Ar^1$ and $Ar^2$ are 1,4-phenylene;
$Ar^3$ is 1,3-phenylene substituted with hydroxyl or an acetal, —O—C(H)($R^5$)—$OR^6$, wherein $R^5$ is methyl and $R^6$ is cyclohexyl;
$R^1$ is hydrogen;
$R^2$ is phenyl, ortho-methoxyphenyl, meta-methoxyphenyl, or para-methoxylphenyl;
each occurrence of $R^{14}$ is t-butyl;
$R^{15}$ is methyl;
$R^{16}$, $R^{17}$, $R^{18}$, and $R^{19}$ are hydrogen; and
Z is chlorine.

* * * * *